US012271146B2

(12) United States Patent
Komatsu et al.

(10) Patent No.: US 12,271,146 B2
(45) Date of Patent: Apr. 8, 2025

(54) PROCESS CARTRIDGE

(71) Applicant: CANON KABUSHIKI KAISHA, Tokyo (JP)

(72) Inventors: Noriyuki Komatsu, Shizuoka (JP); Tomonori Mori, Kanagawa (JP); Teruhiko Sasaki, Shizuoka (JP); Makoto Hayashida, Shizuoka (JP); Naoki Maeda, Shizuoka (JP); Satoru Harada, Aichi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/350,844

(22) Filed: Jul. 12, 2023

(65) Prior Publication Data

US 2023/0350340 A1 Nov. 2, 2023

Related U.S. Application Data

(63) Continuation of application No. 17/883,727, filed on Aug. 9, 2022, now Pat. No. 11,740,585, which is a (Continued)

(30) Foreign Application Priority Data

Dec. 26, 2019 (JP) ................................ 2019-235594

(51) Int. Cl.
*G03G 21/18* (2006.01)
*G03G 15/08* (2006.01)

(52) U.S. Cl.
CPC ..... *G03G 21/1814* (2013.01); *G03G 15/0891* (2013.01); *G03G 21/1842* (2013.01)

(58) Field of Classification Search
CPC ....................... G03G 21/1814; G03G 21/1842
See application file for complete search history.

(56) References Cited

U.S. PATENT DOCUMENTS 6,236,820 B1 5/2001 Nakazato
6,934,485 B2 8/2005 Miyabe
(Continued)

FOREIGN PATENT DOCUMENTS

JP 2002328584 A 11/2002
JP 2016224221 A 12/2016
JP 2017182014 A 10/2017

OTHER PUBLICATIONS

Notice of Allowance issued in U.S. Appl. No. 17/123,308 mailed Feb. 12, 2021.
(Continued)

*Primary Examiner* — Francis C Gray
(74) *Attorney, Agent, or Firm* — ROSSI, KIMMS & McDOWELL LLP

(57) ABSTRACT

A developing unit, which is attachable to and detachable from a photosensitive member unit, includes: a developing roller; a housing in which a holding space that holds toner is formed; and a pressing receiving portion that receives pressing force from a pressing member. The housing includes a first bottom portion that projects toward an outer side of the holding space, and a second bottom portion that projects toward the outer side of the holding space, in a state in use. When viewed in a direction of a rotation axis of the developing roller, at least part of the pressing receiving portion is located in a space surrounded by the first bottom portion, the second bottom portion, and a tangent line tangent to both an outer wall of the first bottom portion and an outer wall of the second bottom portion.

12 Claims, 34 Drawing Sheets

Related U.S. Application Data continuation of application No. 17/317,141, filed on May 11, 2021, now Pat. No. 11,454,924, which is a continuation of application No. 17/123,308, filed on Dec. 16, 2020, now Pat. No. 11,029,640.

(56) References Cited

U.S. PATENT DOCUMENTS

| | | | | |
|---|---|---|---|---|
| 7,110,688 | B2 * | 9/2006 | Takahashi | G03G 15/0813 399/53 |
| 7,532,844 | B2 | 5/2009 | Tanaka | |
| 7,941,073 | B2 | 5/2011 | Takagi | |
| 8,121,524 | B2 | 2/2012 | Sakoh | |
| 9,823,621 | B2 | 11/2017 | Miyamoto | |
| 9,996,052 | B2 | 6/2018 | Shimizu | |
| 2003/0161658 | A1 | 8/2003 | Park | |
| 2005/0141909 | A1 | 6/2005 | Takahashi | |
| 2006/0034637 | A1 | 2/2006 | Kim | |
| 2007/0048024 | A1 * | 3/2007 | Choi | G03G 15/0822 399/254 |
| 2008/0152388 | A1 * | 6/2008 | Ueno | G03G 15/751 399/167 |
| 2009/0087227 | A1 * | 4/2009 | Takagi | G03G 15/0886 399/263 |
| 2011/0158684 | A1 * | 6/2011 | Sato | G03G 15/087 399/119 |
| 2014/0105662 | A1 | 4/2014 | Sato | |
| 2018/0299823 | A1 * | 10/2018 | Uyama | G03G 21/1652 |

OTHER PUBLICATIONS

Notice of Allowance issued in U.S. Appl. No. 17/317,141 mailed Feb. 4, 2022.

Notice of Allowance issued in U.S. Appl. No. 17/317,141 mailed May 13, 2022.

Office Action issued in U.S. Appl. No. 17/883,727 mailed Dec. 15, 2022.

Notice of Allowance issued in U.S. Appl. No. 17/883,727 mailed Apr. 18, 2023.

* cited by examiner

A-A CROSS-SECTION

PROCESS CARTRIDGE

BACKGROUND OF THE INVENTION

Field of the Invention

The present invention relates to a cartridge, such as a photosensitive member unit, a developing unit, or the like, which is attachable to or detachable from an image forming apparatus that uses an electrophotographic system.

Description of the Related Art

In a laser beam printer, a photocopier, or the like serving as an electrophotographic-type image forming apparatus, a toner image is formed on a photosensitive drum, and this toner image is then transferred to a sheet serving as a recording material to form an image on the recording material.

In laser beam printers, in order to achieve easier maintenance, a system is widely used in which, with some components of an image forming apparatus being provided in a cartridge, the cartridge is removed to the exterior of the apparatus main body to implement maintenance or replacement.

Japanese Patent Application Publication No. 2016-224221 discloses a process cartridge which enables a developing unit that contain toner to be attached to and detached from a photosensitive member unit that has a photosensitive drum.

SUMMARY OF THE INVENTION

In process cartridges having a structure which enables a developing unit that contains toner to be attached to and removed from a photosensitive member unit that has a photosensitive drum, there is room for further improvement in a variety of areas, e.g., size, cost, precision, usability, and service life.

An object of the present invention is to provide a technique which makes it possible to increase the volume of a space containing toner in a process cartridge.

In order to achieve the object described above, a process cartridge according to an embodiment of the present invention includes:

a photosensitive member unit; and a developing unit that is attachable to and detachable from the photosensitive member unit, wherein the photosensitive member unit includes:

a photosensitive drum on which an electrostatic latent image is formed;

a frame that supports the photosensitive drum; and a pressing member that presses the developing unit toward the photosensitive member unit, the developing unit includes:

a developing roller that supplies toner to the photosensitive drum and collects the toner remaining on a surface of the photosensitive drum;

a housing in which a holding space that holds the toner is formed; and a pressing receiving portion that receives pressing force from the pressing member, the housing includes:

a first bottom portion that has an arc shape and that projects toward an outer side of the holding space and a second bottom portion that has an arc shape and that projects toward the outer side of the holding space, in a state in use, and when viewed in a direction of a rotation axis of the developing roller, at least part of the pressing receiving portion is located in a space surrounded by the first bottom portion, the second bottom portion, and a tangent line tangent to both an outer wall of the first bottom portion and an outer wall of the second bottom portion.

According to the present invention, the volume of a space containing toner in a process cartridge can be increased.

Further features of the present invention will become apparent from the following description of exemplary embodiments with reference to the attached drawings.

DESCRIPTION OF THE EMBODIMENTS

Embodiments for carrying out the invention will be described in detail hereinafter, on the basis of exemplary embodiments, with reference to the drawings. It should be noted, however, that the dimensions, materials, shapes, and relative dispositions of the constituent elements described in the embodiments are to be changed as appropriate depending on the configurations, conditions, and so on of the apparatus to which the invention is applied. In other words, the scope of the invention is not intended to be limited to the embodiments described hereinafter.

Figure 1:
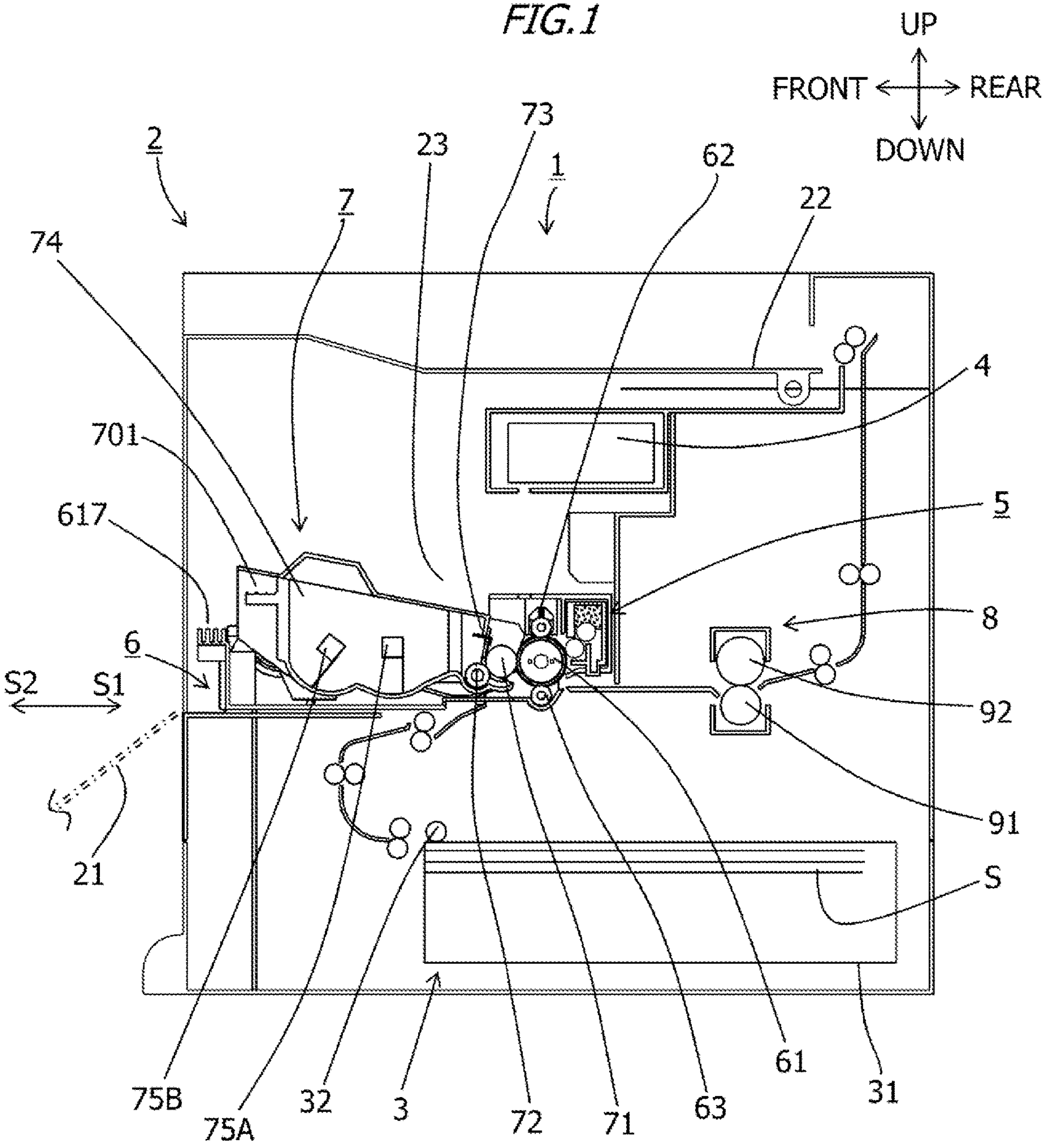
FIG. 1 is a cross-sectional view of an image forming apparatus including a process cartridge.

First, an image forming apparatus and a process cartridge according to an embodiment of the present invention will be described in detail with reference to the drawings where appropriate. FIG. 1 is a cross-sectional view of an image forming apparatus 1 including a process cartridge 5.

In the following descriptions, directions are defined on the basis of a user who uses the image forming apparatus 1. In other words, a front surface side of the image forming apparatus 1 is referred to as the “front”; a rear surface side, as the “rear”; an upper surface (top surface) side, as “up”; and a lower surface (bottom surface) side, as “down”. Additionally, viewing the image forming apparatus 1 from the front surface side, a left side of the image forming apparatus 1 is referred to as “left”, and a right side, as “right”.

The orientation (state) of the image forming apparatus 1 in each drawing is assumed to be the orientation (state) in use, and thus the same directions as the image forming apparatus 1 are defined for the process cartridge 5, under the assumption that the process cartridge 5 is in the same orientation as that used when the process cartridge 5 is mounted in the image forming apparatus 1. Each direction in the drawings is defined by the arrows denoted in the drawings. A front-rear direction, an up-down direction, and a left-right direction indicated by these arrows are directions which are orthogonal to each other. These directions are assumed to be the same throughout all the drawings. The up-down direction is parallel to a vertical direction, and the left-right direction and the front-rear direction are parallel to a horizontal direction. The left-right direction is also parallel to the direction of a rotation axis line of a photosensitive drum 61 and the direction of a rotation axis line of a developing roller 71.

The process cartridge 5 is an integrated entity constituted by a developing unit 7 being mounted to a photosensitive member unit 6. When being mounted in an apparatus main body 2, the process cartridge 5 is inserted in the direction indicated by an arrow S1 in the drawings (a mounting direction), and is removed in the direction indicated by an arrow S2.

Overall Configuration of Image Forming Apparatus

As illustrated in FIG. 1, the image forming apparatus 1 mainly includes: a paper feed portion 3 for supplying a sheet S to the inside of the apparatus main body 2; an exposure apparatus 4; the process cartridge 5, which transfers a toner image onto the sheet S; and a fixing apparatus 8 which thermally fixes the toner image transferred onto the sheet S. The paper feed portion 3 mainly includes a paper feed tray 31 provided in a lower part of the apparatus main body 2, and a paper feed mechanism 32. The sheet S, which is held in the paper feed tray 31, is fed toward the process cartridge 5 (between the photosensitive drum 61 and a transfer roller 63) by the paper feed mechanism 32. The exposure apparatus 4 is disposed in an upper part of the apparatus main body 2, and includes a laser light emitting portion (not shown), as well as a polygon mirror, a lens, a reflecting mirror, and the like, which are not given reference signs. This exposure apparatus 4 exposes a surface of the photosensitive drum 61 by scanning the surface of the photosensitive drum 61 at a high speed with a laser beam that is emitted from the laser light emitting portion and is based on image data.

The process cartridge 5 is disposed below the exposure apparatus 4. The configuration is such that the process cartridge 5 is mounted in the apparatus main body 2 by being inserted, in an insertion direction S1, into a holding portion 23 of the apparatus main body 2 from an opening exposed when a door (an opening/closing member) 21 provided in the apparatus main body 2 is open (indicated by a dot-dash line in FIG. 1). When removing the process cartridge 5 from the apparatus main body 2, the process cartridge 5 is moved in a removal direction S2 and removed. The process cartridge 5 mainly includes the photosensitive member unit 6 and the developing unit 7. The photosensitive member unit 6 mainly includes the photosensitive drum 61, a charging apparatus 62, and the transfer roller 63. The developing unit 7 is configured to be removably attached to the photosensitive member unit 6. The developing unit 7 mainly includes the developing roller 71, a supply roller 72, a layer thickness regulating blade 73, a toner holding portion (developer holding portion) 74 which holds toner (developer), and a first agitator 75A and a second agitator 75B provided within the toner holding portion 74.

Image Formation Process

An image formation process performed using this process cartridge 5 will be described next. The photosensitive drum 61 is rotationally driven while the image formation process is underway. First, the surface of the photosensitive drum 61 is uniformly charged by the charging apparatus 62, and is then exposed by laser light which is emitted from the exposure apparatus 4 and which corresponds to image data, forming an electrostatic latent image corresponding to the image data on the photosensitive drum 61.

Meanwhile, the toner within the toner holding portion 74 is agitated by the second agitator 75B and the first agitator 75A, and is supplied to the developing roller 71 by the supply roller 72. The toner supplied to the developing roller 71 advances between the developing roller 71 and the layer thickness regulating blade 73, and is held on the developing roller 71 as a thin layer having a constant thickness. The toner held on the developing roller 71 is supplied to the electrostatic latent image formed on the photosensitive drum 61. The toner adheres to the electrostatic latent image and becomes a visible image, and a toner image is formed on the photosensitive drum 61 as a result. The sheet S is then conveyed to the area between the photosensitive drum 61 and the transfer roller 63, and the toner image on the photosensitive drum 61 is transferred onto the sheet S. Untransferred toner remaining on the photosensitive drum 61 at this time is collected by the developing roller 71 and returned to the developing unit 7.

The fixing apparatus 8 is disposed to the rear of the process cartridge 5, and mainly includes a heat roller 92 and a pressure roller 91. The sheet S to which the toner image has been transferred traverses the fixing apparatus 8, at which time the sheet S is heated and compressed by the heat roller 92 and the pressure roller 91, which fixes the toner image onto the sheet S. The sheet S which has traversed the fixing apparatus 8 is discharged onto a paper discharge tray 22.

Configuration of Process Cartridge

The various units of the process cartridge 5 will be described next. As described above, the process cartridge 5 includes the photosensitive member unit 6, and the developing unit 7 which is attachable to and detachable from the photosensitive member unit 6.

Configuration of Developing Unit

Figure 2:
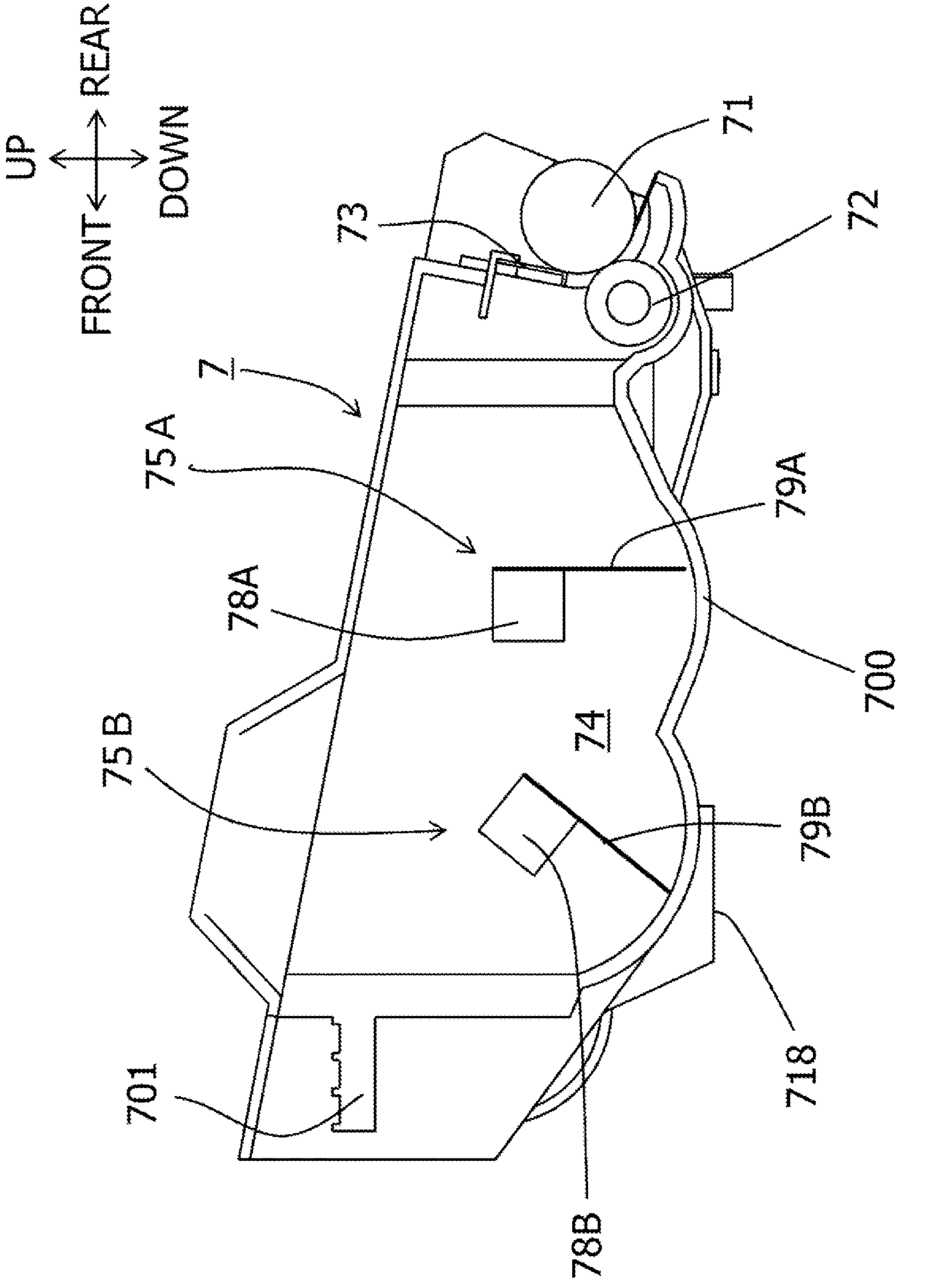
FIG. 2 is a cross-sectional view of a developing unit.
Figure 3:
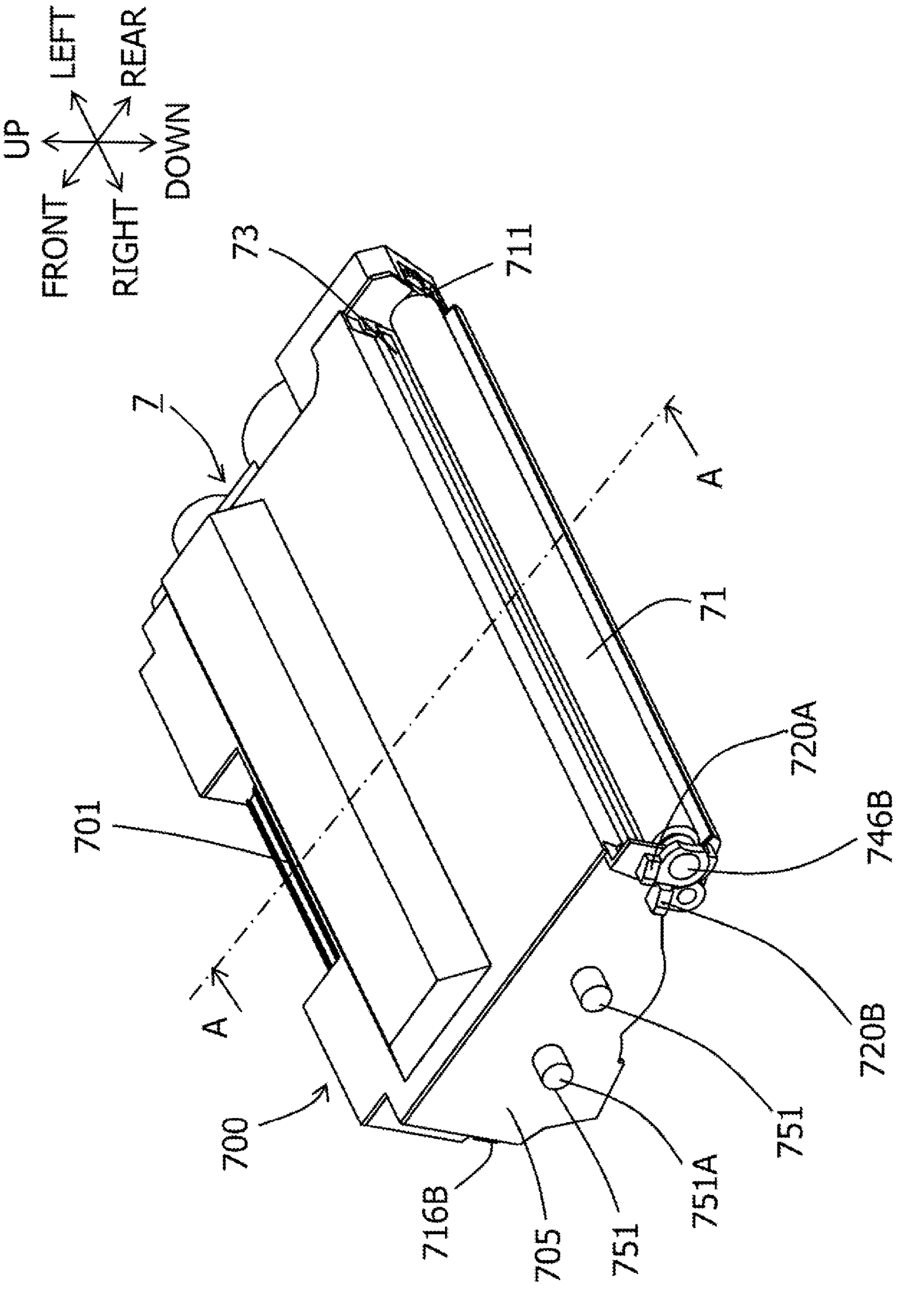
FIG. 3 is a perspective view of a developing unit.
Figure 4:
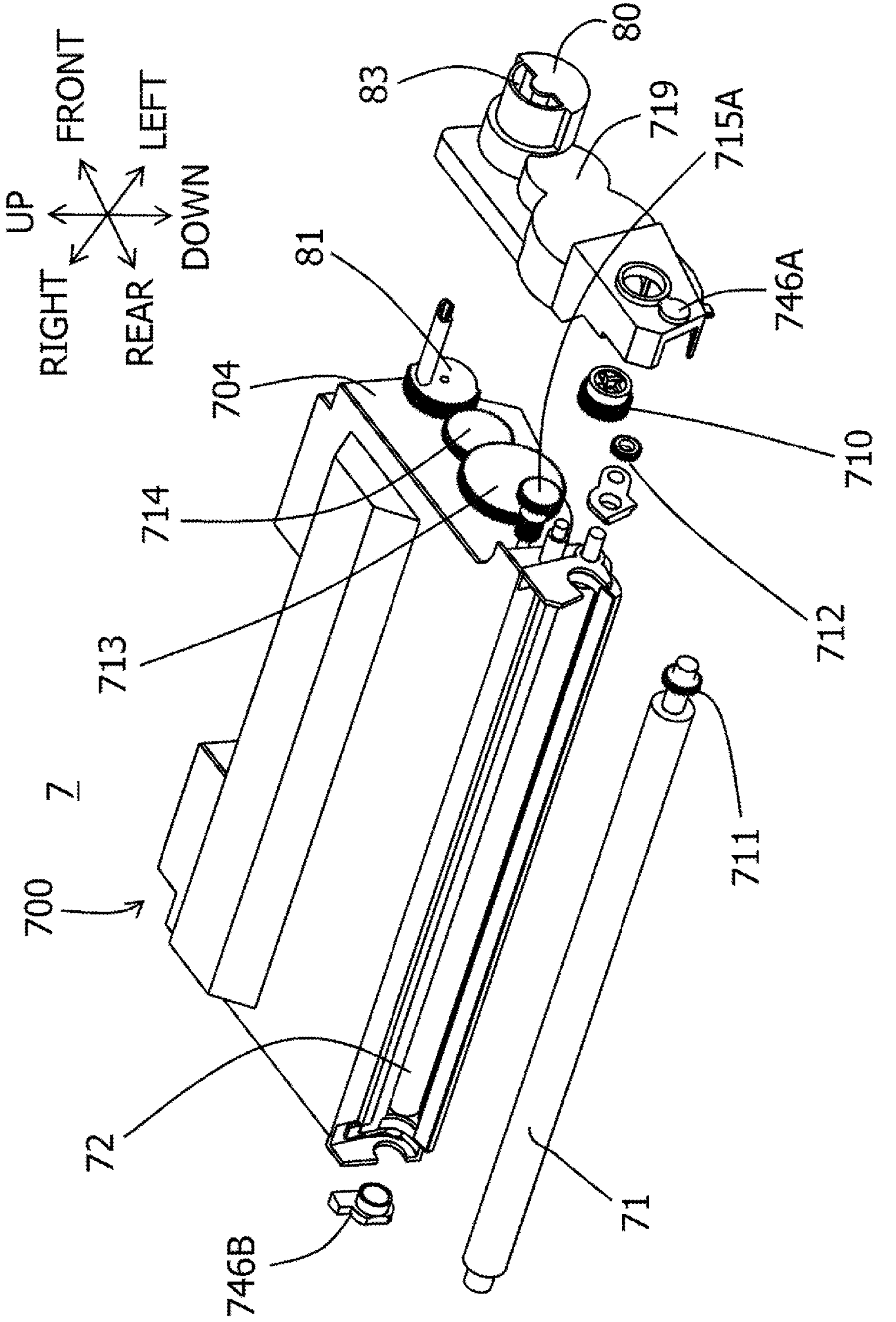
FIG. 4 is an exploded perspective view of the developing unit.
Figure 5:
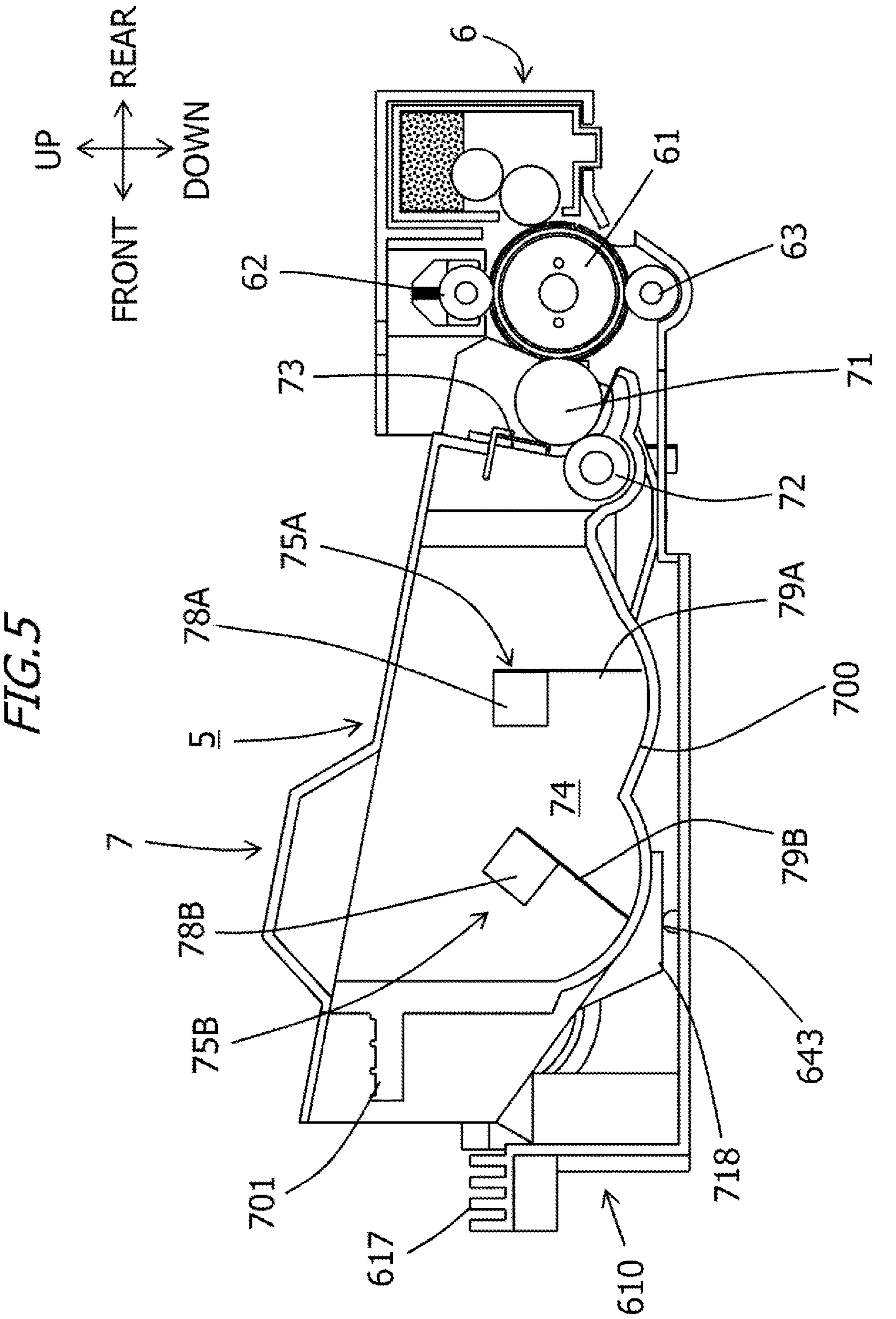
FIG. 5 is a cross-sectional view of the process cartridge.
Figure 6:
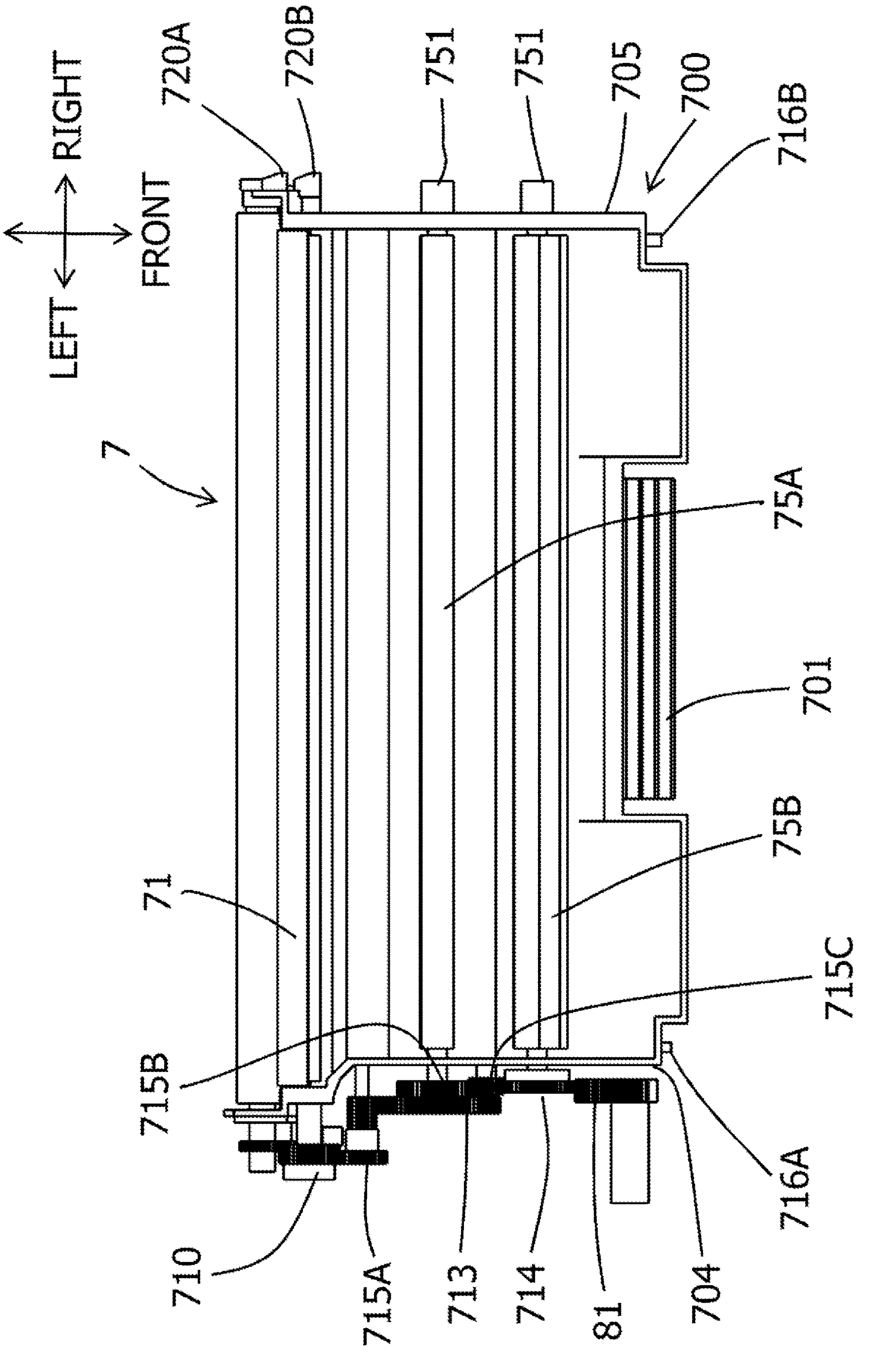
FIG. 6 is a top view of the developing unit.
Figure 7:
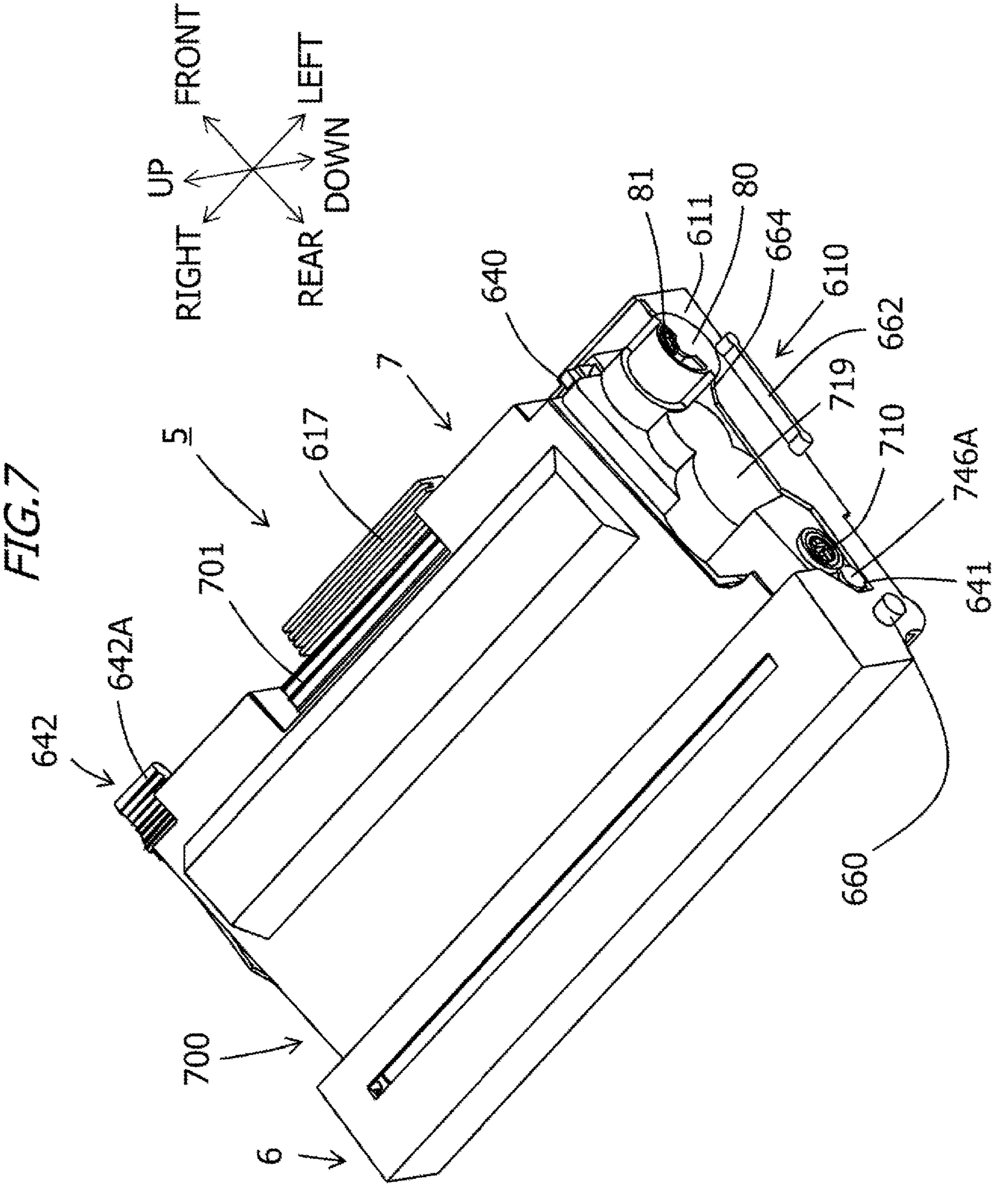
FIG. 7 is a perspective view of the process cartridge.

The configuration of the developing unit 7 will be described first. FIG. 2 is a cross-sectional view of the developing unit 7, and is a cross-sectional view taken from a line A-A indicated in FIG. 3. FIG. 3 is a perspective view of the developing unit 7 from above, and FIG. 7 is a perspective view of the process cartridge 5 from above. FIG. 4 is an exploded perspective view of the developing unit 7. FIG. 5 is a cross-sectional view of the developing unit 7 when mounted in the photosensitive member unit 6, the cross-section being parallel to the up-down direction and the front-rear direction. FIG. 6 is a top view of the developing unit 7, and for the purposes of the descriptions, illustrates a state in which a top surface of a housing 700 and a side holder 719 have been removed.

As illustrated in FIG. 2, the developing unit 7 includes, on the front of the housing 700 serving as a developing frame body, a grip portion 701 which is gripped by a user, and in a rear part of the developing unit 7, the developing roller 71 is rotatably supported. When describing the configuration of the developing unit 7 hereinafter, the direction of the rotation axis line of the developing roller 71 will be referred to as an “axial direction”.

As illustrated in FIGS. 4 and 6, the developing roller 71, the supply roller 72, the first agitator (first stirring member) 75A, and the second agitator (second stirring member) 75B are each rotatably supported at both ends by a left side wall 704 and a right side wall 705 of the housing 700. A developing coupling 710, a developing roller gear 711, a supply roller gear 712, a first agitator gear 713, a second agitator gear 714, and idle gears 715A, 715B, and 715C are provided further to the left side than the left side wall 704 of the housing 700. The developing roller gear 711 is fixed to an end part of the developing roller 71, and the supply roller gear 712 is fixed to an end part of the supply roller 72. Furthermore, the first agitator gear 713 is fixed to an end part of a stirring rod 78A of the first agitator 75A (see FIG. 5), and the second agitator gear 714 is fixed to an end part of a stirring rod 78B of the second agitator 75B (see FIG. 5).

As illustrated in FIG. 3, the developing unit 7 is provided with a first electrical contact point 720A, which is electrically connected to the developing roller 71 and to which a voltage to be applied to the developing roller 71 is supplied, and a second electrical contact point 720B, which is electrically connected to the supply roller 72 and to which a voltage to be applied to the supply roller 72 is supplied. These electrical contact points supply power to the developing roller 71 and the supply roller 72 by making contact with power supply points (not shown) provided in the apparatus main body 2.

In tandem with an action of closing the door 21 provided in the apparatus main body 2, a developing drive transmission member (not shown) provided in the apparatus main body 2 moves to a position for engaging with the developing coupling 710. Conversely, in tandem with an action of opening the door 21, the developing drive transmission member moves to a position of disengaging from the developing coupling 710.

When the apparatus main body 2 operates after the door 21 has been closed, drive force is transmitted (input) from the developing drive transmission member to the developing coupling 710, which serves as a drive force receiving member. This drive force enables the developing roller 71 to be rotated via the developing roller gear 711, and the supply roller 72 to be rotated via the supply roller gear 712, from a gear provided on an outer circumferential surface of the developing coupling 710. The developing drive transmission member is configured to be capable of transmitting the drive force to the developing coupling 710 with an allowance provided for positional skew within a predetermined range of the developing coupling 710. Movement of the developing coupling 710, the developing roller gear 711, and the supply roller gear 712 in the axial direction is regulated by the side holder 719, which is attached to the housing 700.

The developing unit 7 stirs the toner within the toner holding portion 74 using the first agitator 75A and the second agitator 75B. The first agitator 75A includes the stirring rod 78A and a stirring sheet 79A. The first agitator 75A is configured to be capable of rotating by receiving drive force from the developing coupling 710 via the idle gear 715A, using the first agitator gear 713. The second agitator 75B includes the stirring rod 78B and a stirring sheet 79B. The second agitator 75B is configured to be capable of rotating by receiving drive force from the first agitator gear 713 via the idle gears 715B and 715C, using the second agitator gear 714.

The second agitator 75B supplies toner from within the toner holding portion 74 to the first agitator 75A. Toner in the toner holding portion 74 which is near the first agitator 75A is stirred by the first agitator 75A, supplied to the supply roller 72, and is furthermore supplied to the developing roller 71 by the supply roller 72.

Additionally, as illustrated in FIGS. 4 and 7, a detection portion 80 is provided at a left end part of the developing unit 7. The detection portion 80 is included so that a state of a detection member 81 provided within can be detected by a detection mechanism (not shown) provided in the apparatus main body 2. Whether the developing unit 7 has or has not yet been used can be determined on the basis of the state of the detection member 81.

Figure 8A:
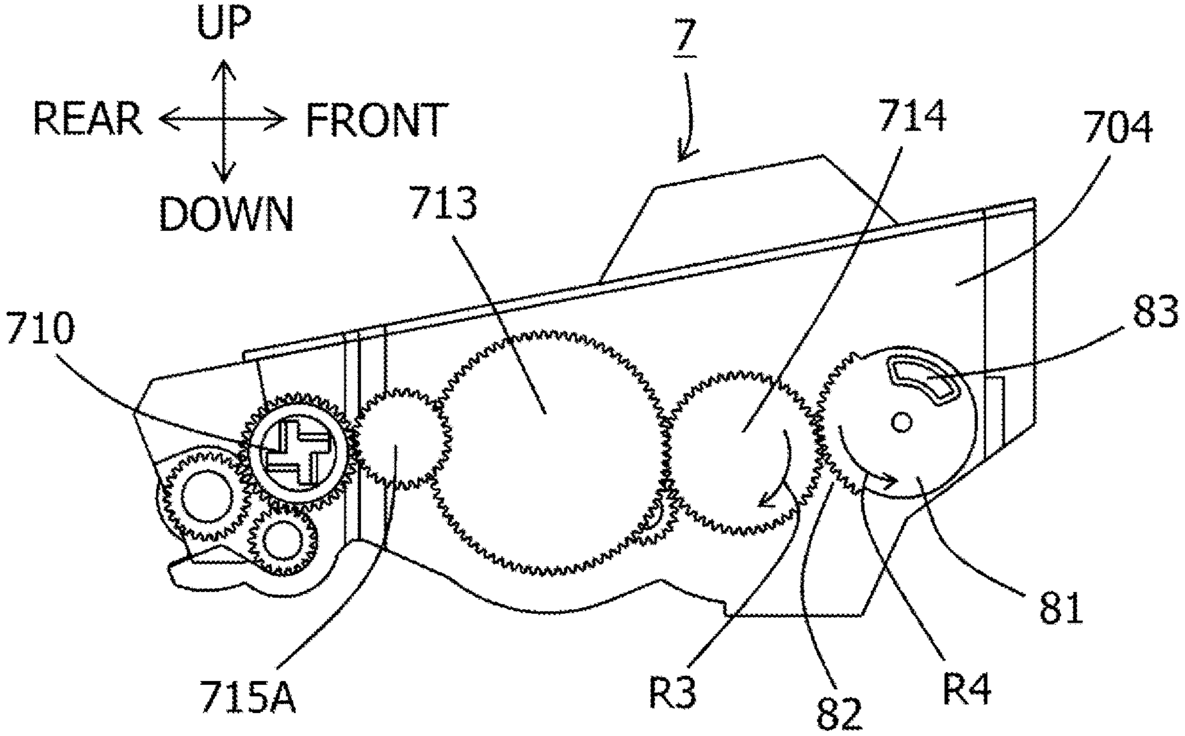
FIGS. 8A and 8B are diagrams illustrating a detection member.
Figure 8B:
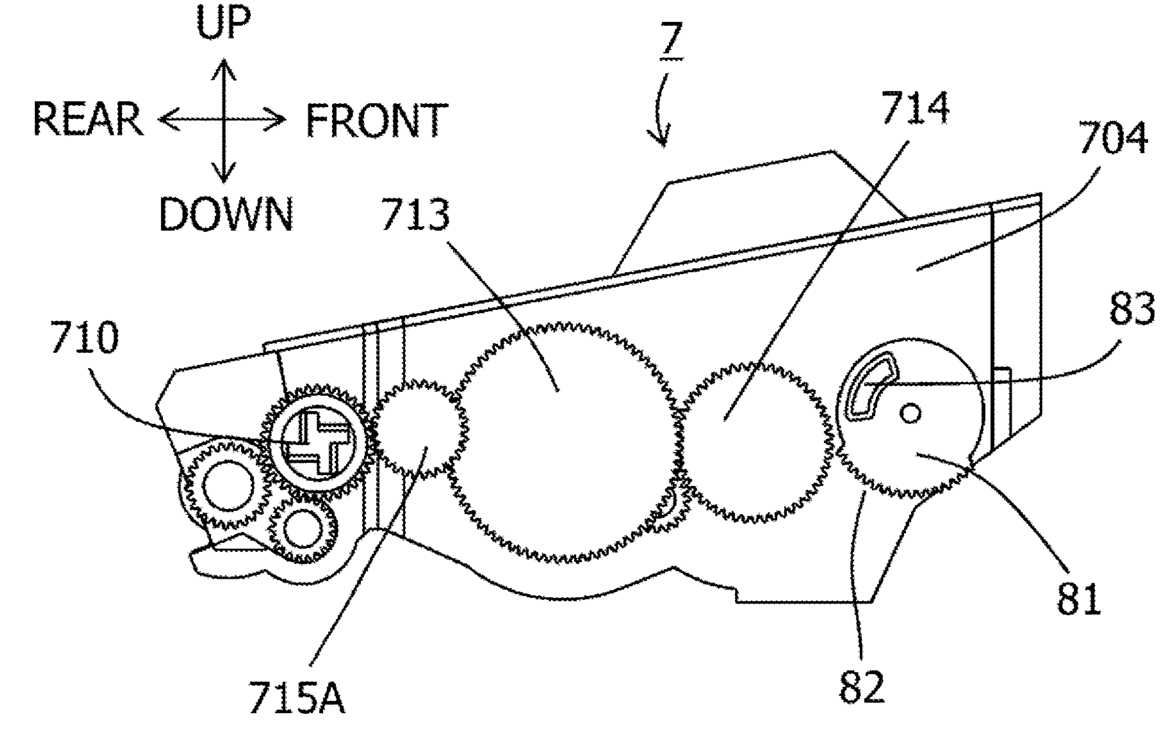

Actions of the detection member 81 will be described with reference to FIGS. 8A and 8B. FIGS. 8A and 8B are side views of the developing unit 7 taken from the left side. For descriptive purposes, the drawing illustrates a state in which the side holder 719 is removed. As illustrated in FIG. 8A, the detection member 81 is provided with a detection projection 83 and a detection gear 82. The detection gear 82 is a partially-toothed gear, as indicated in FIGS. 8A and 8B. The detection member 81 receives drive force from the second agitator gear 714 on the detection gear 82.

FIG. 8A illustrates a state in which the developing unit 7 has not yet been used. The detection projection 83 is located on the upper-front side of the detection member 81. Additionally, the detection gear 82 is meshing with the second agitator gear 714. When the developing unit 7 is used, the second agitator gear 714 rotates in the direction indicated by an arrow R3 in the drawing in response to the drive force received by the developing coupling 710 from the developing drive transmission member of the apparatus main body 2. The detection gear 82 and the second agitator gear 714 are meshing at this time, and thus the detection member 81 rotates in the direction indicated by an arrow R4 in the drawing.

FIG. 8B illustrates a state after the detection member 81 has rotated. Because the detection gear 82 is a partially-toothed gear, the detection member 81 stops rotating when the detection member 81 rotates in the direction indicated by the arrow R4 in the drawing and there are no more gear teeth which mesh with the second agitator gear 714. The detection projection 83 is located on the upper-rear side of the detection member 81 at this time. Whether the developing unit 7 has or has not been used can be determined by the detection mechanism (not shown) provided in the apparatus main body 2 detecting the position of the detection projection 83 of the detection member 81.

Figure 9:
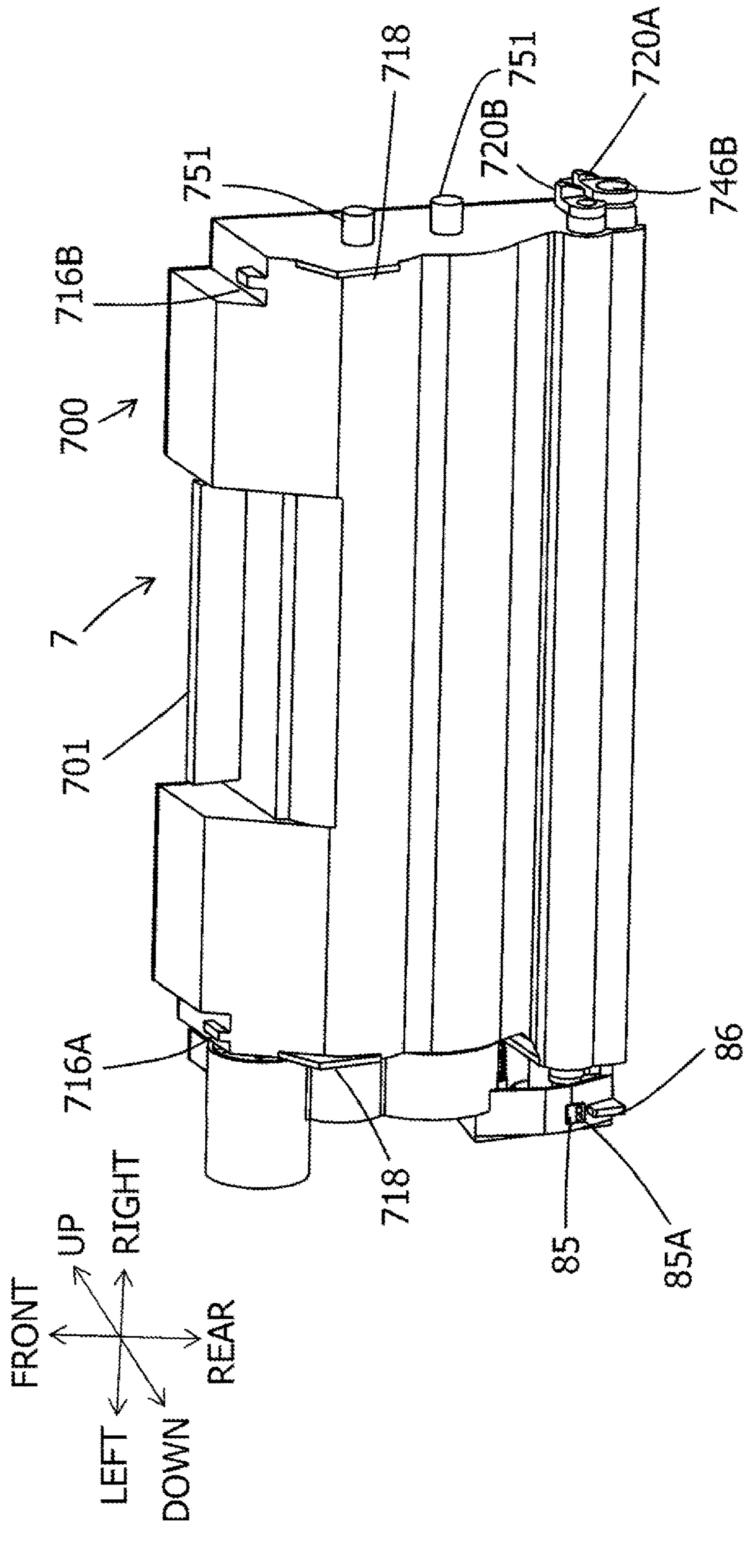
FIG. 9 is a perspective view of the developing unit.

FIG. 9 is a perspective view of the developing unit 7, seen from below. As illustrated in FIG. 9, memory 85 and a positioning projection 86 are provided on a bottom surface of the developing unit 7. The memory 85 includes a memory chip (not shown) which stores information pertaining to the developing unit 7, and a memory electrode 85A which is conductive with the memory chip. The memory electrode 85A contacts an electrode (not shown) provided in the apparatus main body 2, which enables the memory chip and the apparatus main body 2 to communicate.

Configuration of Photosensitive Member Unit and Support of Developing Unit

Figure 10:
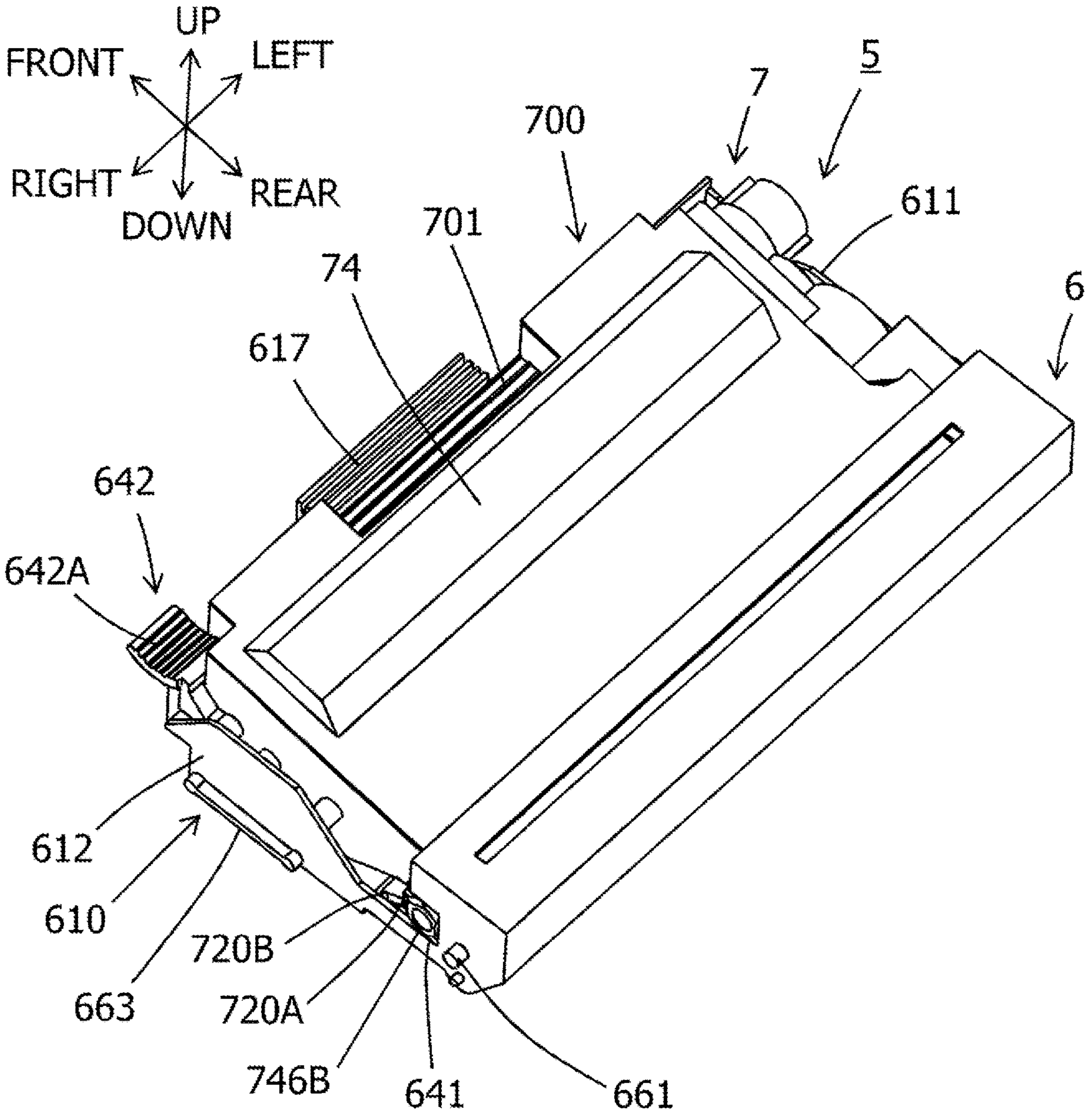
FIG. 10 is a perspective view of the process cartridge.
Figure 11A:
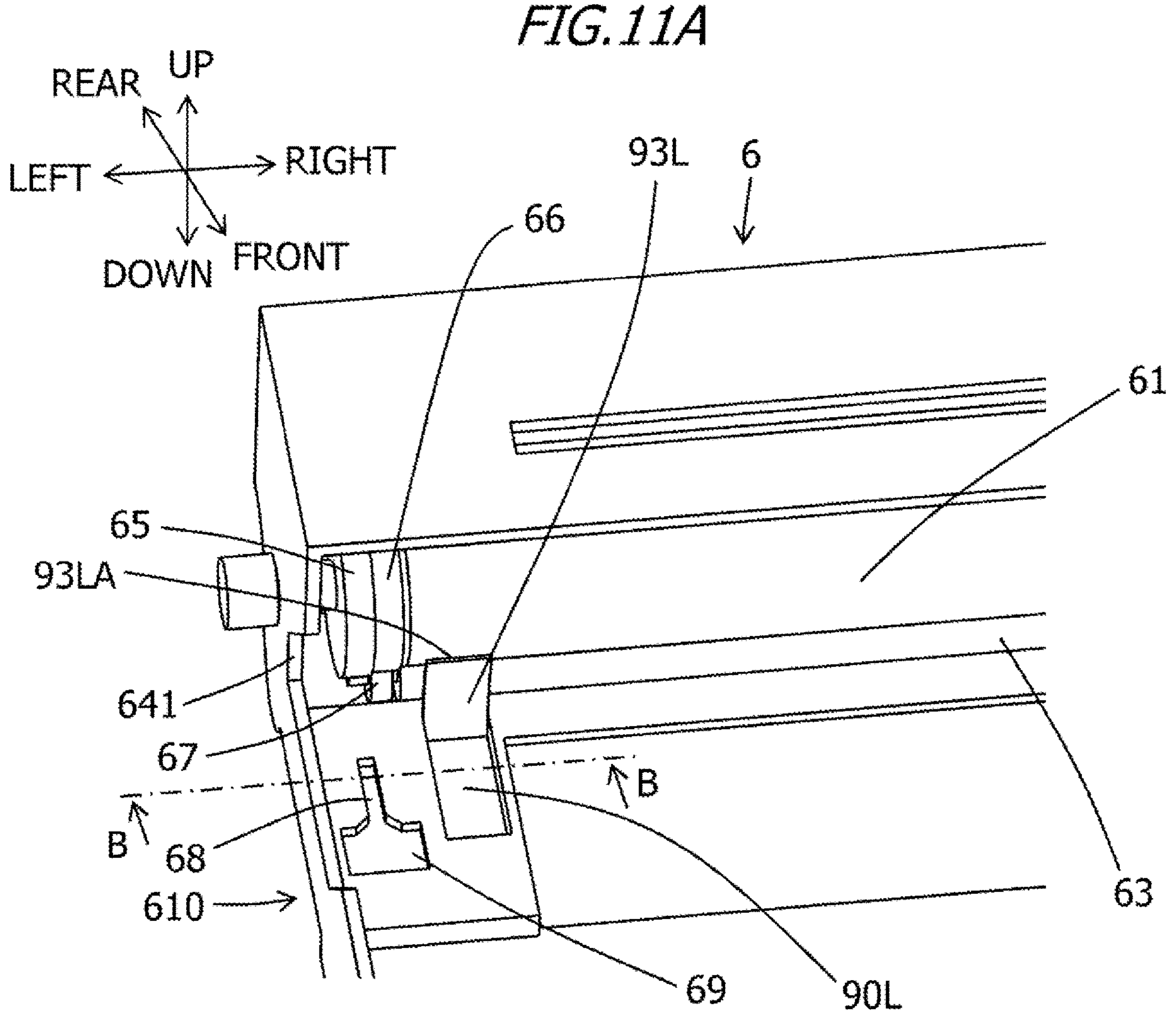
FIGS. 11A and 11B are exploded perspective views of a photosensitive member unit.
Figure 11B:
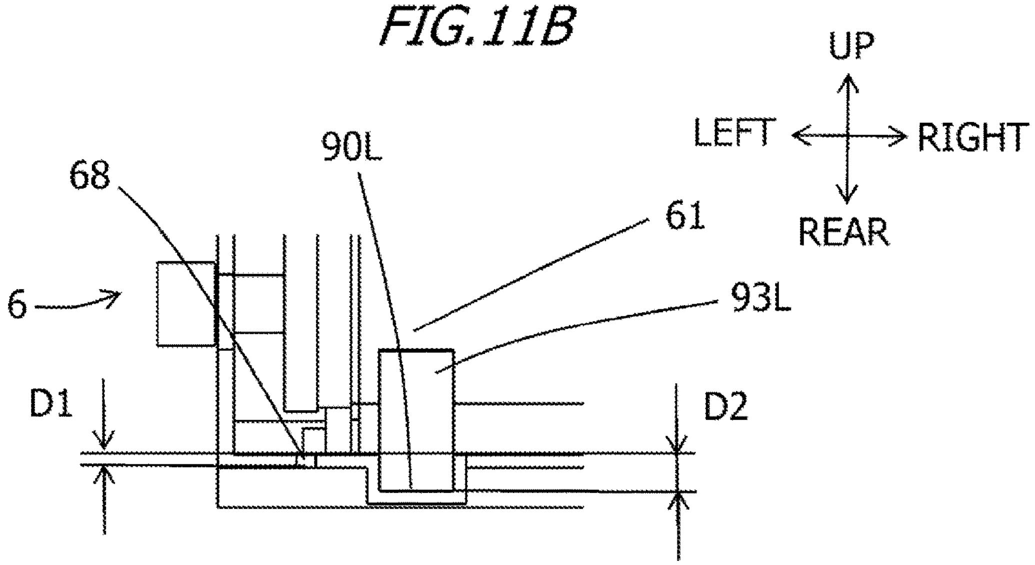
Figure 12:
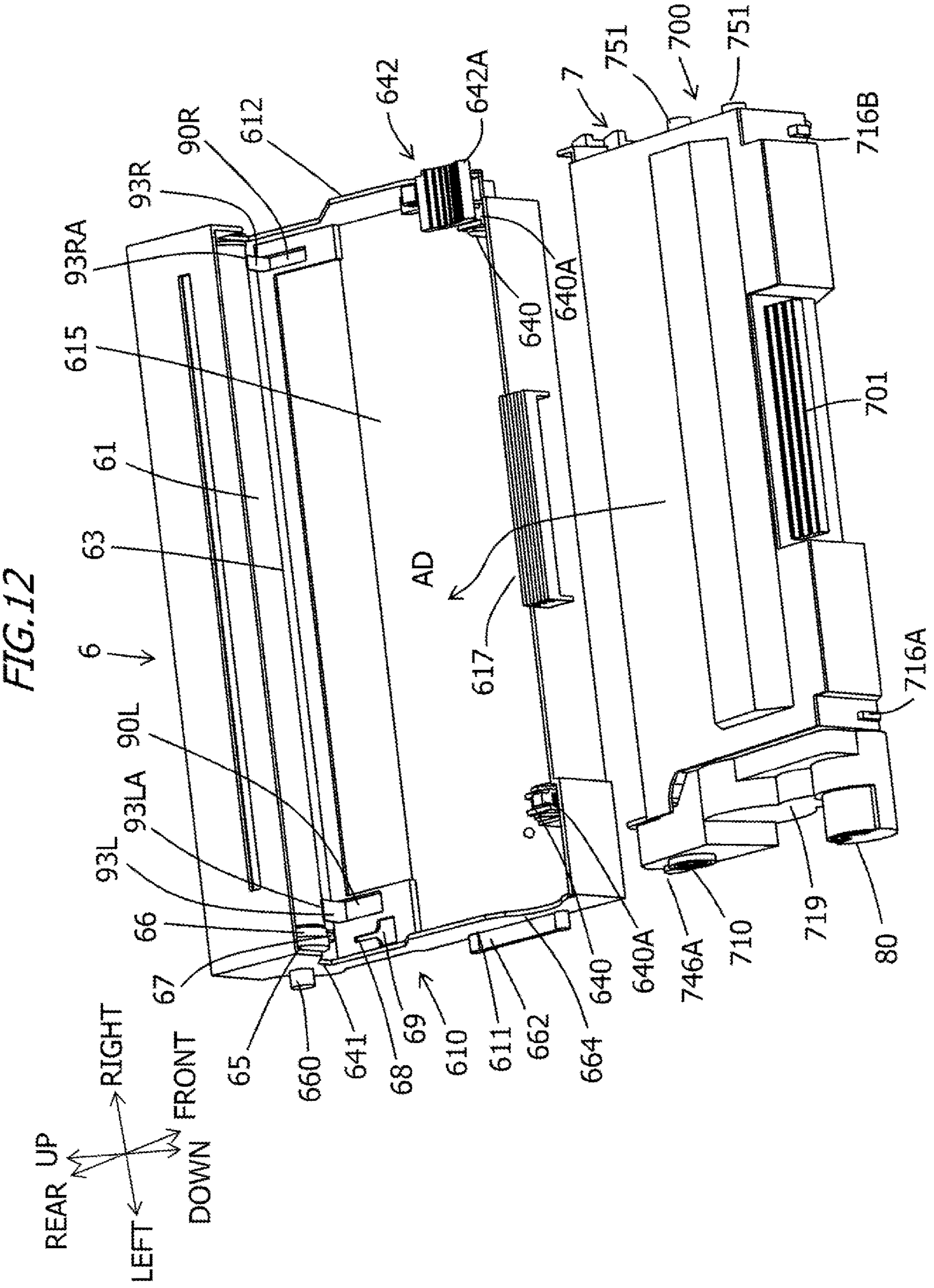
FIG. 12 is a perspective view of the developing unit and the photosensitive member unit.
Figure 13:
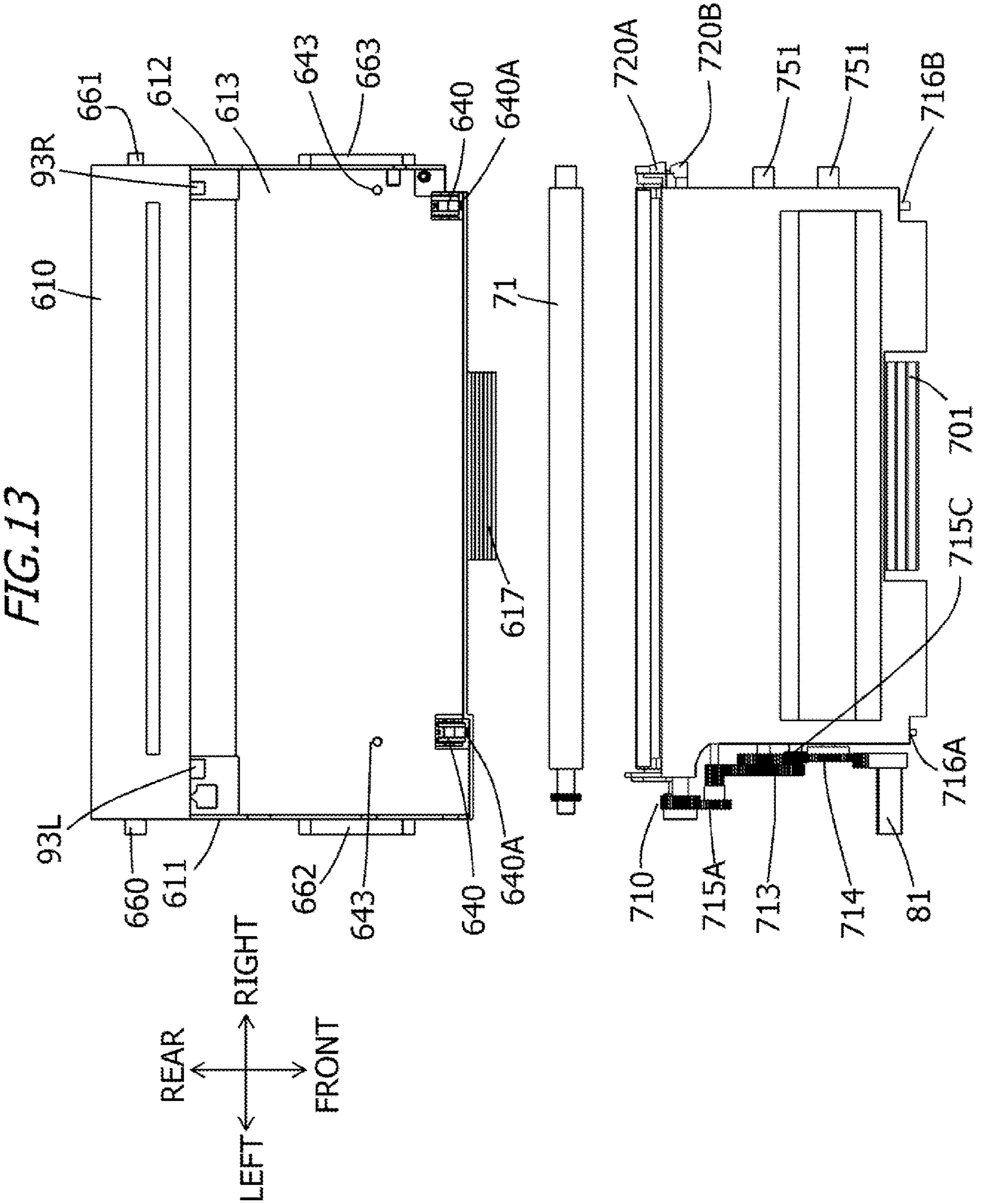
FIG. 13 is a top view of the developing unit and the photosensitive member unit.
Figure 14A:
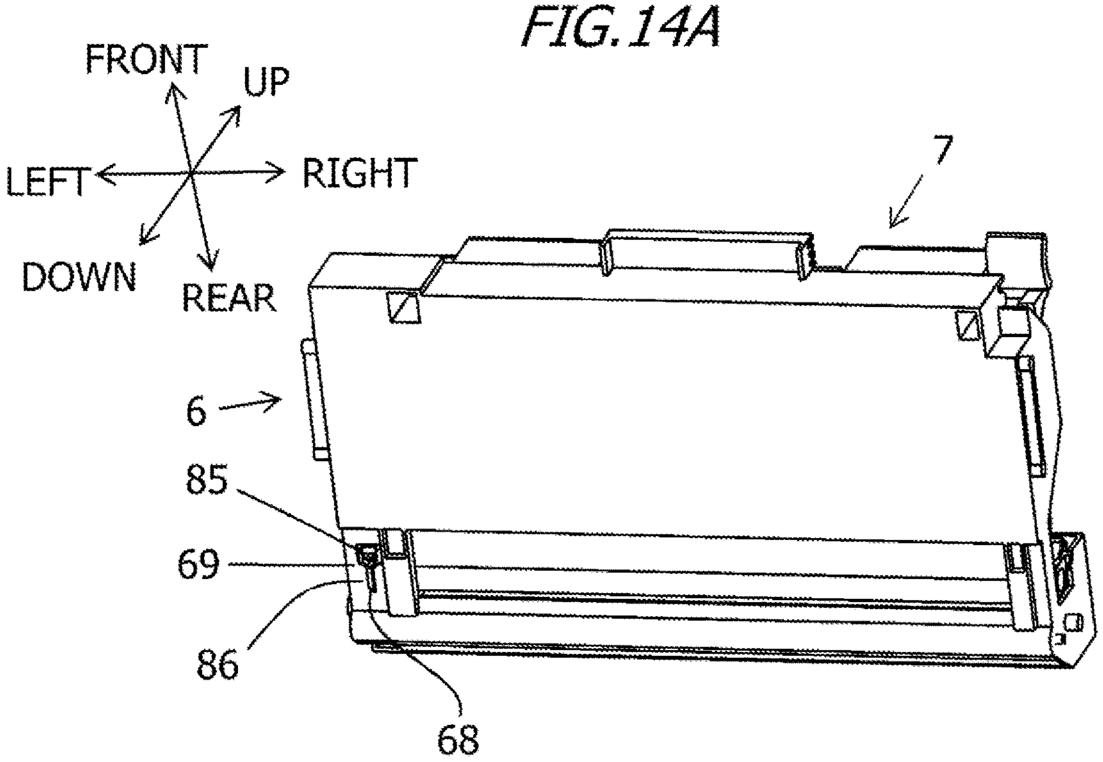
FIGS. 14A and 14B are perspective views of the process cartridge.
Figure 14B:
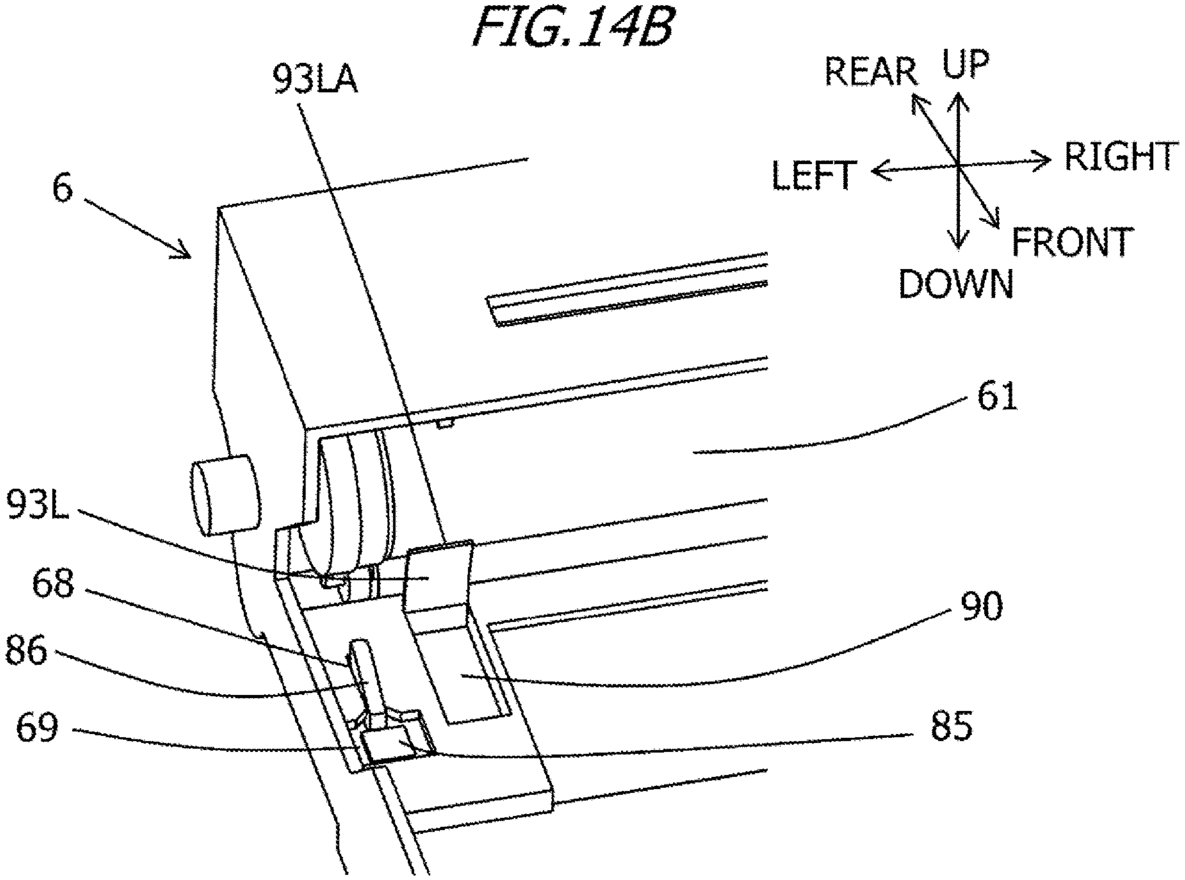

The configuration of the photosensitive member unit 6 will be described in detail next. FIG. 10 is a perspective view of the process cartridge 5. FIG. 11A is an exploded perspective view of the photosensitive member unit 6, and FIG. 11B is a cross-sectional view seen from a line B-B in FIG. 11A. FIG. 12 is a perspective view of the developing unit 7 and the photosensitive member unit 6. FIG. 13 is a top view illustrating positional relationships between the photosensitive member unit 6, the developing unit 7, and the developing roller 71 in the left-right direction. FIG. 14A is a perspective view of the process cartridge 5, taken from below, and FIG. 14B is a perspective view of a positioning portion in an axis line direction of the developing unit 7 and the photosensitive drum 61 of the photosensitive member unit 6. For descriptive purposes, only the positioning projection 86 and the memory 85 of the developing unit 7 are illustrated in FIG. 14B.

As illustrated in FIG. 10, the photosensitive member unit 6 mainly includes a frame 610, which has a pair of side walls, i.e., a left side wall 611 and a right side wall 612; and the photosensitive drum 61, which is rotatably supported toward the rear of the frame 610. The frame 610 includes, toward the front thereof, a mounting portion 615 (see FIG. 12), to which the developing unit 7 can be mounted; a grip portion 617, which a user can use to grip the photosensitive member unit 6; pressing members 640 which press the developing unit 7; and a lift member (movement member) 642, which lifts the developing unit 7. The lift member 642 presses and moves the developing unit 7 mounted to the mounting portion 615. The toner holding portion 74 of the developing unit 7, which is attached to the mounting portion 615, is disposed between the left side wall 611 and the right side wall 612 in the left-right direction.

A first positioning projection 660 which projects coaxially with the photosensitive drum from the left side wall 611, and a first guide rib 662, are provided toward the rear of the frame 610. Likewise, a second positioning projection 661 which projects coaxially with the photosensitive drum from the right side wall 612, and a second guide rib 663, are provided as well (see FIGS. 10 and 13).

The service life of the developing unit 7, which is determined by the amount of toner held in the developing unit 7, is set to be shorter than the service life of the photosensitive member unit 6, which is determined by the thickness of a photosensitive layer on the photosensitive drum 61. As such, it is necessary for a developing unit 7 which has reached the end of its service life to be replaced separately from the photosensitive member unit 6. In this case, the door 21 is opened and the process cartridge 5 is removed from the apparatus main body 2, the developing unit 7 which has reached the end of its service life is removed from the photosensitive member unit 6, and another developing unit 7 is then attached to the photosensitive member unit 6 as indicated by a mounting direction AD in FIG. 12. Then, the photosensitive member unit 6, to which the developing unit 7 has been attached, is mounted in the apparatus main body 2 as the process cartridge 5.

As illustrated in FIGS. 7, 10, and 12, a receiving portion 641, which receives rotation shaft bearing members 746A and 746B of the developing roller 71, is formed in the left side wall 611 and the right side wall 612 of the frame 610, further toward the front than the photosensitive drum 61. The receiving portion 641 is a substantially U-shaped depressed portion which, when viewed from the left side, is open to the front, and a rotation shaft 746 of the developing roller 71 is inserted into the receiving portion 641 during the process of mounting the developing unit 7 to the photosensitive member unit 6. The receiving portion 641 guides the movement of the developing unit 7 in the mounting direction AD, indicated in FIG. 12, while supporting the developing unit 7 on the photosensitive member unit 6.

Additionally, as illustrated in FIG. 13, projecting portions 643, which project upward, are provided on both end parts, in the left-right direction, of a bottom surface 613 of the frame 610. By making contact with ribs 718 provided in a bottom part of the housing 700 of the developing unit 7 (see FIG. 9), the projecting portions 643 support the developing unit 7 in a mobile state.

As illustrated in FIG. 12, a positioning hole 68 and a contact opening 69, which are provided in the frame 610, are provided at one end side of the photosensitive member unit 6 in the direction of the rotation axis line of the photosensitive drum 61 (the left-right direction). Here, "one end side" refers to the same side with respect to a bisecting line following the length of the photosensitive drum 61 in the left-right direction. When the developing unit 7 is installed in the photosensitive member unit 6, the positioning projection 86 of the developing unit 7 is inserted into the positioning hole 68 of the photosensitive member unit 6, as illustrated in FIGS. 14A and 14B. The positioning projection 86 and the positioning hole 68 engage in the axis line direction of the photosensitive drum 61 (the left-right direction), and the developing unit 7 is positioned relative to the photosensitive member unit 6 in the left-right direction as a result. Additionally, the memory 85 of the developing unit 7 is exposed on a lower part of the process cartridge 5 via the contact opening 69 in the photosensitive drum 61.

Here, as illustrated in FIGS. 11A and 14B, a depressed portion 90L, which has a box shape, is provided in the frame 610 of the photosensitive member unit 6, at one end side in the direction of the rotation axis line of the photosensitive drum 61 (the left-right direction). Seen from the direction of the rotation axis line of the photosensitive drum 61 (the left-right direction), the depressed portion 90L is provided in a position overlapping with the positioning hole 68. The depressed portion 90L reinforces a segment in the periphery of the positioning hole 68 which is weakened by the positioning hole 68 being provided, and thus increases the strength. As illustrated in FIG. 11B, a depth D2 of the depressed portion 90L is deeper than a depth D1 of the positioning hole 68, which increases the reinforcement effect. According to this configuration, the strength around the positioning hole 68 of the photosensitive member unit 6 is increased, and the precision with which the positioning projection 86 of the developing unit 7 and the positioning hole 68 of the photosensitive member unit 6 position those units in the left-right direction is increased. The precision with which the memory electrode 85A of the memory 85 and the electrode provided in the apparatus main body 2 are positioned also increases as a result, thus ensuring reliable electrode-to-electrode contact.

As illustrated in FIGS. 11A and 14B, a sheet member 93L is provided on the photosensitive drum 61 side of the depressed portion 90L. A leading end part 93LA of the sheet member 93L makes contact with the photosensitive drum 61. According to this configuration, unnecessary toner, foreign objects such as paper dust, and so on which have adhered to the surface of the photosensitive drum 61 when forming an image are removed by the leading end part 93LA, which prevents image defects. In this configuration, the unnecessary toner, foreign objects such as paper dust, and so on which have been removed fall into and are collected in the depressed portion 90L. This makes it possible to prevent the occurrence of image defects caused by foreign objects scattering and soiling the process cartridge 5, foreign objects falling onto the sheet S, and so on. Using the depressed portion 90L as a reinforcement structure and to collect foreign objects in this manner eliminates the need to provide a configuration for collecting foreign objects separate from the depressed portion 90L, and makes it possible to make the cartridge smaller, simplify the configuration, and so on.

As illustrated in FIG. 12, a foreign object box 90R, which includes a box-shaped depressed portion, is provided on the opposite side of the photosensitive member unit 6 from the positioning hole 68, in the left-right direction. A sheet member 93R is provided on the photosensitive drum 61 side of the foreign object box 90R. A leading end part 93RA of the sheet member 93R makes contact with the photosensitive drum 61. Like the above-described sheet member 93L, unnecessary toner, foreign objects such as paper dust, and so on which have adhered to the surface of the photosensitive drum 61 when forming an image are removed by the leading end part 93RA, which prevents image defects. The unnecessary toner, foreign objects such as paper dust, and so on which have been removed fall into and are collected in the foreign object box 90R.

As illustrated in FIG. 12, the pressing members 640 are provided toward the front of the frame 610, on both end parts of the frame 610 in the left-right direction. The pressing members 640 are biased toward the rear from the front by compression springs 640A serving as biasing members. Accordingly, under the biasing force of the compression springs 640A, the pressing members 640 press pressed ribs 716A and 716B, which are provided in the housing 700 of the developing unit 7. The developing roller 71 is biased toward the photosensitive drum 61 as a result of the developing unit 7 being pressed by the pressing members 640.

As illustrated in FIGS. 12 and 7, a depressed portion 664 is provided in the left side wall 611 of the photosensitive member unit 6, and the detection portion 80 of the developing unit 7 is located in the depressed portion 664. Providing the depressed portion 664 lowers the rigidity of the frame 610, and thus the first guide rib 662 is disposed therebelow so as to partially overlap therewith. The first guide rib 662 acts as a reinforcement member, which makes it possible to reduce the drop in the rigidity of the frame 610.

Additionally, as illustrated in FIGS. 11A and 11B, a photosensitive member gear (first gear) 65 and a transfer gear (second gear) 66 are fixed to a left end part of the photosensitive drum 61, and are configured to rotate integrally with the photosensitive drum 61. When the process cartridge 5 is mounted in the apparatus main body 2, a drive gear (not shown) of the apparatus main body 2 meshes with the photosensitive member gear 65, and as a result, drive force is transmitted to and enables the rotation of the photosensitive drum 61 and the transfer gear 66. Furthermore, the transfer gear 66 meshes with a transfer roller gear (third gear) 67 fixed to a left end part of the transfer roller 63, and the transfer roller 63 can therefore also rotate.

Lift Mechanism of Developing Unit 7

Figure 15:
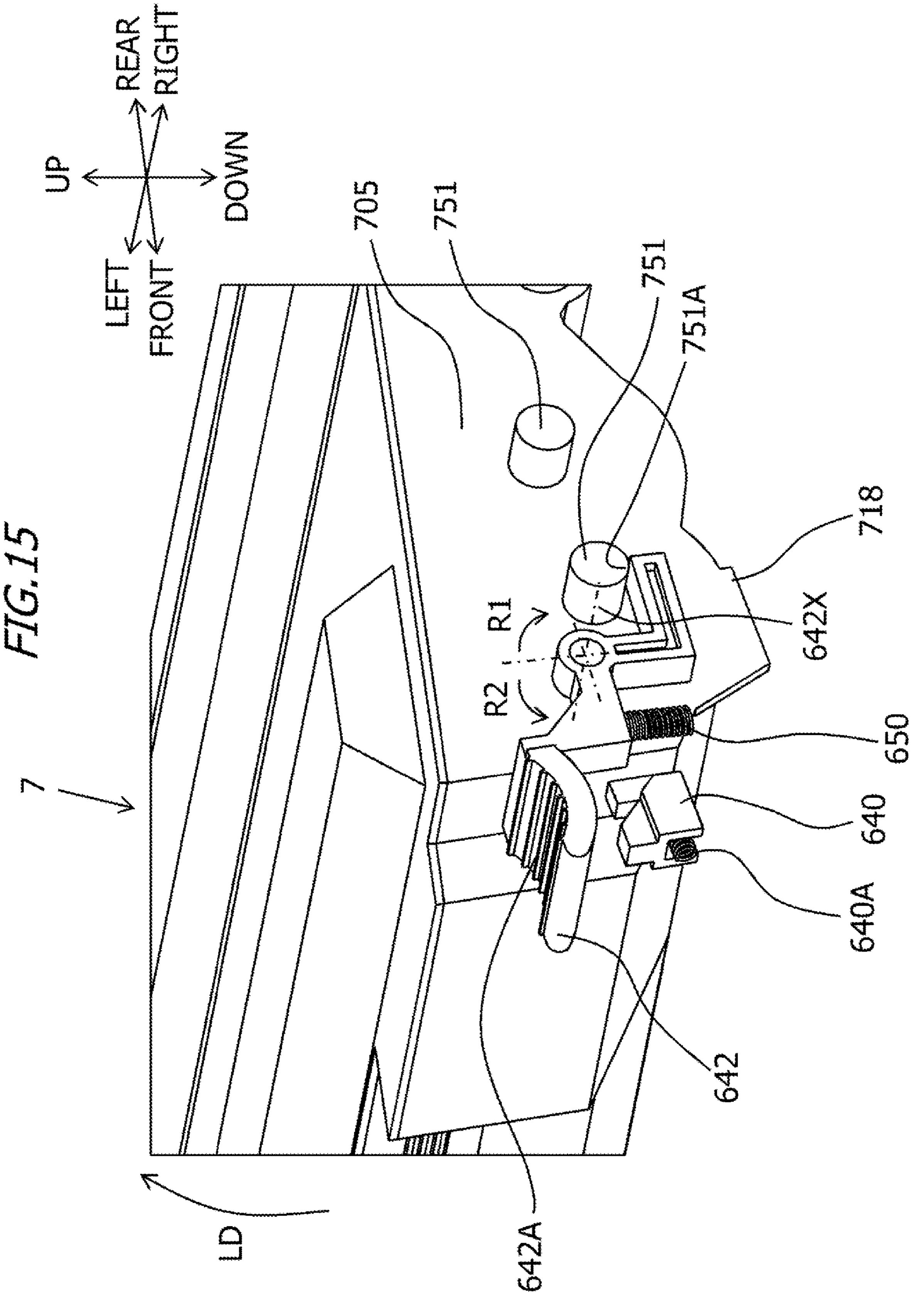
FIG. 15 is an exploded perspective view of the developing unit and a lift member.
Figure 16A:
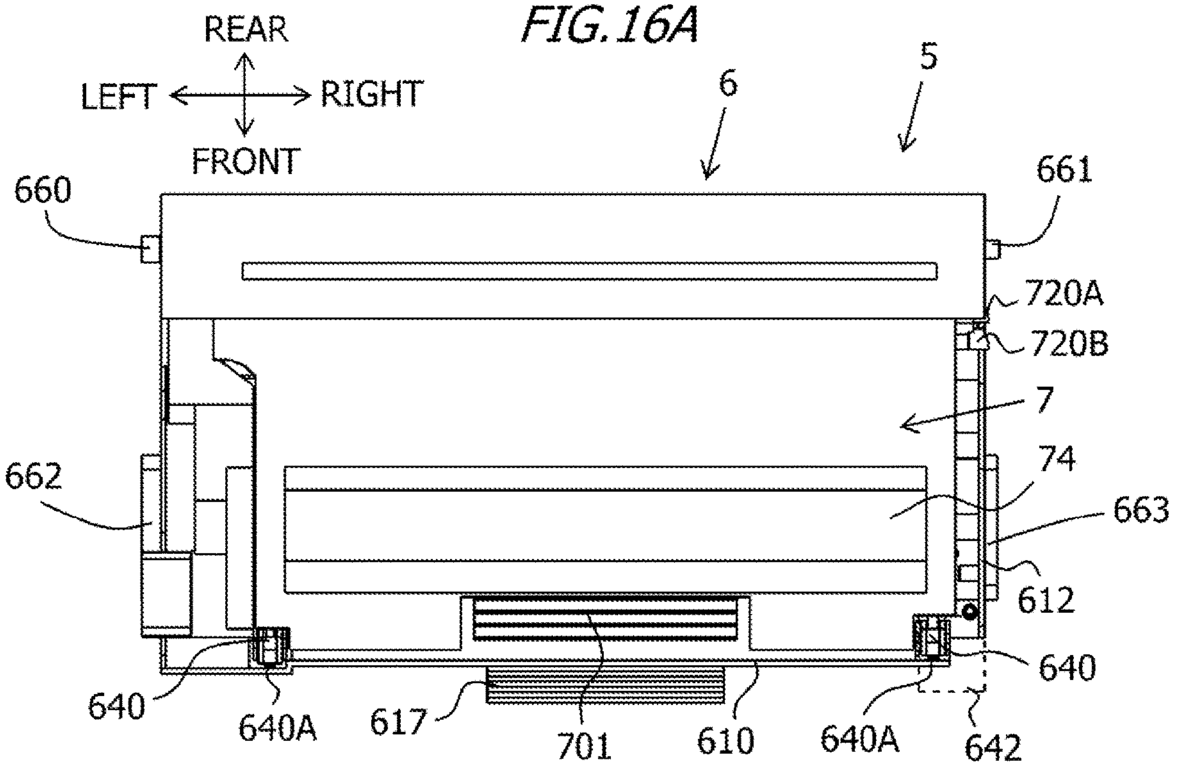
FIGS. 16A and 16B are diagrams illustrating a positional relationship between the lift member and a pressing member.
Figure 16B:
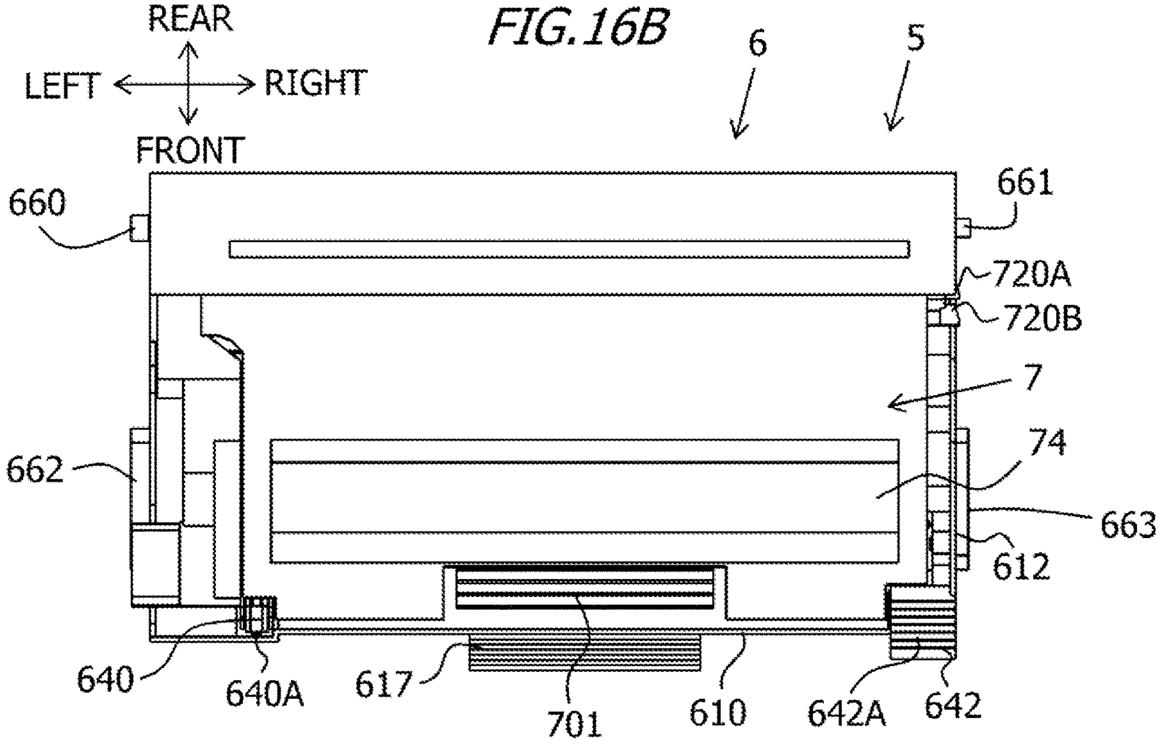
Figure 17A:
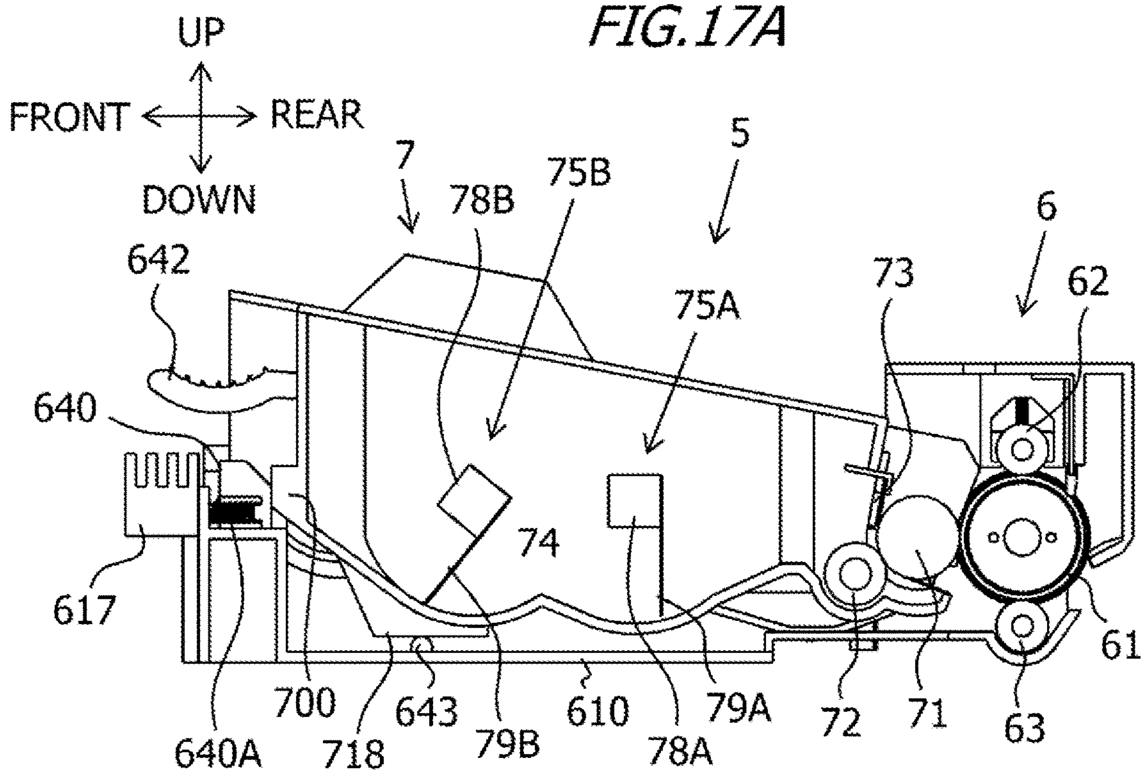
FIGS. 17A and 17B are diagrams illustrating separation of the developing unit.
Figure 17B:
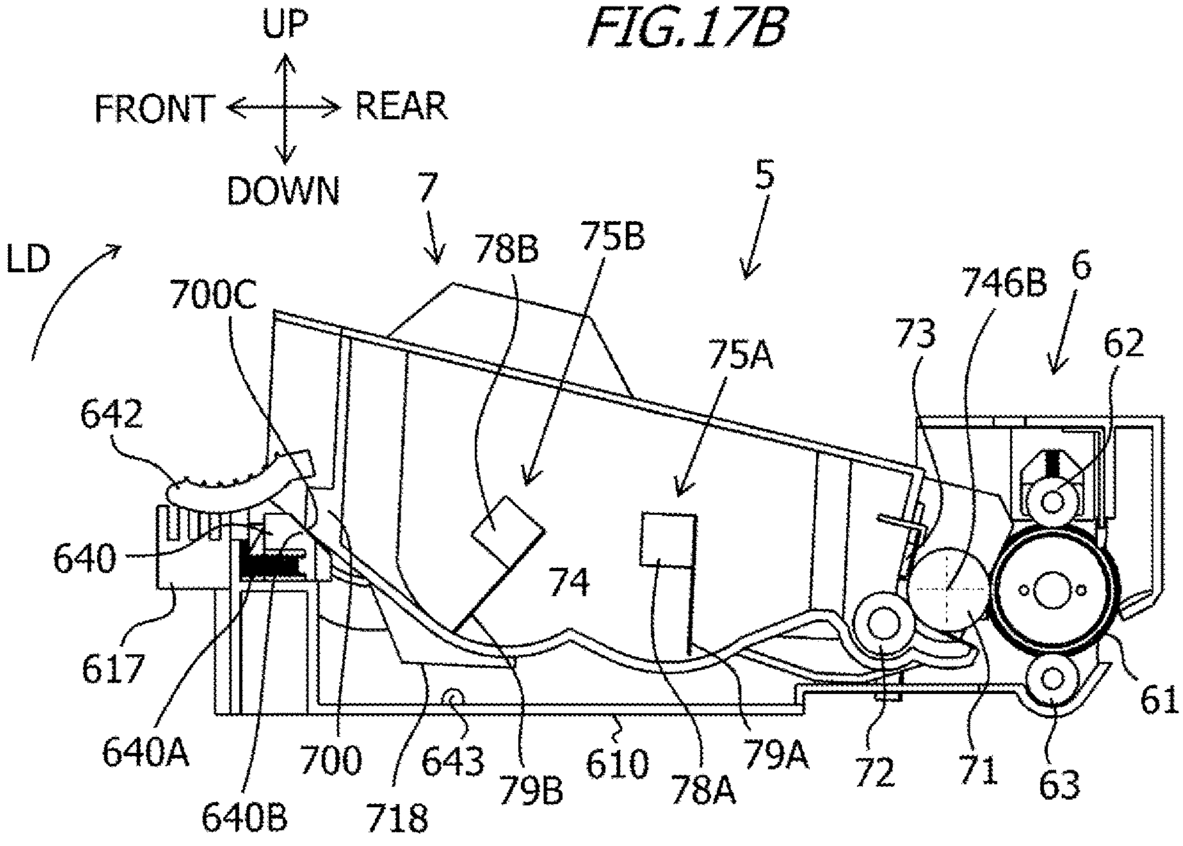

FIG. 15 is an exploded perspective view of the developing unit 7 and the lift member 642. FIGS. 16A and 16B are top views of the photosensitive member unit 6 in which the developing unit 7 is mounted, where FIG. 16A illustrates the lift member 642 in a see-through state, and FIG. 16B illustrates the lift member 642 in a non-see-through state. FIGS. 17A and 17B are cross-sectional views of the photosensitive member unit 6 and the developing unit 7, the cross-sections being parallel to the up-down direction and the front-rear direction. FIG. 17A illustrates a state in which the developing unit 7 is mounted in the photosensitive member unit 6, and FIG. 17B illustrates a state in which the developing unit 7 is placed on top of the photosensitive member unit 6. The developing unit 7 which is mounted in the photosensitive member unit 6 is moved to a lifted-up state by a lift mechanism, and is then removed from the photosensitive member unit 6. The lift mechanism will be described in detail below.

As illustrated in FIGS. 15, 17A, and 17B, at least part of the lift member 642 is rotatably supported by the right side wall 612 in a state where the lift member 642 receives a force from a compression spring 650, while being disposed to the front of the housing 700 of the developing unit 7. Additionally, the lift member 642 is disposed so as to at least partially overlap, in the front-rear direction, with the right side wall 705 of the housing 700 which holds toner and the pressing member 640. A rotation axis line 642X of the lift member 642 is parallel to the left-right direction (the axis line direction of the photosensitive drum 61). The lift member 642 is biased by the force from the compression spring 650 to rotate in the direction R1.

When a user presses an operation portion 642A of the lift member 642 against the force of the compression spring 650 and rotates the lift member 642 in the direction R2, the lift member 642 presses a projecting portion 751 and causes the developing unit 7 to move in a separation direction LD, separating from the photosensitive member unit 6. This creates a state in which the developing unit 7 can be removed from the photosensitive member unit 6. The operation portion 642A is disposed on the right end part side (one end part side) of the photosensitive member unit 6.

As illustrated in FIG. 17A, in a mounted state in which the developing unit 7 is mounted in the photosensitive member unit 6, the developing roller 71 is pressed toward the photosensitive drum 61 as a result of the housing 700 being pressed by the pressing members 640. Additionally, the developing unit 7 is locked so as not to separate from the photosensitive member unit 6 by the pressing members 640. As illustrated in FIG. 15, one end of the lift member 642 moves a contact surface (contact region) 751A of the projecting portion 751 of the housing 700 upward. Accordingly, the developing unit 7 can be moved from a mounted position, in which the developing unit 7 is mounted to the mounting portion 615 (see FIG. 12), in the separation direction LD, and can be separated from the photosensitive member unit 6.

As illustrated in FIG. 17B, when a front part of the developing unit 7 separates from the photosensitive member unit 6, the developing unit 7 is held in a provisionally-supported position, in which a supported surface 700*c* of the housing 700 is supported by a holding portion 640B of the pressing members 640. In the developing unit 7 which is in this provisionally-supported position, the rotation shaft bearing member 746B (746A) of the developing roller 71 is supported by the receiving portion 641. This state will be called a "lifted-up state". At this time, the lock (i.e., the developing unit 7 being restricted from being removed from the photosensitive member unit 6) is canceled. If, in this lifted-up state, the user grips the grip portion 701 and lifts the developing unit 7 upward, the developing unit 7 can be removed from the photosensitive member unit 6 without moving other members or the like. In this manner, the user can remove the developing unit 7 from the photosensitive member unit 6 and mount a new developing unit 7 in the photosensitive member unit 6.

Embodiment 1

Figure 18A:
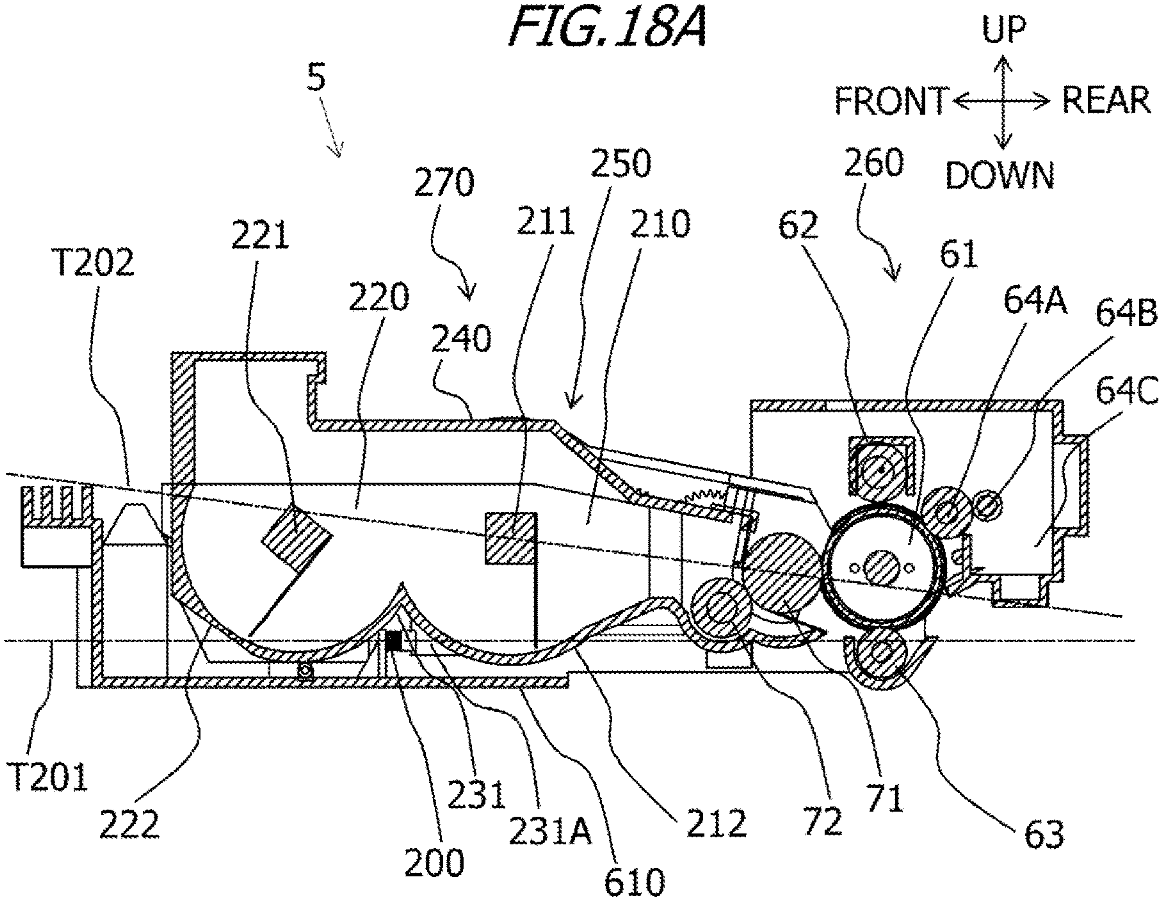
FIGS. 18A and 18B are cross-sectional views of a process cartridge according to Embodiment 1.
Figure 18B:
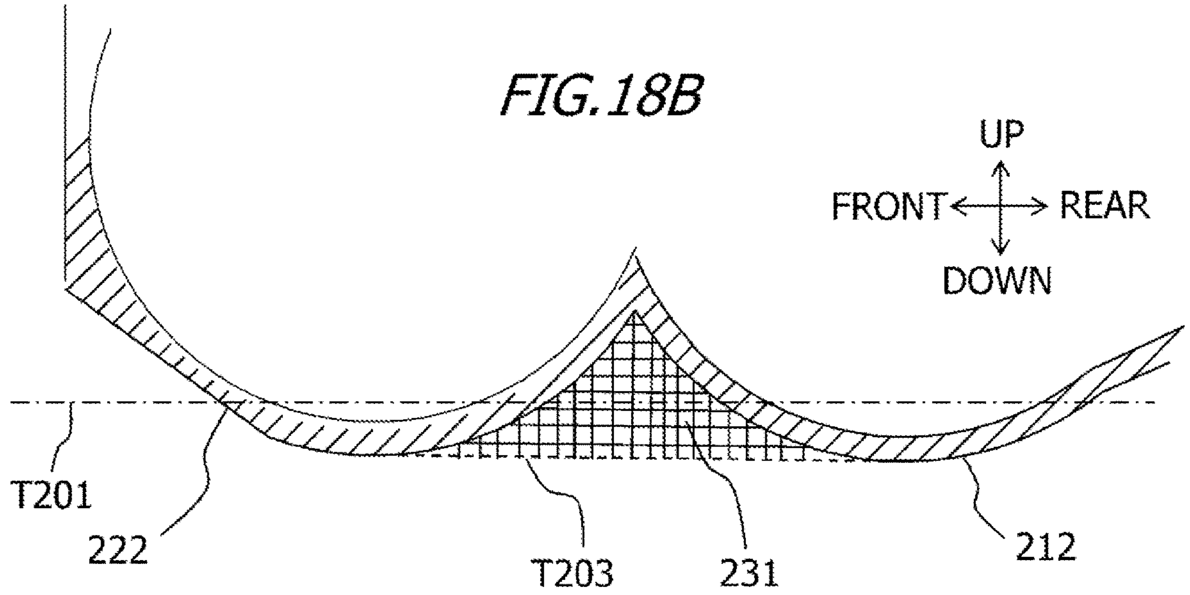

Embodiment 1 according to the present invention will be described next with reference to FIGS. 18A and 18B. Note that this embodiment will describe, in detail, parts that differ from the configurations of the image forming apparatus 1 and the process cartridge 5 described above. Unless explicitly mentioned again, the configurations are the same as the image forming apparatus 1 and the process cartridge 5 described above. Such parts will be given the same reference signs, and will not be described in detail. FIG. 18A is a cross-sectional view of a pressing configuration of a developing unit 270 implemented by a pressing member 200 when the developing unit 270 is mounted in a photosensitive member unit 260, according to Embodiment 1. FIG. 18B is a detailed partial view illustrating a first wall surface 212 and a second wall surface 222 indicated in FIG. 18A. The first wall surface 212 and the second wall surface 222 will be described later.

As illustrated in FIG. 18A, the photosensitive member unit 260 is provided with the photosensitive drum 61, the frame 610, and the pressing member 200. The pressing member 200 is a pressing member that presses the developing roller 71 provided in the developing unit 270 toward the photosensitive drum 61 in a state where the developing unit 270 is mounted in the photosensitive member unit 260.

The photosensitive member unit 260 is provided with a paper dust removal roller 64A, a paper dust collection roller 64B, and a paper dust collection chamber 64C. The paper dust removal roller 64A makes contact with the photosensitive drum 61, and is disposed downstream, in the rotation direction of the photosensitive drum 61, from the transfer roller 63, and upstream, in the rotation direction of the photosensitive drum 61, from the charging apparatus 62. The paper dust collection roller 64B makes contact with the paper dust removal roller 64A, and is disposed further toward the rear than the paper dust removal roller 64A. The paper dust collection chamber 64C is an enclosed space formed by the paper dust collection roller 64B and the frame 610. The paper dust removal roller 64A removes paper dust remaining on the photosensitive drum 61 from the photosensitive drum 61 after the toner image on the photosensitive drum 61 has been transferred onto the sheet S (not shown). The paper dust removed by the paper dust removal roller 64A is collected in the paper dust collection chamber 64C by the paper dust collection roller 64B.

A first agitator 211 and a second agitator 221 are provided within the developing unit 270. The first agitator 211 is disposed within a first stirring chamber 210 provided further to the front than the developing roller 71 and the supply roller 72. The second agitator 221 is disposed within a second stirring chamber 220 provided further to the front than the first stirring chamber 210.

The first stirring chamber 210 is a space which holds toner, formed by a top surface 240 of the stirring chambers, which is provided higher than the first agitator 211 in the gravitational direction, and the first wall surface 212, which is provided lower than the first agitator 211 in the gravitational direction. The second stirring chamber 220 is a space which holds toner, formed by the top surface 240 of the stirring chambers, and the second wall surface 222, which is provided lower than the second agitator 221 in the gravitational direction. At least part of the first wall surface 212 is a convex (arc-shaped) wall surface (bottom part) projecting downward in the gravitational direction with respect to the first agitator 211. Likewise, at least part of the second wall surface 222 is a convex (arc-shaped) wall surface (bottom part) projecting downward in the gravitational direction with respect to the second agitator 221.

As illustrated in FIG. 18B, the first wall surface 212 and the second wall surface 222 are convex wall surfaces projecting downward in the gravitational direction, and thus a common tangent T203 (the broken line) can be drawn connecting the outer wall surfaces of the bottom parts of the first wall surface 212 and the second wall surface 222. Here, a region enclosed within the common tangent T203, the first wall surface 212, and the second wall surface 222 (the region crosshatched with vertical and horizontal lines) is defined as a first depressed portion 231.

The first depressed portion 231 is formed at the boundary between the first wall surface 212 and the second wall surface 222 in the front-rear direction, and the first wall surface 212 and the second wall surface 222 are connected by the first depressed portion 231. The first depressed portion 231 is disposed between centers of rotation of the first agitator 211 and the second agitator 221 in the front-rear direction. A pressing receiving portion 231A which receives the pressing from the pressing member 200 is provided in the first depressed portion 231. When the pressing receiving portion 231A receives pressing force from the pressing member 200 in the direction of a first line T201, the developing roller 71 makes contact with the photosensitive drum 61 at a predetermined contact pressure. Here, the first line T201 is a straight line which is perpendicular to the direction of the rotation axis of the developing roller 71 (the left-right direction) and which passes through the first wall surface 212 and the second wall surface 222.

The center of rotation of the second agitator 221 is located near a second line T202 in the up-down direction. Here, the second line T202 is a straight line which is perpendicular to the direction of the rotation axis of the developing roller 71 (the left-right direction) and which connects the centers of rotation of the developing roller 71 and the first agitator 211. The second line T202 passes through the second stirring chamber 220.

The pressing receiving portion 231A and the pressing member 200 are preferably provided at both end parts of the frame 610 in the left-right direction, from the standpoint of stabilizing the left-right distribution of the contact pressure from the developing roller 71 on the photosensitive drum 61. On the other hand, from the standpoint of costs, the number of components can be reduced by providing the pressing receiving portion 231A and the pressing member 200 near the center of the frame 610 in the left-right direction.

Furthermore, from the standpoint of further stabilizing the contact pressure, the pressing receiving portion 231A and the pressing member 200 may be provided at both ends and near the center of the frame 610, in the left-right direction. Additionally, from the standpoint of making the developing unit 270 smaller in the left-right direction, the pressing receiving portion 231A and the pressing member 200 may be disposed further toward the center of the frame 610 in the left-right direction than the lift member 642, and may be disposed overlapping in the left-right direction within a range that does not protrude beyond the outer part of the lift member 642.

In this manner, the process cartridge 5 according to Embodiment 1 illustrated in FIGS. 18A and 18B includes the photosensitive member unit 260 and the developing unit 270 which is attachable to and detachable from the photosensitive member unit 260. The photosensitive member unit 260 includes: the photosensitive drum 61, on which an electrostatic latent image is formed; the frame 610, which supports the photosensitive drum 61; and the pressing member 200, which presses the developing unit 270 toward the photosensitive member unit 260. The developing unit 270 includes: the developing roller 71, which supplies toner to the photosensitive member unit 260 and collects toner remaining on the surface of the photosensitive drum; a housing 250 in which the first stirring chamber 210 and the second stirring chamber 220 that hold toner (holding spaces) are formed; and the pressing receiving portion 231A, which receives the pressing from the pressing member 200.

The housing 250 includes: the arc-shaped (downwardly-convex) first wall surface 212 (first bottom portion outer wall), which projects outward with respect to the first stirring chamber 210; and the arc-shaped (downwardly-convex) second wall surface 222 (second bottom portion outer wall), which projects outward with respect to the second stirring chamber 220. The configuration is such that when viewed in a direction of the rotation axis of the developing roller 71 (facing the drawing head-on), the pressing receiving portion 231A is at least partially disposed within the first depressed portion 231, which is surrounded by the common tangent T203 tangent to both the first wall surface 212 and the second wall surface 222, and the first wall surface 212, and moreover the second wall surface 222.

This allows the pressing member 200 to be disposed within the first depressed portion 231, which normally would be dead space, and the developing unit 270 can therefore be made smaller. In other words, the volume of the space for holding the toner can be increased without increasing the size of the developing unit.

Additionally, the developing unit 270 according to Embodiment 1 includes, as members which convey the toner within the holding space of the housing 250: the first agitator 211 (a first conveyance member), which conveys the toner by rotating in a state of contacting with an inner wall of the first wall surface 212; and the second agitator 221 (a second conveyance member), which conveys the toner by rotating in a state of contacting with an inner wall of the second wall surface 222. The pressing receiving portion 231A is disposed between the center of rotation of the first agitator 211 and the center of rotation of the second agitator 221, in the horizontal direction.

Additionally, in the process cartridge 5 according to Embodiment 1, when an extension line that passes through a point where the pressing member 200 makes contact with the pressing receiving portion 231A and that is parallel to the pressing direction of the pressing member 200 is taken as the first line T201, the first line T201 passes through (crosses) the first wall surface 212 and the second wall surface 222. Additionally, in the process cartridge 5 according to Embodiment 1, when viewed in a direction of the rotation axis of the developing roller 71, the second line T202, which passes through the center of rotation of the developing roller 71 and the center of rotation of the first agitator 211, also passes through the second stirring chamber 220, which serves as a conveyance chamber housing the second agitator 221.

Actions and Effects of Embodiment 1

In the process cartridge 5 according to this embodiment, the pressing member 200 is provided in the first depressed portion 231, and as a result, the pressing receiving portion 231A receives pressing force from the pressing member 200 in the direction of the first line T201. The pressing receiving portion 231A is provided closer to the developing roller 71 than the second wall surface 222 in the front-rear direction (i.e., further to the rear). Accordingly, deformation of the housing 250 caused by the pressing force can be suppressed in a configuration in which the second wall surface 222, which is provided further from the developing roller 71 (further to the front) than the first wall surface 212 in the front-rear direction, is pressed. As a result, loss of contact pressure from the developing roller 71 on the photosensitive drum 61 caused by deformation in the housing 250 can be suppressed.

Additionally, in this embodiment, the pressing member 200 is provided in the first depressed portion 231, and thus more space can be conserved in the horizontal direction (the front-rear direction) than when the pressing member 200 is provided to the front of the second wall surface 222. Additionally, the process cartridge 5 according to Embodiment 1 can conserve more space in the up-down direction than in a configuration where the pressing member 200 is biased by a part, of either the first wall surface 212 or the second wall surface 222, located lower than the first depressed portion 231 in the gravitational direction.

Additionally, in this embodiment, the center of rotation of the second agitator 221 is located near the second line T202 in the up-down direction. The second line T202 is inclined more toward a horizontal line (the front-rear direction) than a vertical line (the up-down direction), and thus an elevation difference between the first stirring chamber 210 and the second stirring chamber 220 in the up-down direction can be kept small. The up-down direction size (the height) of the developing unit 270 can therefore be made small, which in turn makes it possible to reduce the up-down direction sizes (the heights) of the process cartridge 5 and the image forming apparatus 1. Additionally, because the height from which the toner falls when the toner is conveyed from the second stirring chamber 220 to the first stirring chamber 210 by the second agitator 221 is kept low, an increase in powder pressure produced when the toner accumulates in the up-down direction can be prevented. This suppresses degradation caused by an increase in the powder pressure of the toner, which in turn makes it possible to further extend the service life of the developing unit 270.

Additionally, in this embodiment, by disposing the pressing receiving portion 231A and the pressing member 200 closer to the center of the frame 610 than the lift member 642 in the left-right direction, the left-right direction size (the width) of the developing unit 270 can be made small. This makes it possible to reduce the left-right direction sizes (widths) of the process cartridge 5 and the image forming apparatus 1.

Additionally, in this embodiment, the pressing member 200 is provided in the first depressed portion 231, and thus the first depressed portion 231 and the pressing member 200 can be used as uneven shapes for engagement, for the purpose of preventing erroneous mounting of multiple process cartridges having different specifications, such as service life and speed. Specifically, if the first depressed portion 231 of the developing unit 270 is provided in a different location of the photosensitive member unit from the pressing member 200, one of the first wall surface 212 and the second wall surface 222 will contact the pressing member 200 when the developing unit 270 is mounted in the photosensitive member unit 260. In such a case, the developing unit 270 cannot be inserted to a fully-mounted position such as that illustrated in FIG. 18A, which enables the user to recognize that the developing unit 270 has been erroneously mounted.

Embodiment 2

Figure 19:
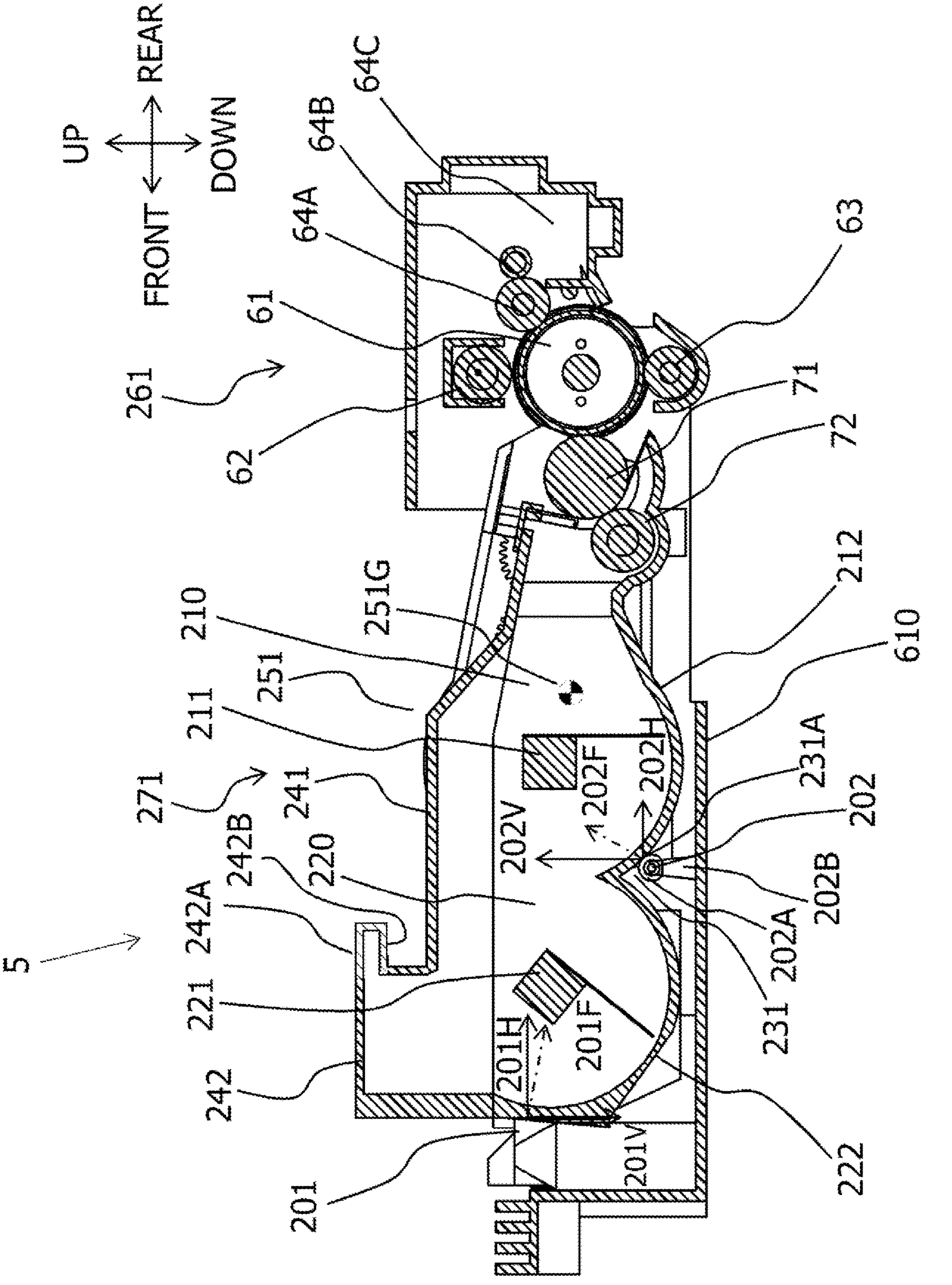
FIG. 19 is a cross-sectional view of a process cartridge according to Embodiment 2.

Embodiment 2 according to the present invention will be described next with reference to FIG. 19. This embodiment will describe parts different from the above-described embodiment in detail. Unless explicitly mentioned again, the configurations are the same as in the embodiment described above. Such parts will be given the same reference signs, and will not be described in detail. FIG. 19 is a cross-sectional view of a pressing configuration of a developing unit 271 implemented by a pressing member 201 when the developing unit 271 is mounted in a photosensitive member unit 261, according to Embodiment 2.

As illustrated in FIG. 19, the photosensitive member unit 261 is provided with the photosensitive drum 61, the frame 610, and the pressing member 201. The pressing member 201 is provided further to the front than a housing 251 of the developing unit 271, and presses the housing 251 in the direction of an arrow 201F in a state where the developing unit 271 is mounted in the photosensitive member unit 261. Here, the arrow 201F indicates a pressing force vector over which the developing roller 71 provided in the developing unit 271 is pressed toward the photosensitive drum 61. An arrow 201H and an arrow 201V represent a horizontal component (front-rear direction partial force component) and a vertical component (up-down direction partial force component), respectively, of the pressing force vector 201F. The horizontal pressing force component 201H is oriented in a direction facing from the front side toward the rear side, and the vertical pressing force component 201V is oriented in a direction facing from the top side toward the bottom side.

A rotation stopping portion 202, serving as a substitute for the projecting portions 643 illustrated in FIG. 13, is provided in the first depressed portion 231 of the developing unit 271. The rotation stopping portion 202 restricts the rotational action of the developing unit 271 relative to the photosensitive member unit 261. The rotation stopping portion 202 is constituted by a rotation stopping roller portion 202A, and a roller support portion 202B which supports the rotation stopping roller portion 202A. The rotation stopping roller portion 202A is supported so as to be capable of rotating relative to the roller support portion 202B, and has a cylindrical or spherical shape. The roller support portion 202B is fixed to and supported by the frame 610. By making contact with the pressing receiving portion 231A, the rotation stopping roller portion 202A supports the developing unit 271 so as to be mobile relative to the photosensitive member unit 261.

At this time, the pressing receiving portion 231A receives a counterforce from the rotation stopping roller portion 202A in the direction of an arrow 202F. In other words, the arrow 202F represents a vector of a rotation stopping contact force which restricts the freedom with which the developing unit 271 rotates about the developing roller 71. An arrow 202H and an arrow 202V represent a horizontal component (front-rear direction partial force component) and a vertical component (up-down direction partial force component), respectively, of the rotation stopping contact force 202F. The horizontal component 202H is oriented in a direction facing from the front side toward the rear side, and the vertical component 202V is oriented in a direction facing from the bottom side toward the top side.

The pressing receiving portion 231A and the rotation stopping portion 202 are preferably provided at both end parts of the frame 610 in the left-right direction, from the standpoint of stabilizing the left-right distribution of the contact pressure from the developing roller 71 on the photosensitive drum 61. On the other hand, from the standpoint of costs, the number of components can be reduced by providing the pressing receiving portion 231A and the rotation stopping portion 202 near the center of the frame 610 in the left-right direction.

Furthermore, from the standpoint of further stabilizing the contact pressure, the pressing receiving portion 231A and the rotation stopping portion 202 may be provided at both ends and near the center of the frame 610, in the left-right direction. Additionally, from the standpoint of making the developing unit 271 smaller in the left-right direction, the pressing receiving portion 231A and the rotation stopping portion 202 may be disposed further toward the center of the frame 610 in the left-right direction than the lift member 642, and may be disposed overlapping in the left-right direction within a range that does not protrude beyond the outer part of the lift member 642.

The first stirring chamber 210 and the second stirring chamber 220 of the developing unit 271 are respectively constituted by the first wall surface 212 and the second wall surface 222, which form a bottom surface on the lower side in the gravitational direction, and a first top surface 241 and a second top surface 242, which form a top surface on the upper side in the gravitational direction. The first top surface 241 and the second top surface 242 are connected by an intersecting portion 242A, which is a leading end part of the second top surface 242 on the rear side thereof. The intersecting portion 242A has a shape which extends from the front side toward the rear side in the second top surface 242, and is therefore disposed so as to overlap with the first top surface 241 in the front-rear direction. In other words, the intersecting portion 242A and the first top surface 241 are provided intersecting in the front-rear direction.

In this manner, the process cartridge 5 according to Embodiment 2 illustrated in FIG. 19 includes the photosensitive member unit 261 and the developing unit 271 which is attachable to and detachable from the photosensitive member unit 261. The photosensitive member unit 261 includes: the photosensitive drum 61; the frame 610, which supports the photosensitive drum 61; and the rotation stopping portion 202, which presses the developing unit 271 toward the photosensitive member unit 261. The developing unit 271 includes: the developing roller 71; the housing 251, in which the first stirring chamber 210 and the second stirring chamber 220 which hold toner are formed; and the pressing receiving portion 231A which receives the pressing from the rotation stopping portion 202.

The housing 251 includes: the arc-shaped first wall surface 212, which projects outward with respect to the first stirring chamber 210; the arc-shaped second wall surface 222, which projects outward with respect to the second stirring chamber 220; the first top surface 241, which is provided on the upper side in the gravitational direction; the second top surface 242, which is provided higher in the gravitational direction than the first top surface 241 and which is disposed so as to partially overlap with the first top surface 241 when viewed from above; and the intersecting portion 242A (a connecting portion), which connects the first top surface 241 and the second top surface 242. The intersecting portion 242A has an opposing surface 242B which opposes the first top surface 241 below the second top surface 242. Thus as illustrated in FIG. 19, a user can insert their finger into the recess created by the overlap between the first top surface 241 and the second top surface 242 when viewed from above, and by gripping the second top surface 242 from above while supporting the opposing surface 242B from below, that part can be used as a handle when mounting and removing the developing unit 271.

Additionally, the rotation stopping portion 202 according to Embodiment 2 includes the rotation stopping roller portion 202A, which supports the developing unit 271 when the developing unit 271 is mounted in the photosensitive member unit 261. When viewed if a direction of the rotation axis of the developing roller 71, the rotation stopping roller portion 202A is disposed in the first depressed portion 231, as in Embodiment 1. This allows the rotation stopping portion 202 to be disposed within the first depressed portion 231, which normally would be dead space, and the developing unit 271 can therefore be made smaller. In other words, the volume of the space for holding the toner can be increased without increasing the size of the developing unit 271.

Actions and Effects of Embodiment 2

According to this embodiment, by providing the rotation stopping portion 202 in the first depressed portion 231, the pressing receiving portion 231A receives pressing force of the rotation stopping contact force 202F from the rotation stopping portion 202. The process cartridge 5 according to Embodiment 2 can conserve more space in the up-down direction than in a configuration where the rotation stopping portion 202 supports a part, of either the first wall surface 212 or the second wall surface 222, located lower than the first depressed portion 231 in the gravitational direction.

Furthermore, in this embodiment, the horizontal component 202H acting on the developing unit 271 from the rotation stopping portion 202 is oriented in the same direction as the horizontal pressing force component 201H, i.e., in the direction from the front toward the rear. Accordingly, a biasing force of the developing roller 71 acting on the photosensitive drum 61 is added by the horizontal component 202H, which makes it possible to further stabilize the state of contact between the developing roller 71 and the photosensitive drum 61.

Additionally, the means with which the developing roller 71 contacts the photosensitive drum 61 is distributed between the pressing member 201 and the rotation stopping portion 202, which keeps the compression spring force of the pressing member 201 low. Keeping the compression spring force of the pressing member 201 low makes it possible to suppress creep deformation in the frame 610 occurring when the process cartridge 5 is left standing for a long time, which in turn makes it possible to reduce the strength required of the frame 610. Costs can therefore be reduced by making the frame 610 thinner and so on.

Additionally, in this embodiment, the intersecting portion 242A intersects with the first top surface 241 of the stirring chambers in the front-rear direction. Accordingly, when the developing unit 271 is mounted to and removed from the photosensitive member unit 261, the intersecting portion 242A can be used as a handle of the developing unit 271, which a user can hook their finger on and grip. This makes it possible to conserve more space in the horizontal direction (the front-rear direction) than with a configuration in which a handle of the developing unit 271 is provided further to the front than the second wall surface 222. Furthermore, a location closer to a center of gravity 251G of the developing unit 271 in the horizontal direction (the front-rear direction) can be gripped than with a configuration in which a handle of the developing unit 271 is provided further to the front than the second wall surface 222. Accordingly, a burden placed on the wrist when mounting and removing the developing unit 271 to and from the photosensitive member unit 261, i.e., a load of moment about the wrist produced when gripping the developing unit 271, can be reduced.

Additionally, in this embodiment, the rotation stopping portion 202 is provided in the first depressed portion 231, and thus the first depressed portion 231 and the rotation stopping portion 202 can be used as uneven shapes for engagement, for the purpose of preventing erroneous mounting of multiple process cartridges having different specifications, such as service life and speed. Specifically, if the first depressed portion 231 of the developing unit 271 is provided in a different location from the rotation stopping portion 202, one of the first wall surface 212 and the second wall surface 222 will contact the rotation stopping portion 202 when the developing unit 271 is mounted in the photosensitive member unit 261. In such a case, the developing unit 271 cannot be inserted to a fully-mounted position such as that illustrated in FIG. 18A, which enables the user to recognize that the developing unit 271 has been erroneously mounted.

Embodiment 3

Figure 20:
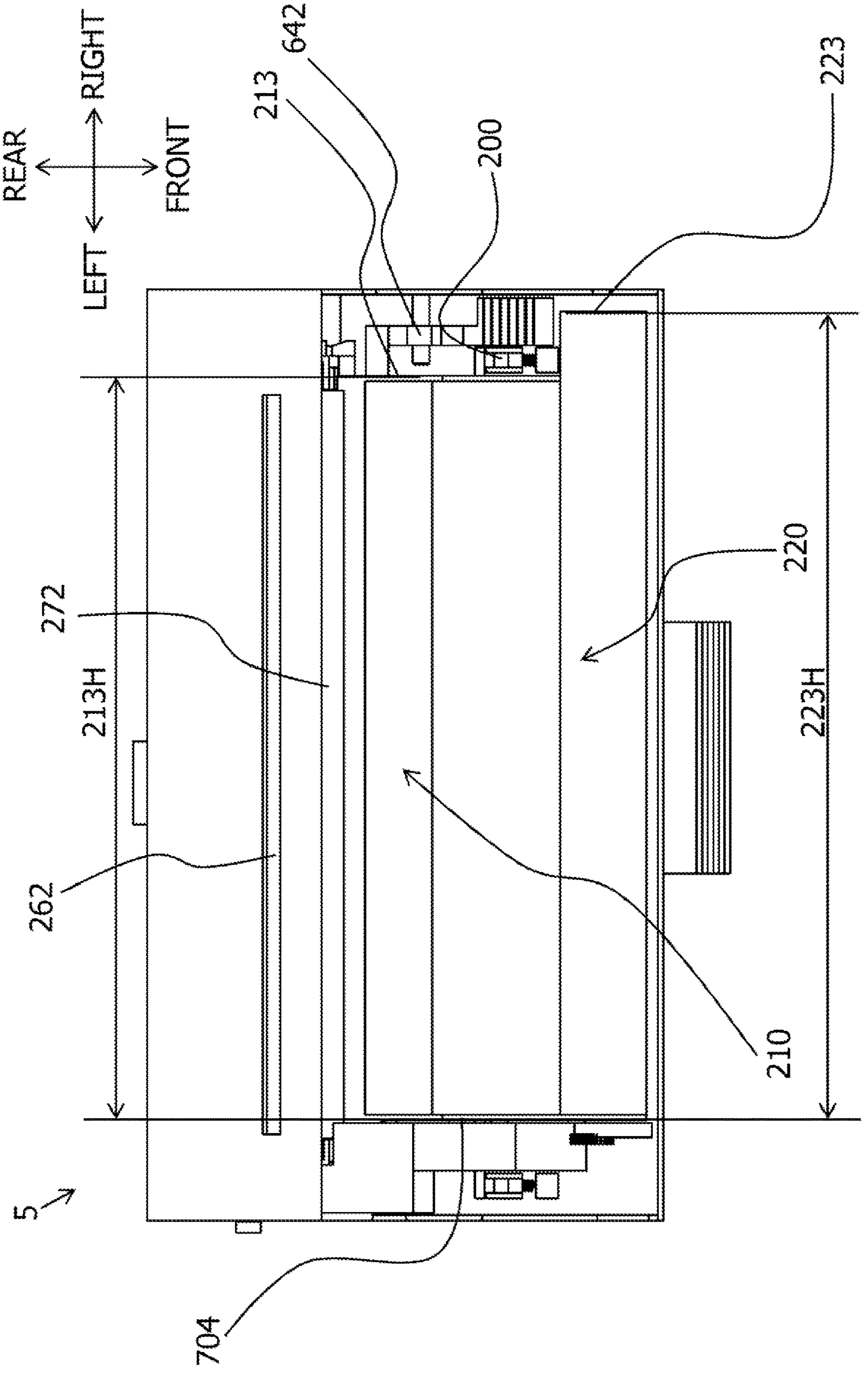
FIG. 20 is a top view of a process cartridge according to Embodiment 3.

Embodiment 3 according to the present invention will be described next with reference to FIG. 20. This embodiment will describe parts different from the above-described embodiments in detail. Unless explicitly mentioned again, the configurations are the same as in the embodiments described above. Such parts will be given the same reference signs, and will not be described in detail. FIG. 20 is a top view illustrating a positional relationship between the first stirring chamber 210 and the second stirring chamber 220 in the left-right direction, when a developing unit 272 is mounted in a photosensitive member unit 262, according to Embodiment 3. Note that the top surface 240 of the stirring chambers is not shown in order to illustrate the internal structures of the first stirring chamber 210 and the second stirring chamber 220.

As illustrated in FIG. 20, the first stirring chamber 210, which serves as a first conveyance chamber, has a first stirring chamber longitudinal width 213H from the left side wall 704 of the developing unit 272 to a first stirring chamber side wall 213, in the left-right direction. Likewise, the second stirring chamber 220, which serves as a second conveyance chamber, has a second stirring chamber longitudinal width 223H from the left side wall 704 to a second stirring chamber side wall 223, in the left-right direction. The second stirring chamber longitudinal width 223H is longer than the first stirring chamber longitudinal width 213H.

At least part of the pressing member 200 or the lift member 642 overlaps with a space between the first stirring chamber side wall 213 and the second stirring chamber side wall 223 in the left-right direction. In other words, the pressing member 200 and the lift member 642 are disposed, in the left-right direction, further from the center of the developing unit 272 in the left-right direction than the first stirring chamber side wall 213. Additionally, at least part of the pressing member 200 or the lift member 642 is located closer, in the left-right direction, to the center of the developing unit 272 in the left-right direction than the second stirring chamber side wall 223.

The pressing member 200 or the lift member 642 is disposed further to the rear than the second stirring chamber 220 and further to the front than the developing roller 71, in the front-rear direction.

Although the pressing member 200 is provided on the left side of the lift member 642 in this embodiment, from the standpoint of usability when removing the developing unit, the positional relationship in the left-right direction can be reversed, i.e., the pressing member 200 can be provided on the right side of the lift member 642. Additionally, although the pressing member 200 and the lift member 642 are, in this embodiment, disposed so as to at least partially overlap in the area between the first stirring chamber side wall 213 and the second stirring chamber side wall 223 in the left-right direction, the pressing member 200 may be disposed in the first depressed portion 231 described in Embodiment 2.

Thus like the above-described embodiments, the developing unit 272 according to Embodiment 3 and illustrated in FIG. 20 includes the first agitator 211 that conveys toner, the second agitator 221 that conveys toner, the first stirring chamber 210 that houses the first agitator 211, and the second stirring chamber 220 that houses the second agitator 221. The second stirring chamber longitudinal width 223H of the second stirring chamber 220, which is a width in a direction of the rotation axis of the developing roller, is greater than the first stirring chamber longitudinal width 213H of the first stirring chamber 210, which is a width in a direction of the rotation axis of the developing roller.

Actions and Effects of Embodiment 3

The lift member 642 is provided further from the left-right direction center of the developing unit 272 than the first stirring chamber side wall 213 in the left-right direction, and is provided between the second stirring chamber 220 and the developing roller 71 in the front-rear direction. The lift member 642 can therefore be seen from the same perspective as that illustrated in the top view in FIG. 20, i.e., from the top surface side of the developing unit 272, which makes it possible to ensure that the lift member 642 is visible when removing the developing unit 272 from the photosensitive member unit 262.

The second stirring chamber longitudinal width 223H is made longer than the first stirring chamber longitudinal width 213H, and thus the volume of the toner held in the second stirring chamber 220 can be increased by an amount equivalent to the difference between the second stirring chamber longitudinal width 223H and the first stirring chamber longitudinal width 213H. This makes it possible to further increase the service life of the developing unit 272.

Embodiment 4

Figure 21:
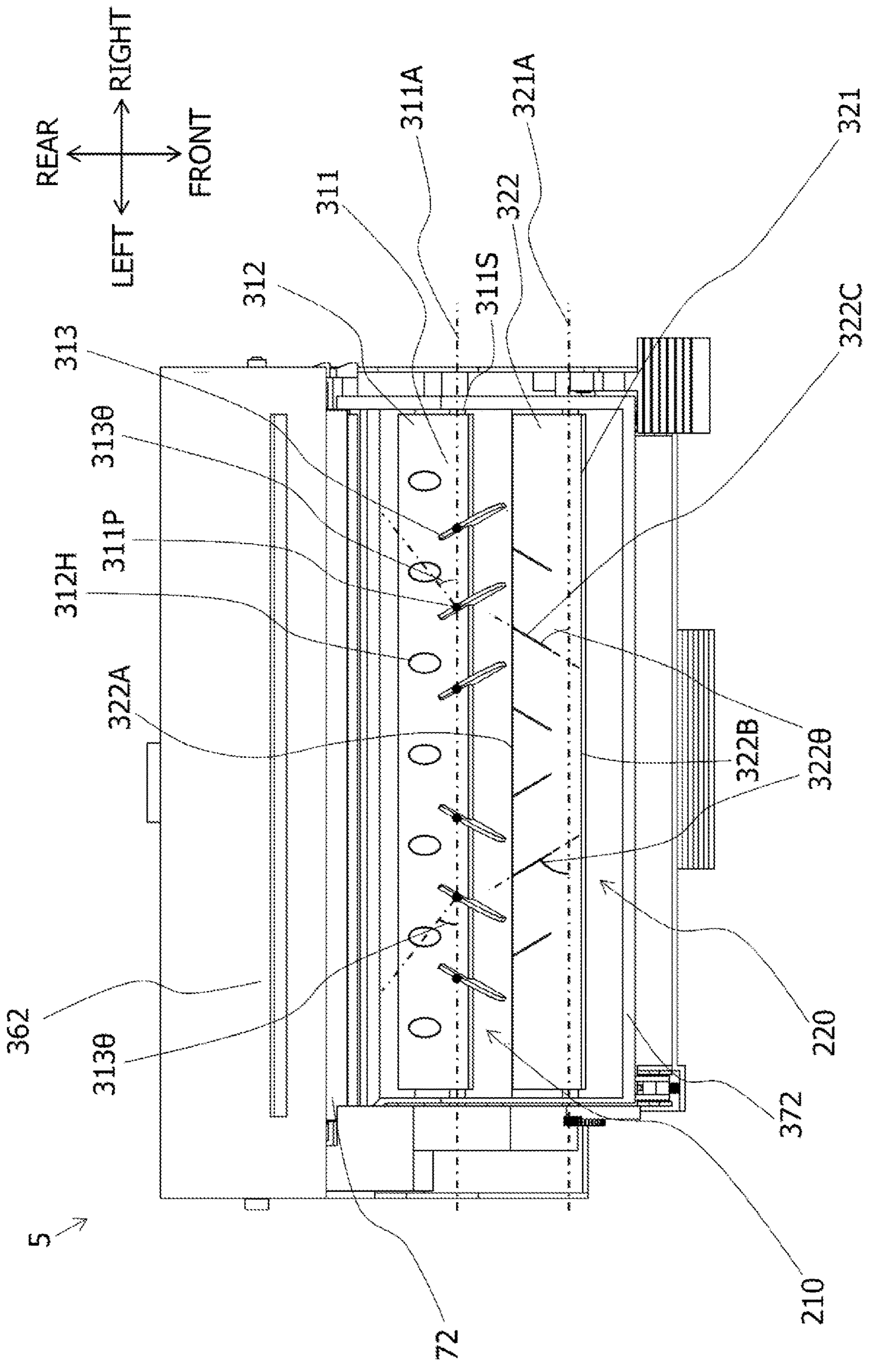
FIG. 21 is a top view of a process cartridge according to Embodiment 4.
Figure 22:
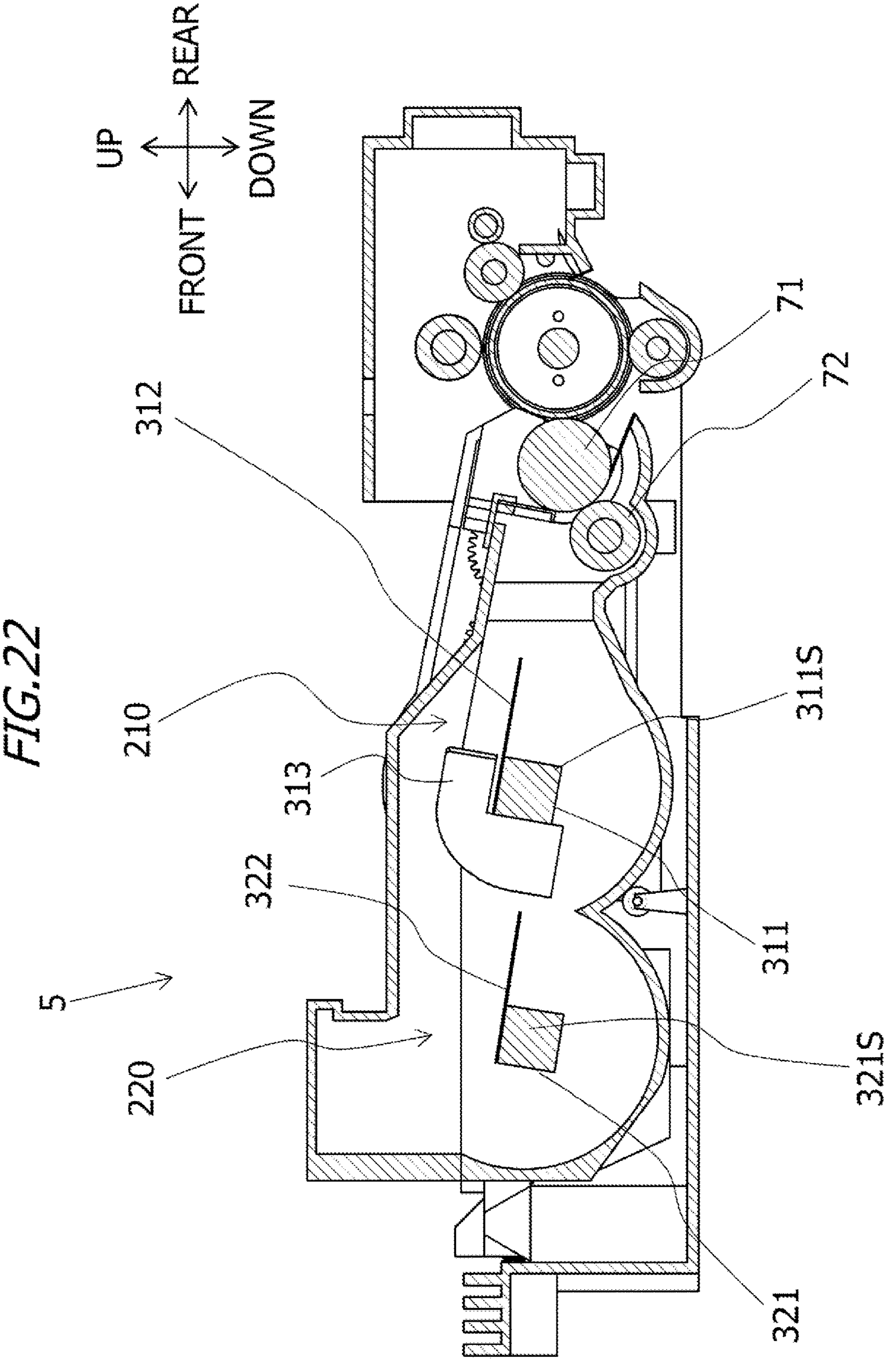
FIG. 22 is a cross-sectional view of the process cartridge according to Embodiment 4.

Embodiment 4 according to the present invention will be described next with reference to FIGS. 21, 22, 23A to 23F and 24A to 24F. This embodiment will describe parts different from the above-described embodiments in detail. Unless explicitly mentioned again, the configurations are the same as in the embodiments described above. Such parts will be given the same reference signs, and will not be described in detail. FIGS. 21 and 22 are a top view and a cross-sectional view, respectively, illustrating a developer conveyance configuration when a developing unit 372 is mounted in a photosensitive member unit 362, according to Embodiment 4. Note that the top surface 240 of the stirring chambers is not shown in order to illustrate the internal structures of the first stirring chamber 210 and the second stirring chamber 220.

As illustrated in FIGS. 21 and 22, a first agitator 311, which is capable of rotating, is provided in the first stirring chamber 210. The first agitator 311 includes a first stirring rod 311S, a first rotation shaft 311A extending in the left-right direction, a first stirring sheet 312 constituted by a flexible sheet member, and a plurality of stirring blades 313, and supplies toner to the supply roller 72 by rotating about the first rotation shaft 311A. Holes 312H are provided in a plurality of locations in the first stirring sheet 312, at intervals in a longitudinal direction of the first stirring sheet 312, to adjust the force with which the toner is supplied.

The first stirring rod 311S is provided with the stirring blades 313 to convey the toner in the first stirring chamber 210 to a central part. Toner which has accumulated on the supply roller 72 is again expelled into the first stirring chamber 210 by rubbing against the developing roller 71. Some of this expelled toner is conveyed to both end sides of the supply roller 72 in the axial direction thereof. The first stirring rod 311S is provided with the stirring blades 313 to return this toner, which has been conveyed to both end sides, back to the central part of the first stirring chamber 210 in the left-right direction.

A plurality of the stirring blades 313 are provided on the first stirring rod 311S, at intervals along the left-right direction of the first stirring rod 311S. In this embodiment, six of the stirring blades 313 are provided. The stirring blades 313 according to this embodiment are plate-shaped members having semi-oval shapes, and are configured so that a normal line at an intersection point 311P where the stirring blades 313 intersect with the first rotation shaft 311A intersects with the first rotation shaft 311A at an angle 313θ. The three stirring blades 313 on the right side are provided so that the angle 313θ is in the counterclockwise direction relative to the first rotation shaft 311A, and the three stirring blades 313 on the left side are provided so that the angle 313θ is in the clockwise direction relative to the first rotation shaft 311A.

In other words, the six stirring blades 313 are provided with bilateral symmetry. Accordingly, when the first stirring rod 311S rotates, the toner at the end parts of the first stirring chamber 210 in the left-right direction is subject to a conveyance force, moving toward the center in the left-right direction, from the stirring blades 313.

Additionally, a second agitator 321, which is capable of rotating, is provided in the second stirring chamber 220. The second agitator 321 includes a second rotation shaft 321A extending in the left-right direction and a second stirring sheet 322 constituted by a flexible sheet member, and conveys toner from the second stirring chamber 220 toward the first stirring chamber 210 by rotating about the second rotation shaft 321A. The second stirring sheet 322 has linear cutouts 322C extending in a direction having a set angle 322θ relative to the second rotation shaft 321A.

In this embodiment, six of the cutouts 322C are provided, and the cutouts 322C are positioned between the intersection points 311P between the stirring blades 313 and the first rotation shaft 311A, in the left-right direction. The amount of toner conveyed by the second agitator 321 is smaller than the amount of toner conveyed by the first agitator 311. The three cutouts 322C on the right side are provided so that the angle 322θ is in the counterclockwise direction relative to the second rotation shaft 321A, and the three cutouts 322C on the left side are provided so that the angle 322θ is in the clockwise direction relative to the second rotation shaft 321A. In other words, the six cutouts 322C are provided with bilateral symmetry.

The stirring blades 313 described in this embodiment are examples, and the shape and number of the stirring blades 313 can be set freely from the standpoint of adjusting the stirring performance. For example, although the stirring blades 313 have semi-oval plate shapes in this embodiment, the stirring blades 313 may have screw shapes with an angle of torsion relative to the first rotation shaft 311A, shapes with unevenness in the sides or on the surfaces, and so on. Furthermore, the shapes, sizes, thicknesses, and angles in which the surfaces are oriented can also be varied among the plurality of stirring blades 313 from the standpoint of changing the circulation performance at each of positions in the left-right direction. It is furthermore not absolutely necessary for the plurality of stirring blades 313 to be located at equal intervals, nor is it absolutely necessary for the directions of the normal lines of the surface to be the same at each of the intersection points 311P.

Additionally, although this embodiment describes the shape of the cutouts 322C as being lines having the set angle 322θ relative to the second rotation shaft 321A, this set angle 322θ may be any angle aside from 0 and 180 degrees, and the width of the line may be set freely from the standpoint of processability. Furthermore, the shape, number, and interval of the cutouts 322C described in this embodiment are examples, and can be set freely from the standpoint of adjusting the conveyance performance. Further still, the shapes, sizes, and intervals can be varied among the plurality of cutouts 322C from the standpoint of varying the conveyance performance depending on the location in the left-right direction.

Figure 23A:
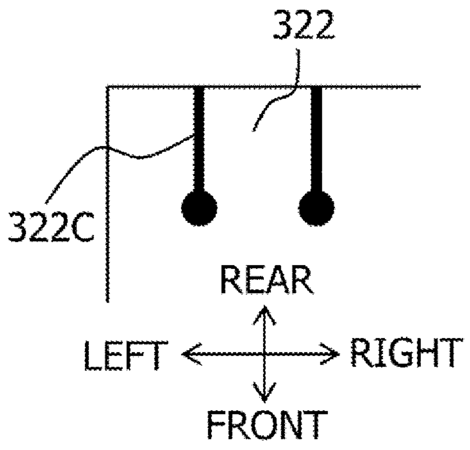
FIGS. 23A to 23F are diagrams illustrating examples of possible shapes of cutouts in a stirring sheet according to Embodiment 4.
Figure 23B:
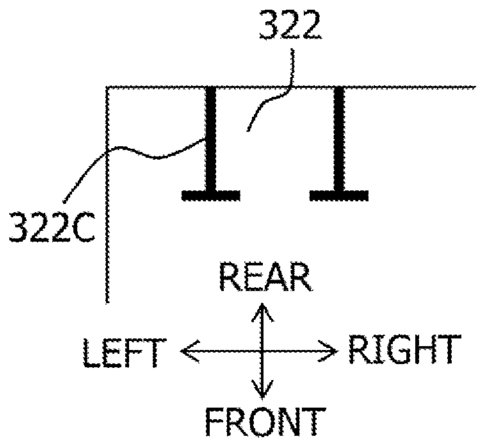
Figure 23C:
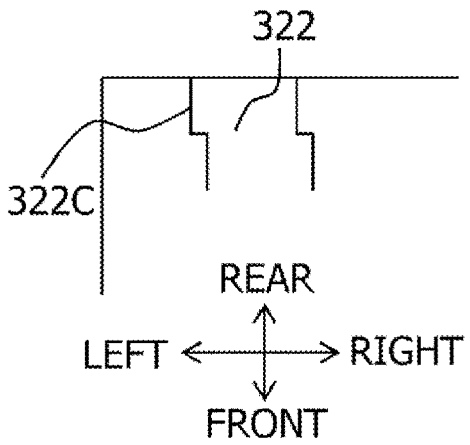
Figure 23D:
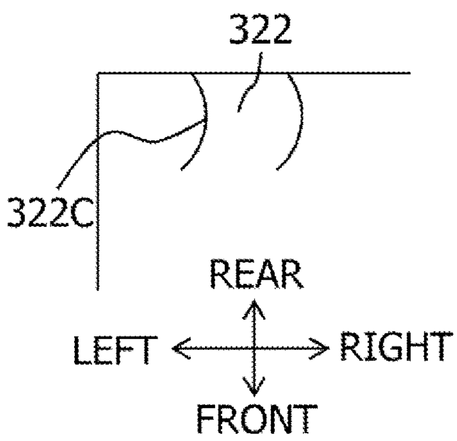
Figure 23E:
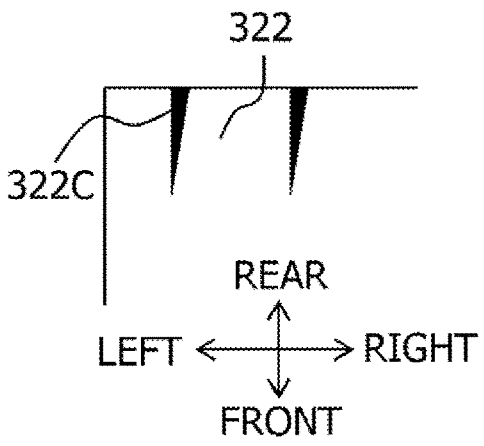
Figure 23F:
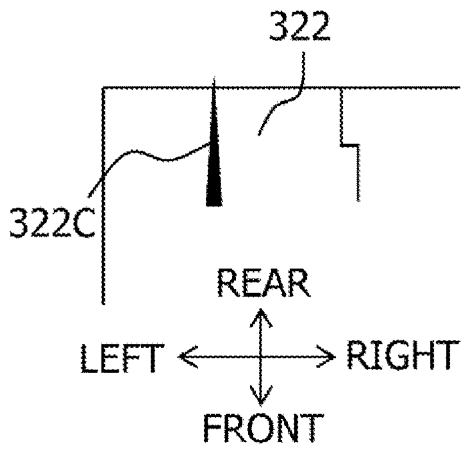
Figure 24A:
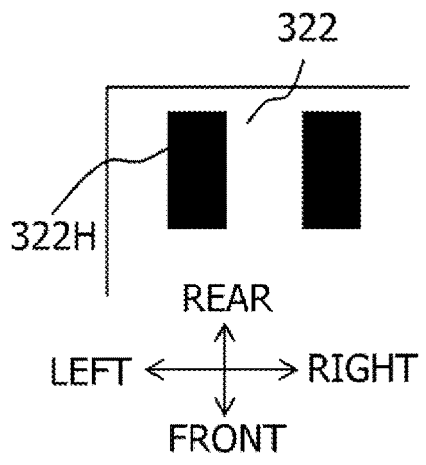
FIGS. 24A to 24F are diagrams illustrating examples of possible shapes of holes in the stirring sheet according to Embodiment 4.
Figure 24B:
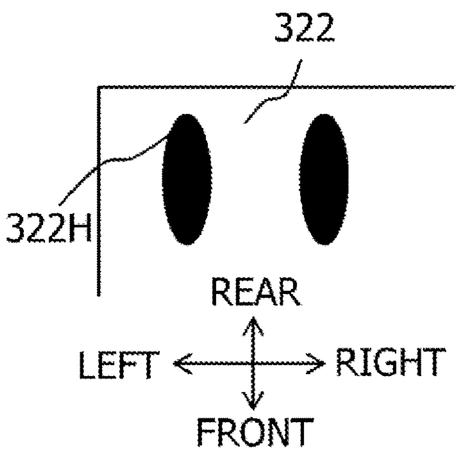
Figure 24C:
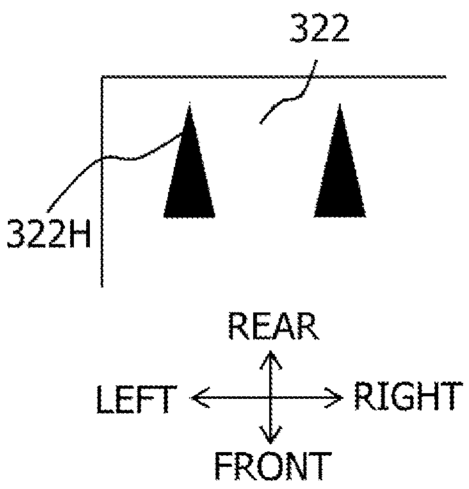
Figure 24D:
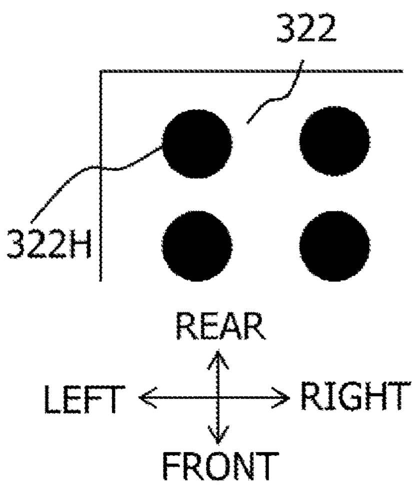
Figure 24E:
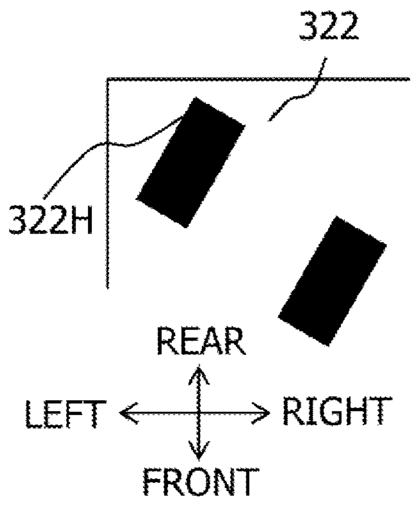
Figure 24F:
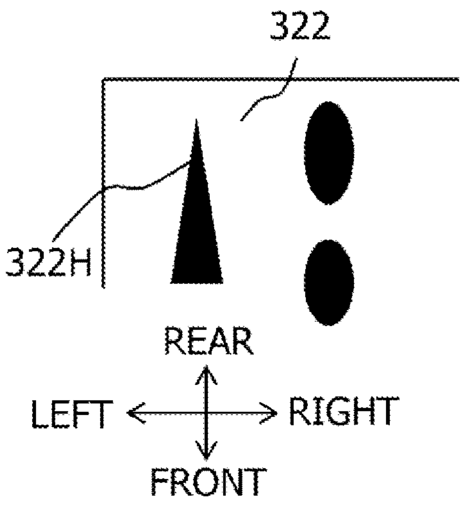

FIGS. 23A to 23F are diagrams illustrating examples of possible shapes of the cutouts in the stirring sheet according to Embodiment 4. In the examples illustrated in FIGS. 23A to 23F, the cutouts have a shape in which a circle is connected to an end part of a rectangle extending in a direction perpendicular to the second rotation shaft 321A (FIG. 23A), a shape in which a plurality of lines are connected at the end part or partway along the lines (FIGS. 23B and 23C), arc shapes (FIG. 23D), and triangles (FIG. 23E). These shapes can also be used in combination within a single second stirring sheet 322 (FIG. 23F).

FIGS. 24A to 24F are diagrams illustrating examples of possible shapes of holes in the stirring sheet according to Embodiment 4. As illustrated in FIGS. 24A to 24F, second holes 322H can also be provided in the surface of the second stirring sheet 322 instead of the cutouts 322C according to this embodiment. At this time, the shapes of the second holes 322H can be set freely from the standpoint of adjusting the conveyance performance. In the examples illustrated in FIGS. 24A to 24F, the holes have shapes such as rectangles (FIGS. 24A and 24E), ellipses (FIG. 24B), triangles (FIG. 24C), circles (FIG. 24D), and so on. The shapes of the second holes 322H may also be different in the left-right direction (FIG. 24F), and the number and interval thereof may be set freely.

In this manner, the developing unit 372 according to Embodiment 4 and illustrated in FIG. 21 includes the first agitator 311, which conveys toner toward the developing roller, and the second agitator 321, which conveys toner toward the first agitator 311. The first agitator 311 includes the first rotation shaft 311A, and the plurality of stirring blades 313 which are inclined relative to the axis line of the first rotation shaft 311A. The second agitator 321 includes the second stirring sheet 322. The second stirring sheet 322 has the plurality of cutouts 322C (slits) which are formed at an angle relative to the second rotation shaft 321A. This makes it possible to appropriately adjust the amount of toner conveyed by the first agitator 311 and the second agitator 321.

Additionally, the first agitator 311 includes a plurality of the stirring blades 313. At least part of each of the cutouts 322C is positioned between two adjacent stirring blades 313 with respect to the axis line of the first rotation shaft 311A, as seen from a direction orthogonal to the first rotation shaft 311A. Each of the cutouts 322C has a first end 322A located on a free end side of the second stirring sheet 322, and a second end 322B located on the side opposite from the first end 322A. Each of the cutouts 322C extends from the second end 322B to the first end 322A, from the center toward the outer side of the second stirring sheet 322 in a direction of the second rotation shaft 321A. Accordingly, the toner in the first stirring chamber 210 and the second stirring chamber 220 can be conveyed in a circulating manner.

Figure 25:
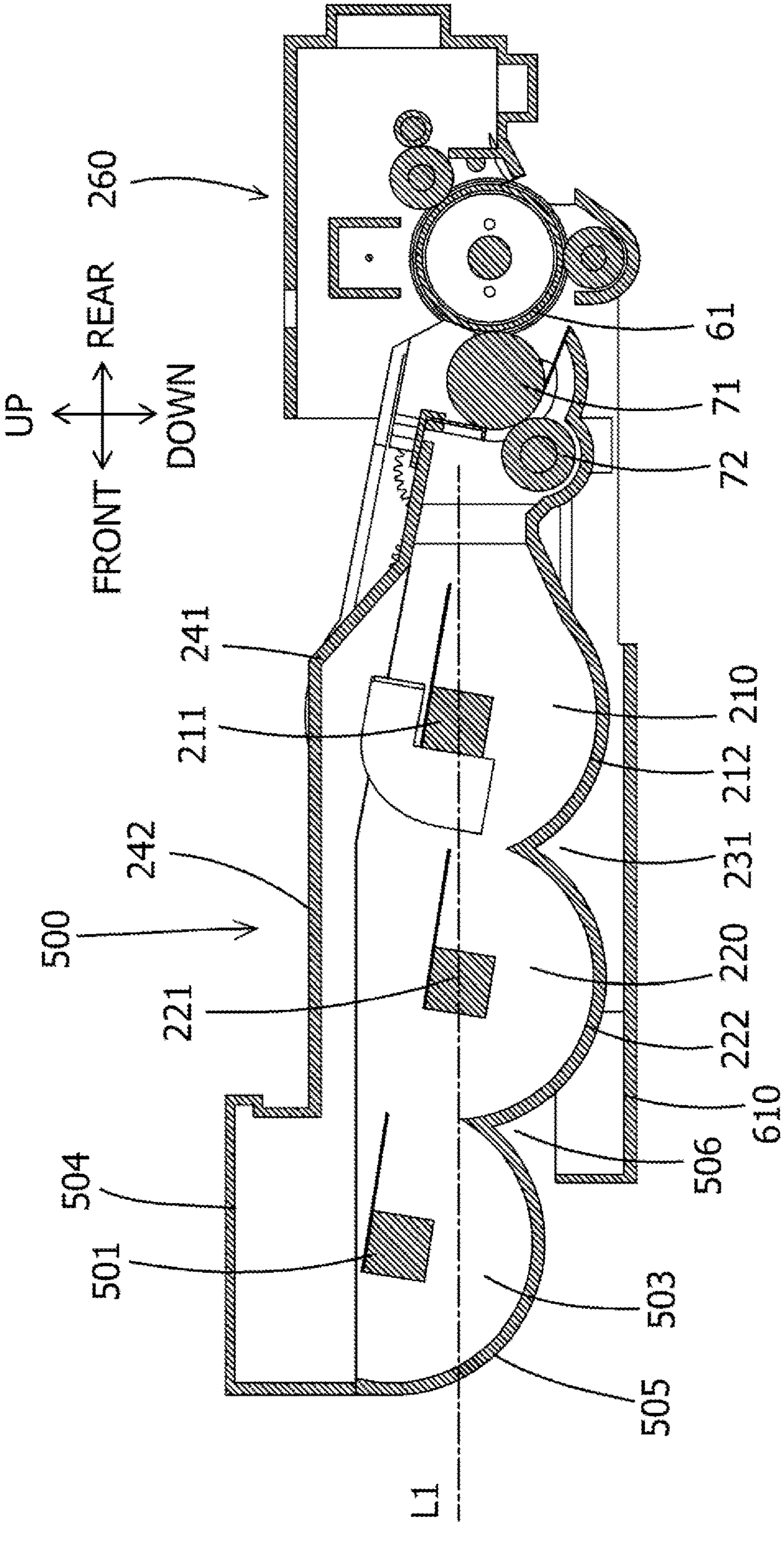
FIG. 25 is a cross-sectional view of the process cartridge according to Embodiment 4.

A developing unit 500 according to Embodiment 4 and illustrated in FIG. 25 includes: the first agitator 211 (first conveyance member), which is capable of rotating and conveys the toner in the first stirring chamber 210 toward the developing roller 71; the second agitator 221 (second conveyance member), which is capable of rotating and conveys the toner in the second stirring chamber 220 toward the first agitator 211; and a third agitator 501 (a third conveyance member), which conveys toner in a third stirring chamber 503 toward the second agitator 221. A housing includes: the arc-shaped first wall surface 212, which projects outward with respect to the first stirring chamber 210; the arc-shaped second wall surface 222, which projects outward with respect to the second stirring chamber 220; and an arc-shaped third wall surface 505, which projects outward with respect to the third stirring chamber 503.

The first agitator 211 is disposed above the first wall surface 212, the second agitator 221 is disposed above the second wall surface 222, and the third agitator 501 is disposed above the third wall surface 505. As illustrated in FIG. 25, when the developing unit 500 is seen in a direction of the rotation axis of the first agitator 211, at least part of the third wall surface 505 extends in a direction away from the photosensitive drum 61, further than an end part on the side opposite from the end part where the photosensitive drum 61 is disposed, in a direction connecting the center of rotation of the first agitator 211 with the center of rotation of the second agitator 221.

Note that the third agitator 501 is capable of rotating, and a center of rotation of the third agitator 501 may be located higher, in the gravitational direction, than a straight line L1 connecting the center of rotation of the first agitator 211 with the center of rotation of the second agitator 221.

Actions and Effects of Embodiment 4

In this embodiment, the cutouts 322C in the second stirring sheet 322 are provided, in the left-right direction, between the plurality of intersection points 311P where the stirring blades 313 intersect with the first rotation shaft 311A. Furthermore, the amount of toner conveyed by the second agitator 321 is smaller than the amount of toner conveyed by the first agitator 311. This makes it possible to prevent the supply of an amount of toner excessive for the stirring blades 313 provided in the first agitator 311, which in turn makes it possible to suppress degradation in the toner within the developing chamber.

Embodiment 5

Figure 32:
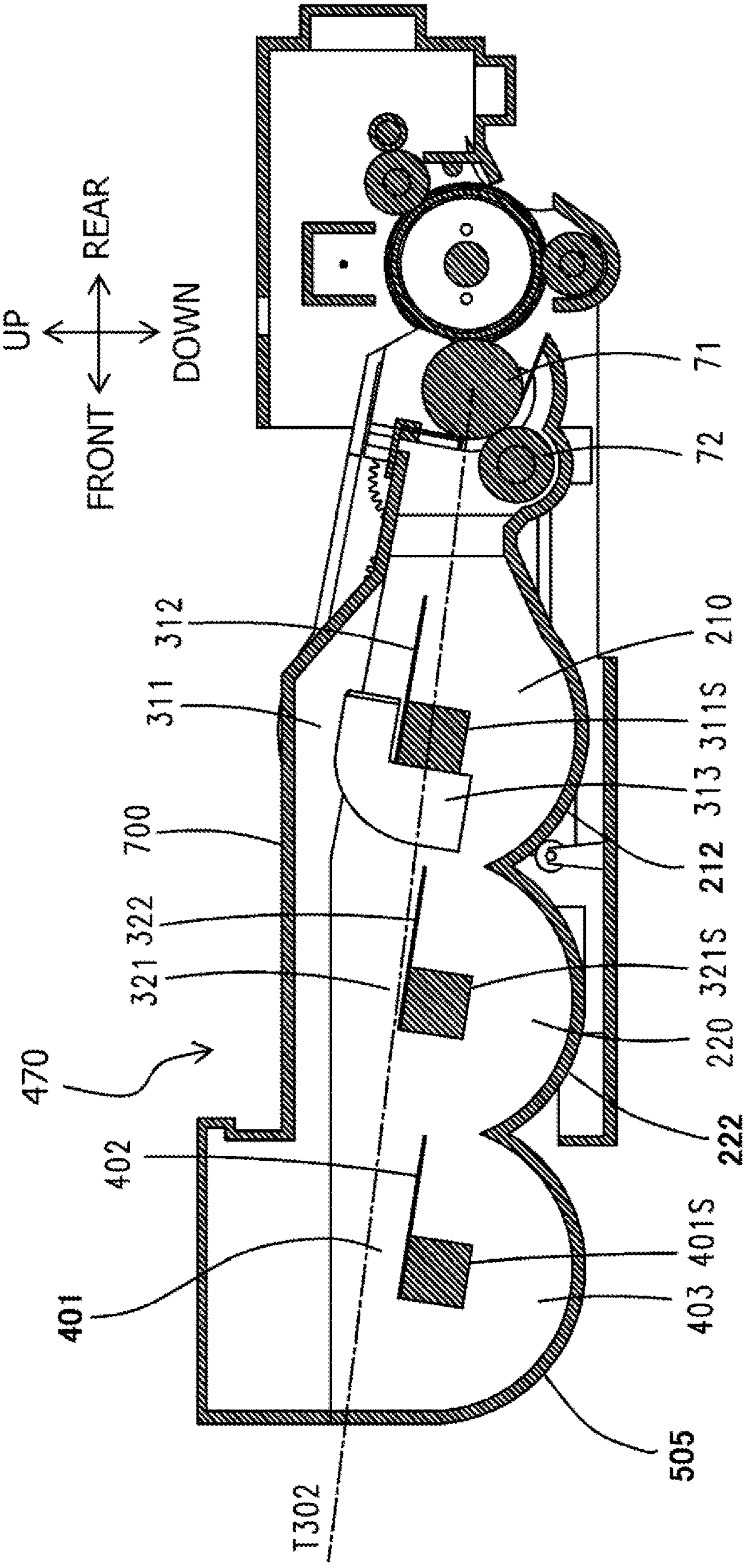
FIG. 32 is a cross-sectional view of a process cartridge according to Embodiment 5.
Figure 33:
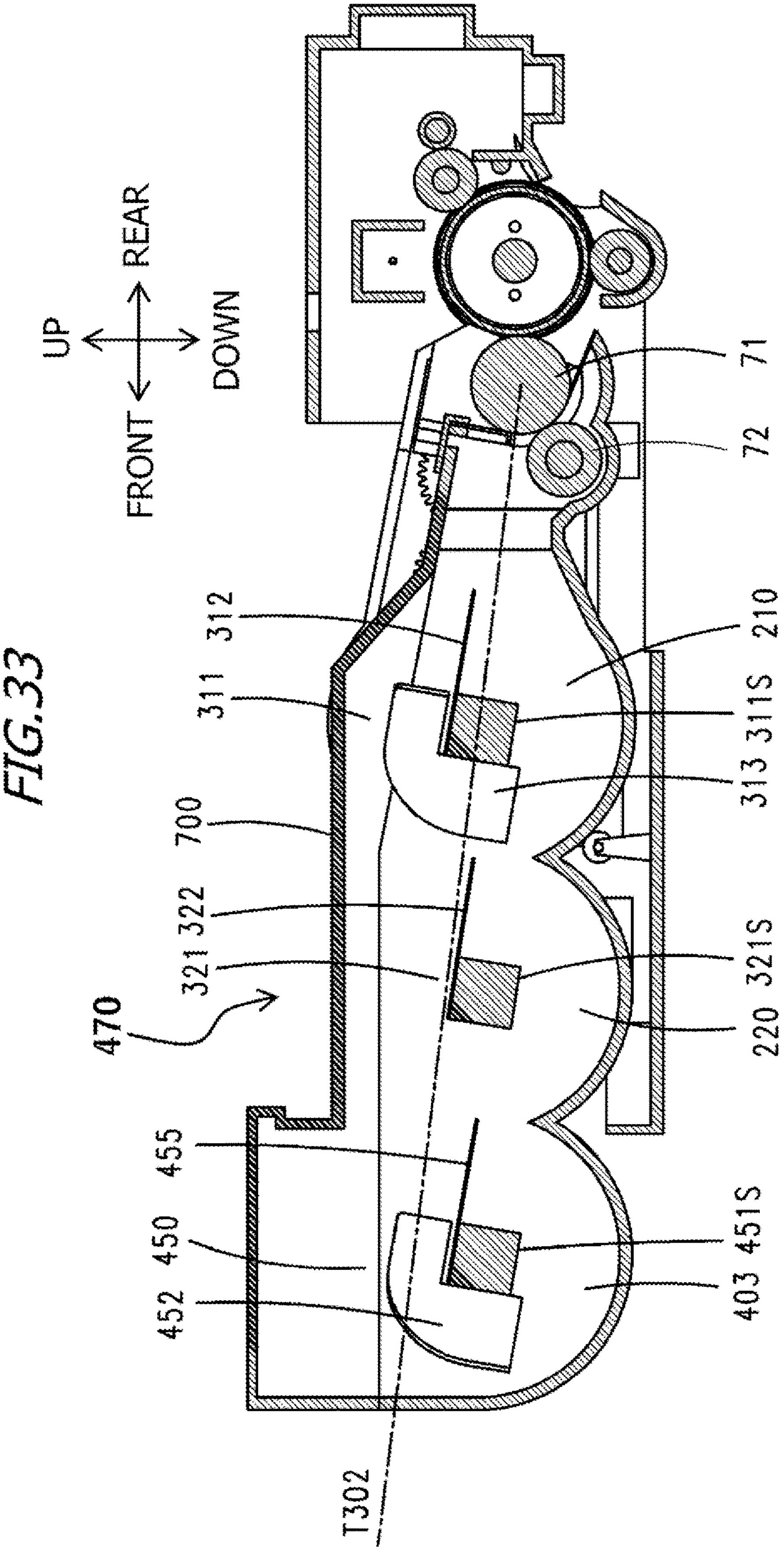
FIG. 33 is a cross-sectional view of the process cartridge according to Embodiment 5.
Figure 34:
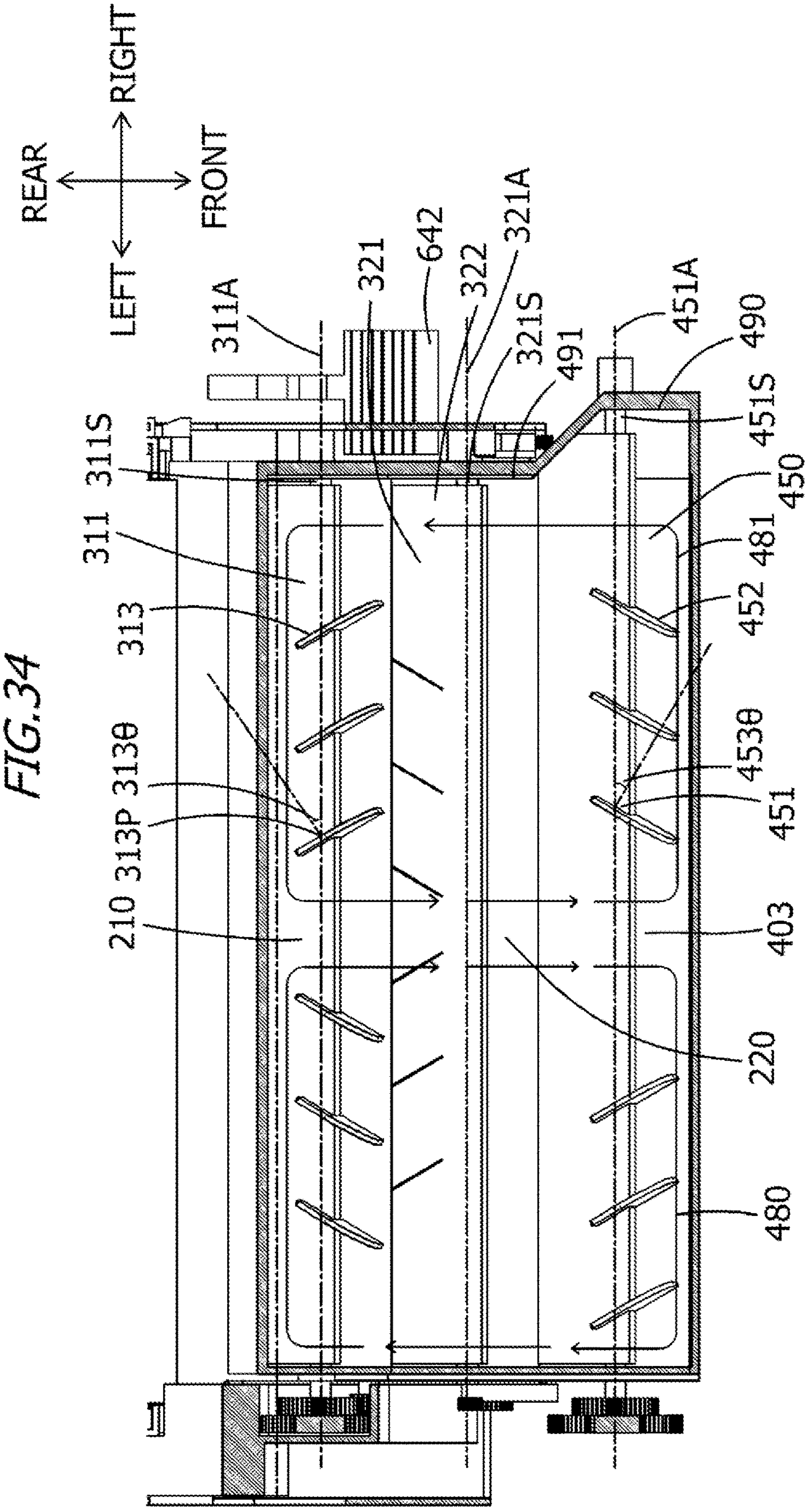
FIG. 34 is a top view of the process cartridge according to Embodiment 5.

Embodiment 5 according to the present invention will be described next with reference to FIGS. 32, 33, and 34. This embodiment will describe parts different from the above-described embodiments in detail. Unless explicitly mentioned again, the configurations are the same as in the embodiments described above. Such parts will be given the same reference signs, and will not be described in detail. FIGS. 32 and 33 are cross-sectional views illustrating a state in which a developing unit 470 is mounted in a photosensitive member unit, according to Embodiment 5. FIG. 34 is a top view illustrating a developer conveyance configuration when the developing unit is mounted in the photosensitive member unit.

The first agitator 311 includes the first stirring rod 311S, the first rotation shaft 311A extending in the left-right direction, the first stirring sheet 312 constituted by a flexible sheet member, and the plurality of stirring blades 313, and supplies toner to the supply roller 72 by rotating about the first rotation shaft 311A. The first stirring rod 311S is provided with the stirring blades 313 to convey the toner in the first stirring chamber 210 (a first toner holding chamber) to a central part. Toner which has accumulated on the supply roller 72 is again expelled into the first stirring chamber 210 by rubbing against the developing roller 71. Some of this expelled toner is conveyed to both end sides of the supply roller 72 in the axial direction thereof.

The first stirring rod 311S is provided with the stirring blades 313 to return this toner, which has been conveyed to both end sides, back to the central part of the first stirring chamber 210 in the left-right direction. Additionally, the stirring blades 313 at both end parts in the longitudinal direction reduce the toner pressure at both end parts, and thus by filling a gap between both end parts of the developing roller 71 in the longitudinal direction and the housing 700, toner leakage from a toner seal portion (not shown), which prevents such toner leakage, can be reduced.

A plurality of the stirring blades 313 are provided at intervals along the left-right direction of the first stirring rod 311S. In this embodiment, six of the stirring blades 313 are provided. The stirring blades 313 have semi-oval plate shapes, and a normal line at the intersection point 311P, where the stirring blades 313 intersect with the first rotation shaft 311A, intersects with the first rotation shaft 311A at the angle 3130. Additionally, a second agitator 321, which is capable of rotating, is provided in the second stirring chamber 220 (a second toner holding chamber).

The second agitator 321 includes a second stirring rod 321S, the second rotation shaft 321A extending in the left-right direction, and the second stirring sheet 322 constituted by a flexible sheet member, and conveys toner from the second stirring chamber 220 toward the first stirring chamber 210 by rotating about the second rotation shaft 321A. The amount of toner conveyed by the second agitator 321 is smaller than the amount of toner conveyed by the first agitator 311.

Additionally, a third agitator 401, which is capable of rotating, is provided in a third stirring chamber 403 (a third toner holding chamber). The third agitator 401 includes a third stirring rod 401S, a third rotation shaft 401A extending in the left-right direction, and a third stirring sheet 402 constituted by a flexible sheet member, and conveys toner from the third stirring chamber 403 toward the second stirring chamber 220 by rotating about the third rotation shaft 401A. The amount of toner conveyed by the third agitator 401 is smaller than the amount of toner conveyed by the second agitator 321. This makes it possible to prevent an excessive amount of toner from backing up in the rearward direction in the second stirring chamber 220 and the first stirring chamber 210.

A center of rotation of the third agitator 401 is located near a second line T302 in the up-down direction, as indicated in FIG. 32, i.e., within a rotational radius of a leading end of the third stirring sheet 402. Here, the second line T302 is a straight line which is perpendicular to the direction of the rotation axis of the developing roller 71 (the left-right direction) and which connects the centers of rotation of the developing roller 71 and the first agitator 311. The second line T302 passes through the second stirring chamber 220 and the third stirring chamber 403.

The center of rotation of the third agitator 401 is located near the second line T302 in the up-down direction. The second line T302 is inclined more toward a horizontal line (the front-rear direction) than a vertical line (the up-down direction), and thus an elevation difference between the first stirring chamber 210, the second stirring chamber 220, and the third stirring chamber 403 in the up-down direction can be kept small. The up-down direction size (the height) of the developing unit 470 can therefore be made small, which in turn makes it possible to reduce the up-down direction sizes (the heights) of the process cartridge 5 and the image forming apparatus 1.

Additionally, because the height from which the toner falls when the toner is conveyed from the third stirring chamber 403 to the second stirring chamber 220 by the third agitator 401 is kept low, an increase in powder pressure produced when the toner accumulates in the up-down direction can be prevented. This suppresses degradation caused by an increase in the powder pressure of the toner, which in turn makes it possible to further extend the service life of the developing unit 270.

As described above, the third agitator 401 is constituted by the third rotation shaft 401A and the third stirring sheet 402, but the configuration is not limited thereto. For example, as illustrated in FIGS. 33 and 34, a third agitator 450 may include a third stirring rod 451S, a plurality of stirring blades 452, and a third stirring sheet 455, and may be configured to convey toner from the third stirring chamber 403 toward the second stirring chamber 220 by rotating about a third rotation shaft 451A.

The third stirring rod 451S is provided with the stirring blades 452 to convey the toner in the third stirring chamber 403 outward in the axial direction of the third stirring rod 451S. A plurality of the stirring blades 452 are provided on the third stirring rod 451S, at intervals along the left-right direction of the third stirring rod 451S. In this embodiment, six of the stirring blades 452 are provided. The stirring blades 452 according to this embodiment have semi-oval plate shapes, and are configured so that a normal line at an intersection point 451P where the stirring blades 452 intersect with the third rotation shaft 451A intersects with the third rotation shaft 451A at an angle 4530.

When the first to third agitators rotate, the toner within the third stirring chamber 403 is conveyed outward in the axial direction of the third stirring rod 451S, and is also conveyed from the third stirring chamber 403 toward the second stirring chamber 220 by the third stirring sheet 455. Furthermore, when the second agitator 321 rotates, the toner within the second stirring chamber 220 is conveyed from the second stirring chamber 220 toward the first stirring chamber 210. The first stirring rod 311S of the first agitator 311 is provided with the stirring blades 313 for conveying the toner within the first stirring chamber 210 toward the central part thereof, and thus the first, second, and third agitators produce toner circulation, indicated by arrows 480 and 481 in FIG. 34. This major toner circulation makes it possible to suppress degradation of the toner, which in turn makes it possible to further extend the service life of the developing unit 270.

The amount of toner conveyed by the third agitator 450 is set to be the same or smaller than the amount of toner conveyed by the first agitator 311. This makes it possible to prevent an excessive amount of toner from backing up in the rearward direction in the second stirring chamber 220 and the first stirring chamber 210. Although this embodiment describes a configuration in which the third agitator is provided with a plurality of stirring blades, the configuration may be such that the second agitator is provided with a plurality of stirring blades and conveys toner outward in the axial direction of the stirring rod, and only the stirring sheet is fixed to the rotation shaft of the third agitator.

Additionally, in this embodiment, the above-described lift member 642 and the like are not present in the periphery of the third stirring chamber 403, which is in a position distant from the developing roller, as illustrated in FIG. 34. This produces space in the axial direction of the stirring rod, making it possible to provide a side wall surface 490 of the third stirring chamber 403 in the left-right direction (the axial direction of the third stirring rod 451S) further on the outside, in the left-right direction, than a side wall surface 491 of the second stirring chamber 220 in the left-right direction (the axial direction of the second stirring rod 321S). This increases the volume of the toner receptacle, which makes it possible to further extend the service life of the developing unit 270.

In this manner, the developing unit 470 according to Embodiment 5 and illustrated in FIG. 32 includes: the developing roller 71; the housing 700, in which are formed the first stirring chamber 210, the second stirring chamber 220, and the third stirring chamber 403 that hold toner; the first agitator 311, which conveys the toner within the housing 700 toward the developing roller 71; the second agitator 321, which conveys the toner within the housing 700 toward the first agitator 311; and the third agitator 401, which conveys the toner within the housing 700 toward the second agitator 321.

The housing 700 includes: the arc-shaped first wall surface 212, which projects outward with respect to the first stirring chamber 210; the arc-shaped second wall surface 222, which projects outward with respect to the second stirring chamber 220; and an arc-shaped third wall surface 505, which projects outward with respect to the third stirring chamber 403. The first agitator 311 is disposed above the first wall surface 212, the second agitator 321 is disposed above the second wall surface 222, and the third agitator 401 is disposed above the third wall surface 505.

Additionally, as illustrated in FIG. 34, the first agitator 211 includes the first rotation shaft 311A, and the plurality of stirring blades 313 which are fixed to the first rotation shaft 311A. The stirring blades 313 are disposed at an angle relative to the axis line of the first rotation shaft 311A so as to produce a force which conveys toner inward in the axis line direction of the first rotation shaft 311A when the first rotation shaft 311A rotates.

Additionally, as illustrated in FIGS. 33 and 34, the third agitator 450 includes the third rotation shaft 451A, and the plurality of stirring blades 452 which are fixed to the third rotation shaft 451A. The stirring blades 452 are disposed at an angle relative to the axis line of the third rotation shaft 451A so as to produce a force which conveys toner outward in the axis line direction of the third rotation shaft 451A when the third rotation shaft 401A rotates. Note that the stirring blades 313 and the stirring blades 452 may have a shape which has a spiral surface, a plate shape, or the like.

As illustrated in FIGS. 33 and 34, the developing unit 470 includes the first stirring chamber 210 that houses the first agitator 311, the second stirring chamber 220 that houses the second agitator 321, and the third stirring chamber 403 that houses the third agitator 450. The third stirring chamber 403, which serves as a third conveyance chamber, has a greater width in a direction of the second rotation shaft 321A of the second agitator 321 than in a direction of the rotation axis of the second agitator 321 of the second stirring chamber 220, which serves as the second conveyance chamber.

Actions and Effects of Embodiment 5

Providing the third agitator 401 within the third stirring chamber 403 makes it possible to increase the volume of the toner holding chamber. Additionally, because the center of rotation of the third agitator 401 is located near the second line T302 in the up-down direction, i.e., within the rotational radius of the leading end of the third stirring sheet 402, the up-down direction size (height) of the developing unit 270 can be reduced. Additionally, the toner pressure at both end parts is reduced by the stirring blades 313 of the first agitator 311, and thus toner leakage from toner seal portions at the end parts of the developing roller 71 can be prevented. Furthermore, because the third stirring rod 451S includes the stirring blades 452 for conveying the toner outward in the axial direction, degradation of the toner can be suppressed, which makes it possible to further extend the service life of the developing unit 270. Further still, the side wall surfaces of the third stirring chamber 403 can be located further outward in the left-right direction, which makes it possible to increase the volume of the toner receptacle.

Embodiment 6

Embodiment 6 according to the present invention will be described next with reference to FIGS. 25, 26A, 26B, 27A, 27B, and 28 to 31. This embodiment will describe parts different from the above-described embodiments in detail. Unless explicitly mentioned again, the configurations are the same as in the embodiments described above. Such parts will be given the same reference signs, and will not be described in detail.

Figure 26A:
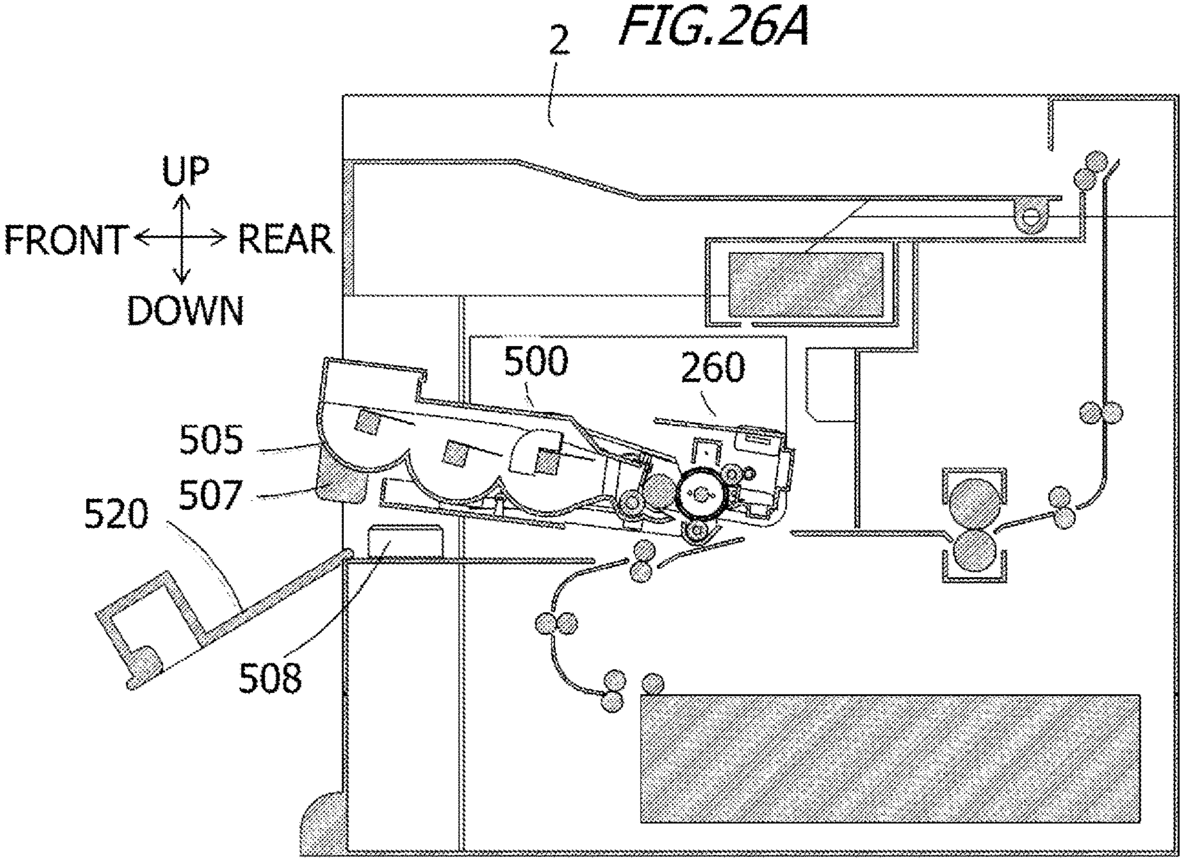
FIGS. 26A and 26B are diagrams illustrating an image forming apparatus including a process cartridge according to Embodiment 6.
Figure 26B:
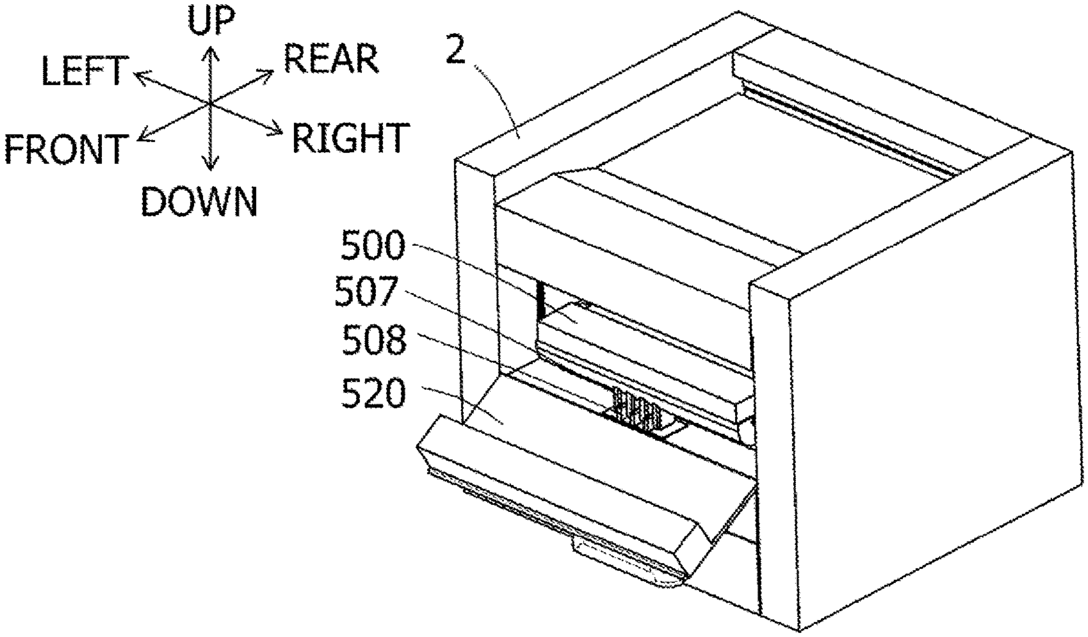
Figure 27A:
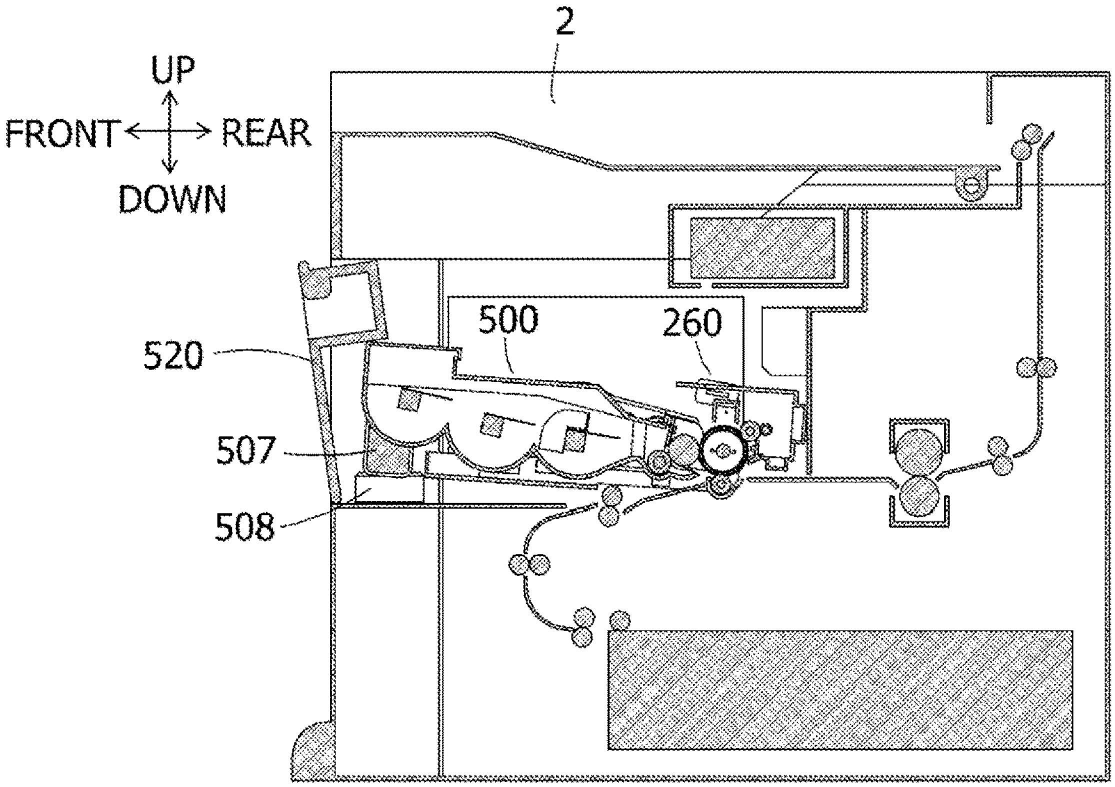
FIGS. 27A and 27B are diagrams illustrating the image forming apparatus including the process cartridge according to Embodiment 6.
Figure 27B:
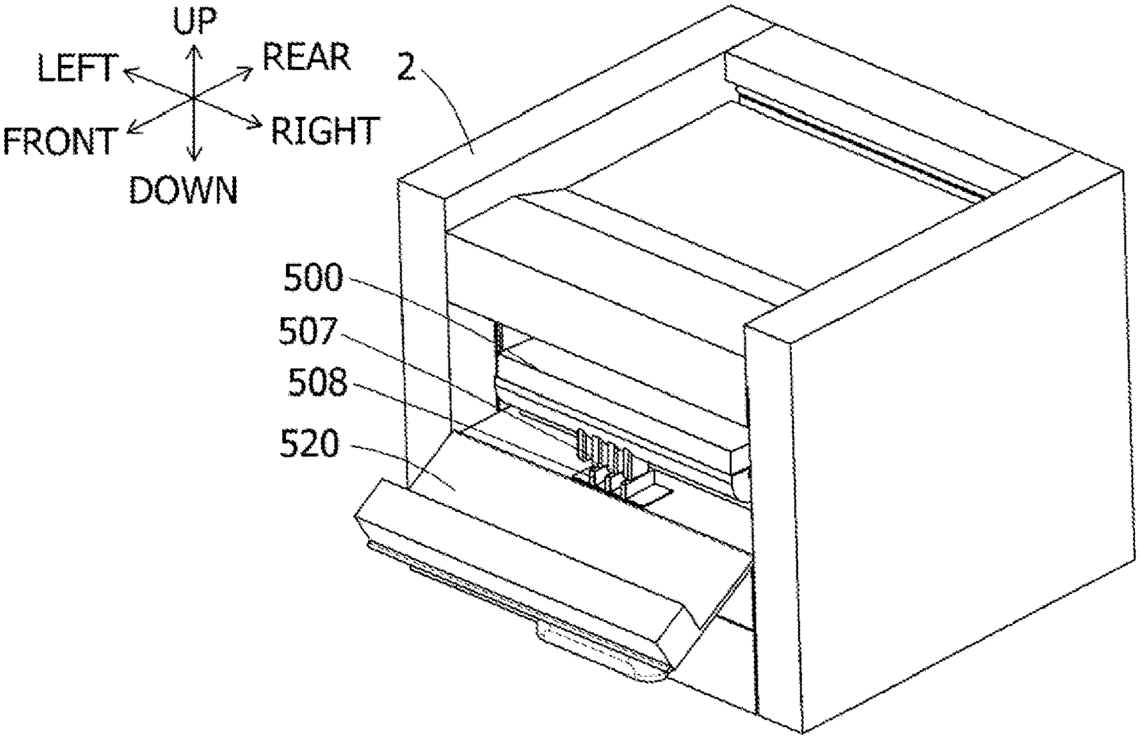
Figure 28:
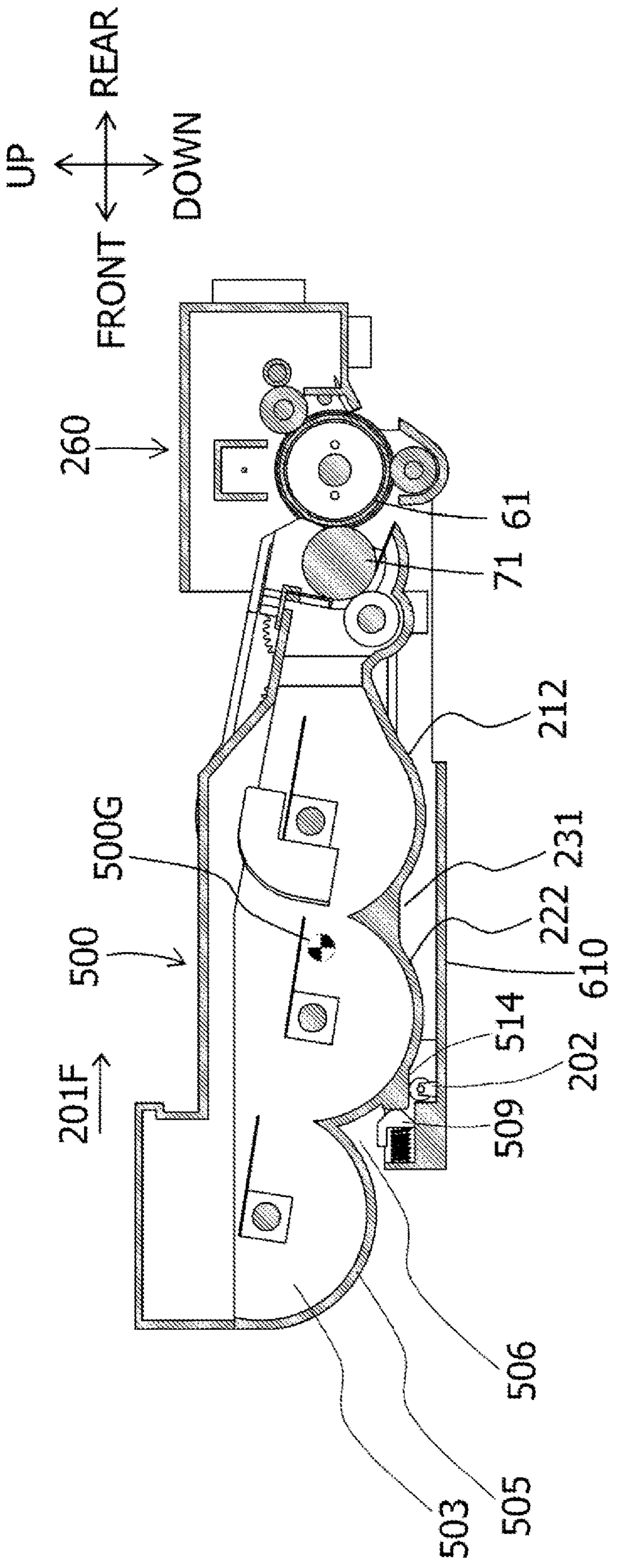
FIG. 28 is a cross-sectional view of the process cartridge according to Embodiment 6.
Figure 29:
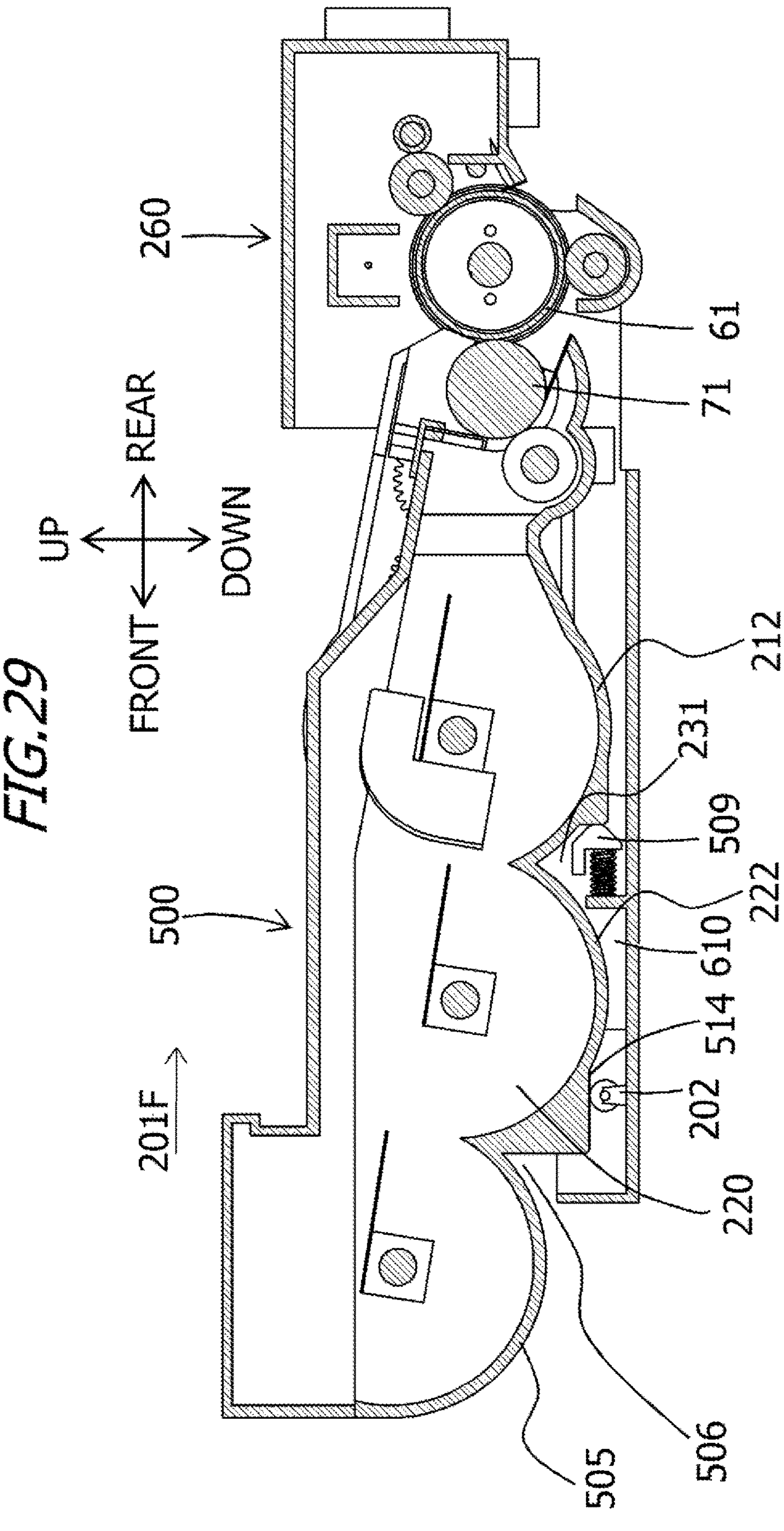
FIG. 29 is a cross-sectional view of the process cartridge according to Embodiment 6.
Figure 30:
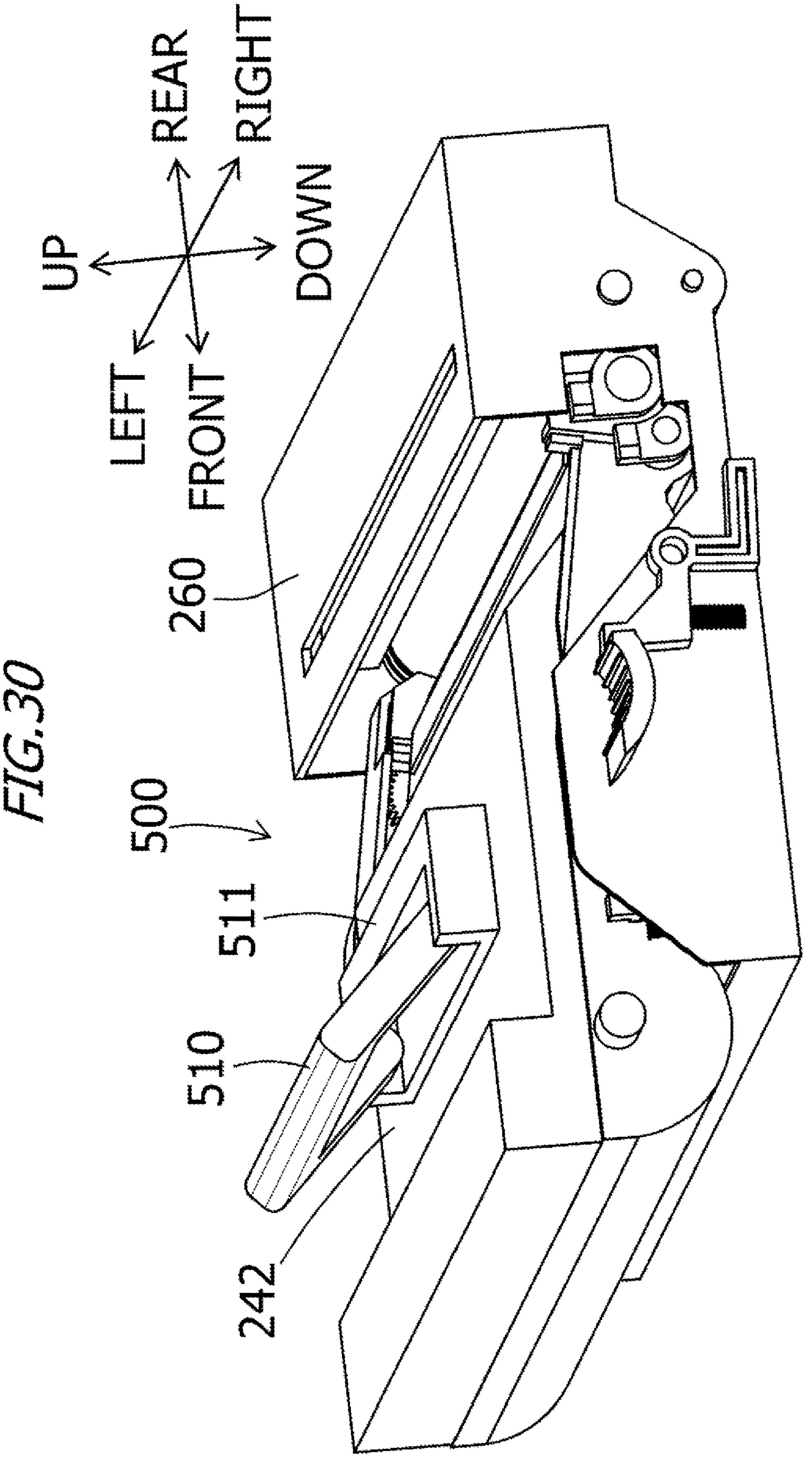
FIG. 30 is a perspective view of the process cartridge according to Embodiment 6.
Figure 31:
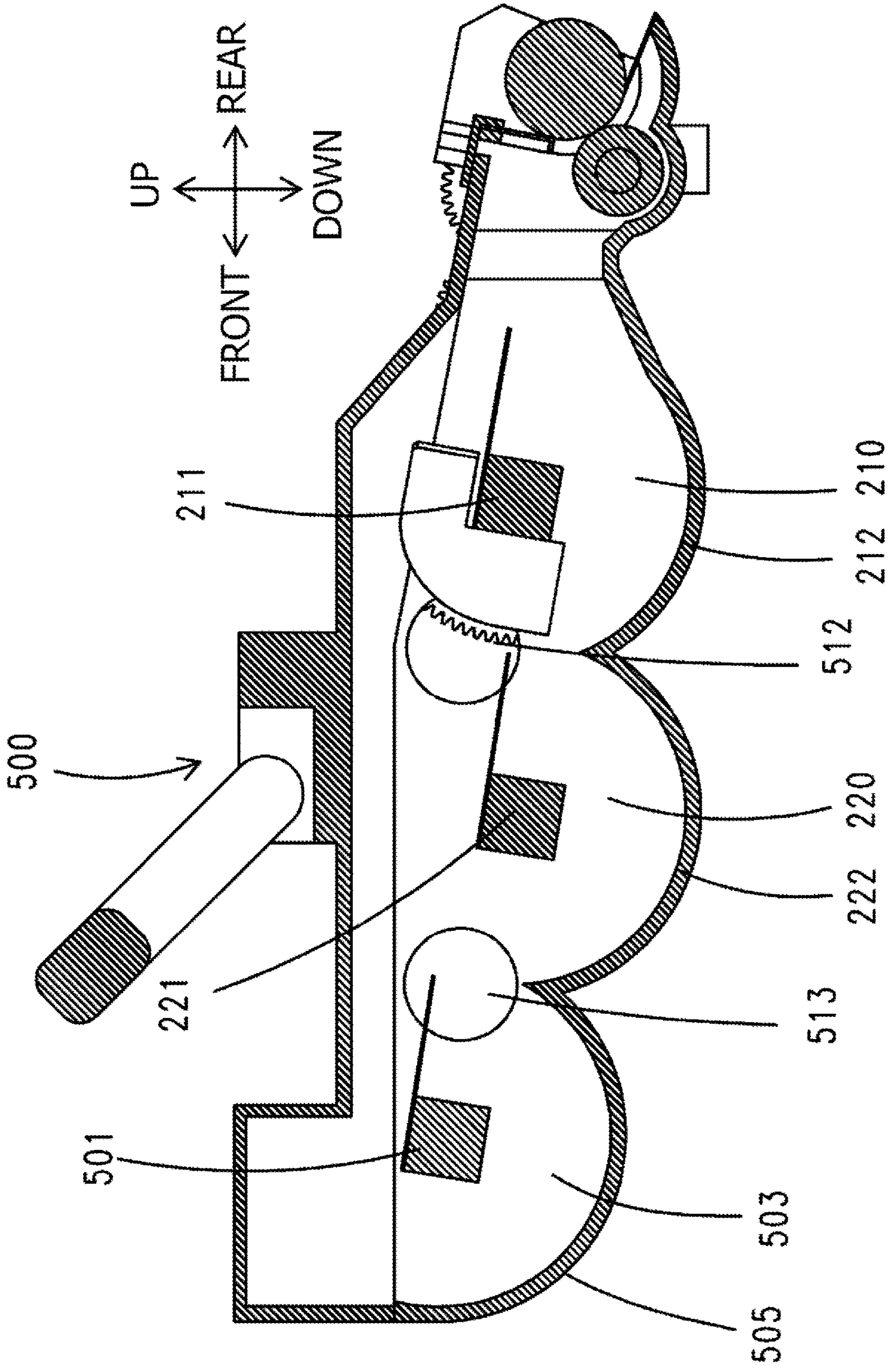
FIG. 31 is a cross-sectional view of the process cartridge according to Embodiment 6.

FIGS. 25 and 29 are cross-sectional views illustrating a state in which the developing unit 500 is mounted in the photosensitive member unit 260, according to Embodiment 6. FIGS. 26A, 27A, and 28 are cross-sectional views illustrating a state in which the developing unit 500, which has been mounted in the photosensitive member unit 260, is mounted in the apparatus main body 2. FIGS. 26B and 27B are perspective views illustrating, from the direction of a cartridge door 520, a state occurring after the developing unit 500, in which the photosensitive member unit 260 has been mounted, has been mounted in the apparatus main body 2. FIG. 30 is a perspective view illustrating a state in which the developing unit 500 is mounted in the photosensitive member unit 260. FIG. 31 is a cross-sectional view of the developing unit 500.

As illustrated in FIG. 25, the developing unit 500 is provided with a third agitator 501, in addition to the configuration of the developing unit 270 described in Embodiment 1. The third agitator 501 is disposed within the third stirring chamber 503, which is provided further to the front than the second stirring chamber 220. The third stirring chamber 503 is a space which holds toner, formed by a third top surface 504 of the stirring chamber, which is provided higher than the third agitator 501 in the gravitational direction, and the third wall surface 505, which is provided lower than the third agitator 501 in the gravitational direction. The third wall surface 505 is a convex wall surface projecting downward in the gravitational direction with respect to the third agitator 501. A third depressed portion 506 is formed at the boundary between the second wall surface 222 and the third wall surface 505 in the front-rear direction, and the second wall surface 222 and the third wall surface 505 are connected by the third depressed portion 506.

In this embodiment, the process cartridge is configured so that when the developing unit 500 is mounted in the photosensitive member unit 260, the third stirring chamber 503 of the developing unit 500 projects further to the front than the frame 610 of the photosensitive member unit 260.

Additionally, the center of rotation of the third agitator 501 is located higher than the straight line L1 connecting the center of rotation of the first agitator 211 with the center of rotation of the second agitator 221.

As illustrated in FIG. 26A, the developing unit 500 is mounted in and removed from the apparatus main body while mounted in the photosensitive member unit 260. A first engagement portion 507 is provided below the third wall surface 505 in the gravitational direction, as an unevenly-shaped part used for engagement, for the purpose of preventing erroneous mounting between the main body and a plurality of process cartridges having different specifications such as service life, speed, and the like. A second engagement portion 508 is provided in the apparatus main body 2 as an unevenly-shaped part corresponding to the first engagement portion 507.

As illustrated in FIG. 26B, when a compliant developing unit 500 (i.e., a unit with matching specifications) is mounted in the apparatus main body 2, the developing unit 500 can be mounted in the apparatus main body 2 without making contact with an unevenly-shaped part provided between the first engagement portion 507 and the second engagement portion 508. However, as illustrated in FIG. 27B, when a non-compliant developing unit 500 (i.e., a unit with different specifications) is mounted in the apparatus main body 2, the unevenly-shaped part provided between the first engagement portion 507 and the second engagement portion 508 interferes with the mounting. In this case, the developing unit 500 cannot be inserted to a fully-mounted position in the apparatus main body 2, as illustrated in FIG. 27A.

Next, as illustrated in FIG. 28, the photosensitive member unit 260 is provided with the photosensitive drum 61, the frame 610, and a pressing member 509. The pressing member 509 is provided further to the rear than the third stirring chamber 503 of the developing unit 500. The pressing member 509 presses the developing unit 500 in the direction of the arrow 201F, and thus presses the developing roller 71 provided in the developing unit 500 toward the photosensitive drum 61, in a state where the developing unit 500 is mounted in the photosensitive member unit 260. Additionally, the above-described rotation stopping roller portion 202A may be provided in the third depressed portion 506. Alternatively, the above-described rotation stopping roller portion 202A may be provided in the first depressed portion 231 rather than in the third depressed portion 506. Furthermore, a roller receiving portion 514 having a surface parallel to the direction of the arrow 201F may be provided in a part of the developing unit 500 that makes contact with the rotation stopping roller portion 202A.

As illustrated in FIG. 29, the photosensitive member unit 260 is provided with the photosensitive drum 61, the frame 610, and the pressing member 509. The pressing member 509 is provided further to the rear than the second stirring chamber 220 of the developing unit 500. The pressing member 509 presses the developing unit 500 in the direction of the arrow 201F, and thus presses the developing roller 71 provided in the developing unit 500 toward the photosensitive drum 61, in a state where the developing unit 500 is mounted in the photosensitive member unit 260. The pressing member 509 may be provided in the first depressed portion 231.

Furthermore, the roller receiving portion 514, with which the rotation stopping roller portion 202A makes contact, may be provided in the third depressed portion 506. The roller receiving portion 514 may have a surface which is parallel to the direction of the arrow 201F.

As illustrated in FIG. 30, a handle 510 is disposed above the second stirring chamber 220 in the gravitational direction. The handle 510 is fixed, in a rotatable state, to a handle support portion 511 provided in the second top surface 242 of the stirring chambers.

A new component detection mechanism using the above-described detection member 81 and detection projection 83 (see FIGS. 8A and 8B) may be provided on a plane including the cross-section of the third stirring chamber 503 of the developing unit 500.

As illustrated in FIG. 31, the developing unit 500 is provided with a first filling port 512 and a second filling port 513. The first filling port 512 is provided between the first agitator 211 and the second agitator 221, and the second filling port 513 is provided between the second agitator 221 and the third agitator 501. Additionally, a sealing member, which includes a shaft portion supporting, in a freely-rotatable state, an idler gear (not shown) for transmitting drive power to the first agitator gear 713 and the second agitator gear 714 illustrated in FIG. 4 and a third agitator gear (not shown), may be used as a means for sealing the first filling port 512, the second filling port 513, and so on.

In this manner, the apparatus main body 2 of the image forming apparatus according to Embodiment 6 and illustrated in FIGS. 27A and 27B is configured so that the process cartridge can be mounted therein and removed therefrom. The third wall surface 505 of the developing unit 500 may include the first engagement portion 507, which can engage with the second engagement portion 508 included in the apparatus main body 2 (a main body engagement portion).

Additionally, the photosensitive member unit 260 according to Embodiment 6 includes the pressing member 509. The developing unit 500 has the roller receiving portion 514 (pressing receiving portion) which is pressed by the pressing member 509. The configuration is such that when viewed in a direction of the rotation axis of the developing roller 71, the roller receiving portion 514 (pressing receiving portion) is at least partially disposed within the third depressed portion 506, which is surrounded by a tangent line tangent to both the second wall surface 222 and the third wall surface 505, and the second wall surface 222, and moreover the third wall surface 505. Additionally, as illustrated in FIG. 29, the configuration may be such that the roller receiving portion 514 (pressing receiving portion) is at least partially disposed within the first depressed portion 231.

Actions and Effects of Embodiment 6

In this embodiment, the configuration is such that when the developing unit 500 is mounted in the photosensitive member unit 260, the third stirring chamber 503 of the developing unit 500 projects further to the front than the frame 610 of the photosensitive member unit 260. In this configuration, a configuration for supporting the developing unit 500 with respect to the photosensitive member unit 260 is the same as in the developing unit 270. Accordingly, a plurality of developing units having different service lives (toner capacities) can be mounted without changing the photosensitive member unit 260. This suppresses the number of types of photosensitive member units which are incorporated when manufacturing the process cartridge. The number of molding molds required for the different types of photosensitive member units can therefore be reduced. This also makes it sufficient for an assembly apparatus to handle a comparatively low number of types of photosensitive member units, which simplifies the assembly apparatus and by extension suppresses manufacturing costs.

Additionally, in this embodiment, the center of rotation of the third agitator 501 is located higher than the straight line L1 connecting the center of rotation of the first agitator 211 with the center of rotation of the second agitator 221. Toner can therefore be conveyed from the third agitator 501 to the second agitator 221 using the force of gravity. Accordingly, the third depressed portion 506 may be eliminated, the third wall surface 505 and the second wall surface 222 may be connected by a sloped surface that slopes downward, in the gravitational direction, from the third wall surface 505 toward the second wall surface 222, and the toner may be conveyed by sliding along the sloped surface. Additionally, eliminating the third depressed portion 506 makes it possible to increase the filling amount of the toner.

Additionally, as illustrated in FIG. 28, by including the first engagement portion 507 provided in the developing unit 500 and the second engagement portion 508 provided in the apparatus main body 2, the apparatus main body 2 and the developing unit 500 can be made compatible or incompatible with each other in that combination. As an example in which compatibility is necessary, multiple combinations of the apparatus main body 2 and the developing unit 500 will be created in situations such as where the number of product types is increased by changing the toner. In this case, if an incompatible developing unit 500 is mounted in the apparatus main body 2, there is a risk of the apparatus main body 2 malfunctioning.

To prevent such a situation, the first engagement portion 507 and the second engagement portion 508 are made to interfere with each other when the developing unit is mounted in the apparatus main body 2, which prevents the developing unit 500 from being mounted in the apparatus main body 2. Additionally, in this embodiment, the first engagement portion 507 is provided in the developing unit 500 instead of the photosensitive member unit 260, and thus when providing a plurality of developing units having different specifications as products, the photosensitive member unit 260 can be used in common with those units. Although the compatibility is achieved using the unevenness in the relationship between the first engagement portion 507 and the second engagement portion 508 in this embodiment, the means for implementing compatibility is not limited thereto, and a variety of means can be used, including positional relationships, size relationships, and so on.

Additionally, in this embodiment, the pressing member 509 can be disposed, without wasting space, in the space formed by the frame 610 of the photosensitive member unit 260 and the first depressed portion 231 or the third depressed portion 506 of the developing unit 500, which makes it possible to press the developing roller 71 toward the photosensitive drum 61 without affecting the size of the apparatus main body 2. In the same technical spirit, the attitude of the developing unit 500 can be stabilized by disposing the rotation stopping roller portion 202A in a space formed by the frame 610 and a second depressed portion 232 or the first depressed portion 231 of the stirring chambers. Additionally, in this embodiment, the developing roller 71 can press against the photosensitive drum 61 in a stable manner. Note that the numbers of the pressing member 509 and the rotation stopping roller portion 202A are not limited to one.

Additionally, by disposing the handle 510 above, in the gravitational direction, the second stirring chamber 220, which is close to a center of gravity 500G of the developing unit 500, the load arising when the user grips the developing unit 500 can be reduced.

Additionally, in this embodiment, the pressing member 509 is provided in the third depressed portion 506, and thus the third depressed portion 506 and the pressing member 509 can be used as uneven shapes for engagement, for the purpose of preventing erroneous mounting of multiple process cartridges having different specifications, such as service life and speed. Specifically, if the third depressed portion 506 of the developing unit 500 is provided in a different location from the pressing member 509, one of the second wall surface 222 and the third wall surface 505 will contact the pressing member 509 when the developing unit 500 is mounted in the photosensitive member unit 260. This ensures that the unit cannot be inserted to the fully-mounted position illustrated in FIGS. 18A and 18B. By configuring the process cartridge in the manner described in this embodiment, the user can be made aware when the process cartridge is erroneously mounted in the apparatus main body.

Note that the configurations described in the foregoing embodiments can be combined as appropriate within a scope that does not produce any conflicts.

The present invention can be summarized as follows.

(1) A process cartridge (5) according to a first aspect of the present invention including:

a photosensitive member unit (6, 260); and a developing unit (7, 270) that is attachable to and detachable from the photosensitive member unit (6, 260), wherein the photosensitive member unit (6, 260) includes:

a photosensitive drum (61) on which an electrostatic latent image is formed;

a frame (610) that supports the photosensitive drum (61); and a pressing member (200) that presses the developing unit (7, 270) toward the photosensitive member unit (6, 260), the developing unit (7, 270) includes:

a developing roller (71) that supplies toner to the photosensitive drum (61) and collects the toner remaining on a surface of the photosensitive drum (61);

a housing (250) in which a holding space that holds the toner is formed; and a pressing receiving portion (231A) that receives pressing force from the pressing member (200), the housing (250) includes:

a first bottom portion that has an arc shape and that projects toward an outer side of the holding space; and a second bottom portion that has an arc shape and that projects toward the outer side of the holding space, in a state in use, and when viewed in a direction of a rotation axis of the developing roller (71), at least part of the pressing receiving portion (231A) is located in a space surrounded by the first bottom portion, the second bottom portion, and a tangent line tangent to both an outer wall of the first bottom portion and an outer wall of the second bottom portion.

(2) The process cartridge (5) according to a first aspect of the present invention, wherein the developing unit (7, 270) preferably further includes:

a first conveyance member for conveying the toner, that rotates in a state of contacting with an inner wall of the first bottom portion; and a second conveyance member for conveying the toner, that rotates in a state of contacting with an inner wall of the second bottom portion, and preferably when viewed in the direction of the rotation axis of the developing roller (71), the pressing receiving portion (231A) is located between a rotation center of the first conveyance member and a rotation center of the second conveyance member in a horizontal direction.

(3) The process cartridge (5) according to the first aspect of the present invention, wherein preferably when viewed in the direction of the rotation axis of the developing roller (71), a first straight line extending along a pressing direction, in which the pressing member (200) presses the pressing receiving portion (231A), passes through the first bottom portion and the second bottom portion.

(4) The process cartridge (5) according to the first aspect of the present invention, wherein preferably when viewed in the direction of the rotation axis of the developing roller (71), a second straight line passing through a rotation center of the developing roller (71) and the rotation center of the first conveyance member passes through a conveyance chamber that houses the second conveyance member.

(5) The process cartridge (5) according to the first aspect of the present invention, wherein preferably the photosensitive member unit (6, 260) includes a lift member (642) that presses and moves the developing unit (7, 270), and preferably the pressing member (200) is disposed at a position on further toward a center side of the frame (610) than the lift member (642) in a rotation axial direction of the photosensitive drum (61).

(6) A process cartridge (5) according to a second aspect of the present invention including:

a photosensitive member unit (6, 261); and a developing unit (7, 271) that is attachable to and detachable from the photosensitive member unit (6, 261), wherein the photosensitive member unit (6, 261) includes:

a photosensitive drum (61) on which an electrostatic latent image is formed;

a frame (610) that supports the photosensitive drum (61); and a pressing member (201) that presses the developing unit (7, 271) toward the photosensitive member unit (6, 261), the developing unit (7, 271) includes:

a developing roller (71) that supplies toner to the photosensitive drum (61) and collects the toner remaining on a surface of the photosensitive drum (61);

a housing (251) in which a holding space that holds the toner is formed; and a pressing receiving portion (231A) that receives pressing force from the pressing member (201), the housing (251) includes:

a first bottom portion that has an arc shape and that projects toward an outer side of the holding space;

a second bottom portion that has an arc shape and that projects toward the outer side of the holding space;

a first top surface (241);

a second top surface (242) provided upward of the first top surface (241) in a gravitational direction, in a state in use; and a connecting portion that connects the first top surface (241) and the second top surface (242), and the connecting portion has an opposing surface opposite the first top surface (241).

(7) The process cartridge (5) according to the second aspect of the present invention, wherein preferably the photosensitive member unit (6, 261) includes a rotation stopping roller portion (202A) that supports the developing unit (7, 271) when the developing unit (7, 271) is attached to the photosensitive member unit (6, 261), and preferably when viewed in a direction of a rotation axis of the developing roller (71), at least part of the rotation stopping roller portion (202A) is located in a space surrounded by the first bottom portion, the second bottom portion, and a tangent line tangent to both an outer wall of the first bottom portion and an outer wall of the second bottom portion.

(8) The process cartridge (5) according to the second aspect of the present invention, wherein preferably the developing unit (7, 271) further includes:

a first conveyance member for conveying the toner, that rotates in a state of contacting with an inner wall of the first bottom portion;

a second conveyance member for conveying the toner, that rotates in a state of contacting with an inner wall of the second bottom portion;

a first conveyance chamber that houses the first conveyance member; and a second conveyance chamber that houses the second conveyance member, and preferably a width of the second conveyance chamber, in the direction of the rotation axis of the developing roller (71), is greater than a width of the first conveyance chamber.

(9) A process cartridge (5) according to a third aspect of the present invention including:

a photosensitive member unit (6, 362); and a developing unit (7, 372) that is attachable to and detachable from the photosensitive member unit (6, 362), wherein the photosensitive member unit (6, 362) includes:

a photosensitive drum (61) on which an electrostatic latent image is formed; and a frame (610) that supports the photosensitive drum (61), wherein, the developing unit (7, 372) includes:

a developing roller (71) that supplies toner to the photosensitive drum (61) and collects the toner remaining on a surface of the photosensitive drum (61);

a housing (700) in which a holding space that holds the toner is formed;

a first conveyance member that conveys the toner toward the developing roller (71); and a second conveyance member that conveys the toner toward the first conveyance member, wherein, the housing (700) includes:

a first bottom portion that has an arc shape and that projects toward an outer side of the holding space; and a second bottom portion that has an arc shape and that projects toward the outer side of the holding space, in a state in use, wherein, the first conveyance member is disposed above the first bottom portion in a state in use, wherein, the first conveyance member includes:

a rotation shaft; and a stirring blade (313) that is inclined relative to an axis line of the rotation shaft, wherein, the second conveyance member is disposed above the second bottom portion in state in use, and wherein, the second conveyance member includes:

a rotation shaft; and a stirring sheet that is provided with a slit.

(10) The process cartridge (5) according to the third aspect of the present invention, wherein preferably the first conveyance member has a plurality of the stirring blades (313), and preferably when viewed in a direction orthogonal to an axis line direction of the rotation shaft, at least part of the slit is located between two adjacent ones of the stirring blades (313) in the axis line direction.

(11) The process cartridge (5) according to the third aspect of the present invention, wherein preferably the slit includes:

a first end located on a free end side of the stirring sheet; and a second end located on an opposite side to the first end, and preferably the slit is arranged to be inclined relative to the axis line of the rotation shaft so as to be extended from the second end toward the first end from the center of the rotation shaft toward an outer side in the axis line direction.

(12) A process cartridge (5) according to a fourth aspect of the present invention including:

a photosensitive member unit (6); and a developing unit (7, 470) that is attachable to and detachable from the photosensitive member unit (6), wherein the photosensitive member unit (6) includes:

a photosensitive drum (61) on which an electrostatic latent image is formed; and a frame (610) that supports the photosensitive drum (61), wherein, the developing unit (7, 470) includes:

a developing roller (71) that supplies toner to the photosensitive drum (61) and collects the toner remaining on a surface of the photosensitive drum (61);

a housing (700) in which a holding space that holds the toner is formed;

a first conveyance member that conveys the toner within the holding space toward the developing roller (71);

a second conveyance member that conveys the toner within the holding space toward the first conveyance member; and a third conveyance member that conveys the toner within the holding space toward the second conveyance member, wherein, the housing (700) includes:

a first bottom portion that has an arc shape and that projects toward an outer side of the holding space;

a second bottom portion that has an arc shape and that projects toward the outer side of the holding space; and a third bottom portion that has an arc shape and that projects toward the outer side of the holding space, in a state in use, wherein, the first conveyance member is disposed above the first bottom portion, the second conveyance member is disposed above the second bottom portion, and the third conveyance member is disposed above the third bottom portion, in a state in use.

(13) The process cartridge (5) according to the fourth aspect of the present invention, wherein preferably the first conveyance member includes:

a first rotation shaft; and a first stirring blade that is fixed to the first rotation shaft, and preferably the first stirring blade is disposed so as to be inclined at an angle relative to an axis line of the first rotation shaft to produce a force, by which the toner is conveyed inward from two end sides in an axis line direction of the first rotation shaft, when the first rotation shaft rotates.

(14) The process cartridge (5) according to the fourth aspect of the present invention, wherein preferably at least one of the second conveyance member and the third conveyance member includes:

a second rotation shaft; and a second stirring blade that is fixed to the second rotation shaft, and preferably the second stirring blade is disposed so as to be inclined at an angle relative to an axis line of the second rotation shaft to produce a force, by which the toner is conveyed outward from a center in an axis line direction of the second rotation shaft, when the second rotation shaft rotates.

(15) The process cartridge (5) according to the fourth aspect of the present invention, wherein preferably the first stirring blade has a plate shape.

(16) The process cartridge (5) according to the fourth aspect of the present invention preferably further including:

a first conveyance chamber that houses the first conveyance member;

a second conveyance chamber that houses the second conveyance member; and a third conveyance chamber that houses the third conveyance member, and preferably a width of the third conveyance chamber, in a direction of a rotation axis of the second conveyance member, is greater than a width of the second conveyance chamber.

(17) A process cartridge (5) according to a fifth aspect of the present invention including:

a photosensitive member unit (6, 260, 362); and a developing unit (7, 270, 372, 500) that is attachable to and detachable from the photosensitive member unit (6, 260, 362), wherein the photosensitive member unit (6, 260, 362) includes:

a photosensitive drum (61) on which an electrostatic latent image is formed; and a frame (610) that supports the photosensitive drum (61), wherein, the developing unit (7, 270, 372, 500) includes:

a developing roller (71) that supplies toner to the photosensitive drum (61) and collects the toner remaining on a surface of the photosensitive drum (61);

a housing (700) in which a holding space that holds the toner is formed;

a first conveyance member that is capable of rotating and that conveys the toner within the holding space toward the developing roller (71);

a second conveyance member that is capable of rotating and that conveys the toner within the holding space toward the first conveyance member; and a third conveyance member that conveys the toner within the holding space toward the second conveyance member, wherein, the housing (700) includes:

a first bottom portion that has an arc shape and that projects toward an outer side of the holding space;

a second bottom portion that has an arc shape and that projects toward the outer side of the holding space; and a third bottom portion that has an arc shape and that projects toward the outer side of the holding space, in a state in use, wherein, the first conveyance member is disposed above the first bottom portion, the second conveyance member is disposed above the second bottom portion, and the third conveyance member is disposed above the third bottom portion, in a state in use, and when viewed in a direction of a rotation axis of the first conveyance member, at least part of the third bottom portion extends from an end part of the photosensitive member unit (6, 260, 362) at one side opposite to the other side where the photosensitive drum (61) is located, so as to be further away from the photosensitive drum (61), in a direction in which a straight line passing through a rotation center of the first conveyance member and a rotation center of the second conveyance member extends.

(18) The process cartridge (5) according to the fifth aspect of the present invention, wherein preferably the third conveyance member is capable of rotating, and preferably when viewed in a direction of a rotation axis of the first conveyance member, a rotation center of the third conveyance member is located above a straight line connecting the rotation center of the first conveyance member with the rotation center of the second conveyance member, in a state in use.

(19) The process cartridge (5) according to the fifth aspect of the present invention, wherein preferably the process cartridge (5) is attachable to and detachable from an apparatus main body of an image forming apparatus, and preferably the third bottom portion includes an engagement portion that can engage with a main body engagement portion included in the apparatus main body.

(20) The process cartridge (5) according to the fifth aspect of the present invention, wherein preferably the photosensitive member unit (6, 260) includes a pressing member (509), preferably the developing unit (7, 500) includes a pressing receiving portion (514) that is pressed by the pressing member (509), and preferably when viewed in a direction of a rotation axis of the developing roller (71), at least part of the pressing receiving portion (514) is located in a space surrounded by the second bottom portion, the third bottom portion, and a tangent line tangent to both an outer wall of the second bottom portion and an outer wall of the third bottom portion.

(21) The process cartridge (5) according to the fifth aspect of the present invention, wherein preferably the photosensitive member unit (6, 260) includes a pressing member (509), preferably the developing unit (7, 500) includes a pressing receiving portion (514) that is pressed by the pressing member (509), and preferably when viewed in a direction of a rotation axis line of the developing roller (71), at least part of the pressing receiving portion (514) is located in a space surrounded by the first bottom portion, the second bottom portion, and a tangent line tangent to both the first bottom portion and the second bottom portion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-235594, filed on Dec. 26, 2019, which is hereby incorporated by reference herein in its entirety.

What is claimed is:

1. A process cartridge configured to be attachable to and detachable from an apparatus body of an image forming apparatus, the cartridge comprising:

a drum unit including:
  a photosensitive drum configured to be rotatable;
  a pressing portion; and
  a frame, and
a developing unit detachably attached to the drum unit, the developing unit including:
  a developing roller configured to be rotatable about a first rotational axis;
  a toner accommodating portion configured to accommodate toner;
  a stirring member provided in the toner accommodating portion, the stirring member being configured to stir the toner and be rotatable about a second rotational axis extending in a direction along the first rotational axis of the developing roller;
  a grip portion; and
  a pressed portion configured to be pressed by the pressing portion of the drum unit in a direction in which the developing roller approaches the photosensitive drum,
wherein in a case where the cartridge is oriented in an attachment direction in which the cartridge is attached to the apparatus body, when viewed in a direction of the first rotational axis of the developing roller,
(i) the grip portion, the pressed portion, the stirring member, the developing roller, and the photosensitive drum are disposed in this order in the attachment direction,
(ii) the grip portion is disposed above the second rotational axis of the stirring member, and the pressed portion is disposed below the second rotational axis of the stirring member,
(iii) a wall surface portion constituting a part of the toner accommodating portion and provided between the grip portion and the pressed portion in the attachment direction, the wall surface portion extending downward to the pressed portion toward the attachment direction, and
(iv) the grip portion extends upward beyond the topmost of the frame of the drum unit.

2. The cartridge according to claim 1, wherein the stirring member includes a stirring sheet that is provided with a plurality of holes aligned in a direction of the second rotational axis of the stirring member.

3. The cartridge according to claim 2,
wherein the stirring member includes a stirring rod that is rotatable about the second rotational axis,
wherein the stirring sheet is attached to the stirring rod and is configured to rotate with rotation of the stirring rod, and
wherein the stirring member further includes a projecting portion that is formed so as to project from the stirring rod.

4. The cartridge according to claim 3, wherein the projecting portion further includes a gap portion which allows the toner to pass through.

5. The cartridge according to claim 2, wherein each shape of the plurality of holes is a quadrilateral.

6. The cartridge according to claim 5, wherein the quadrilateral includes a rectangle.

7. The cartridge according to claim 6, wherein, long sides of the rectangle extend in a direction perpendicular to the second rotational axis of the stirring member.

8. The cartridge according to claim 1, wherein the developing unit includes an engaging portion that engages with an engaged portion provided in the drum unit and protrudes in the direction of the first rotational axis of the developing roller, and
wherein in a case where the cartridge is oriented in the attachment direction, when viewed in the direction of the first rotational axis of the developing roller, the engaging portion is disposed below a position of the grip portion.

9. The cartridge according to claim 1, in a vertical sectional view perpendicular to the first rotational axis in a case where the cartridge is oriented in the attachment direction, in a case where a line that passes through a contact point of the pressing portion with the pressed portion and is parallel to a pressing direction of the pressing portion assumes a first line, the first line passes through the toner accommodating portion.

10. The cartridge according to claim 9, wherein the developing roller is disposed above the first line.

11. The cartridge according to claim 9, wherein the photosensitive drum is disposed above the first line.

12. The cartridge according to claim 1, wherein the pressed portion is provided in an end portion of the developing unit in a direction of the first rotational axis of the developing roller.

* * * * *